United States Patent
Scoggins et al.

(10) Patent No.: US 10,841,121 B1
(45) Date of Patent: Nov. 17, 2020

(54) HOSPITALITY SYSTEM AND METHOD OF USING THE SAME

(71) Applicant: Hilton International Holding LLC, McLean, VA (US)

(72) Inventors: Charles Scoggins, Memphis, TN (US); Durga Prasad Koka, Memphis, TN (US)

(73) Assignee: Hilton International Holding LLC, McLean, VA (US)

( * ) Notice: Subject to any disclaimer, the term of this patent is extended or adjusted under 35 U.S.C. 154(b) by 0 days.

(21) Appl. No.: 16/588,448

(22) Filed: Sep. 30, 2019

(51) Int. Cl.
| | | |
|---|---|---|
| *H04L 12/28* | (2006.01) | |
| *H04L 12/24* | (2006.01) | |
| *G06Q 10/02* | (2012.01) | |
| *H04N 21/214* | (2011.01) | |
| *H04W 4/80* | (2018.01) | |
| *H04W 4/33* | (2018.01) | |
| *G06Q 50/12* | (2012.01) | |

(52) U.S. Cl.
CPC ......... *H04L 12/2814* (2013.01); *G06Q 10/02* (2013.01); *G06Q 50/12* (2013.01); *H04L 41/22* (2013.01); *H04N 21/2143* (2013.01); *H04W 4/33* (2018.02); *H04W 4/80* (2018.02)

(58) Field of Classification Search
CPC ..... H04L 12/2814; H04L 41/22; G06Q 50/12; G06Q 10/02; H04N 21/2143; H04W 4/80; H04W 4/33
See application file for complete search history.

(56) References Cited

U.S. PATENT DOCUMENTS

| 6,130,892 A | 10/2000 | Short et al. |
| 6,606,127 B1 | 8/2003 | Fang et al. |

(Continued)

FOREIGN PATENT DOCUMENTS

WO 2019006179 A1 1/2019

OTHER PUBLICATIONS

International Searching Authority, Invitation to Pay Additional Fees, and, Where Applicable, Protest Fee, dated May 13, 2020, (18 pages), European Patent Office, Rijswijk, Netherlands.

(Continued)

*Primary Examiner* — Michael C Lai
(74) *Attorney, Agent, or Firm* — Alston & Bird LLP

(57) ABSTRACT

Various embodiments are directed to systems and methods for configuring a hospitality environment. A control module located in the hospitality environment may receive an instructional signal from a control device based on user input corresponding to a desired connected device status. The control module may transmit a corresponding instructional signal to one or more connected devices. The control module may receive instructional signals from one of a personal control device or a local control device located in the hospitality environment, as well as an enterprise control entity, each of which may be used interchangeably and independently to control at least one connected device according to a user's preferences. The control module utilizes an event-driven architecture to facilitate the execution of both an internet of things control functionality and a content delivery functionality. Various embodiments are directed to systems and methods for configuring a plurality of hospitality environments.

30 Claims, 13 Drawing Sheets

(56) References Cited

U.S. PATENT DOCUMENTS

| | | |
|---|---|---|
| 6,810,426 B2 | 10/2004 | Mysore et al. |
| 6,868,399 B1 | 3/2005 | Short et al. |
| 6,934,754 B2 | 8/2005 | West et al. |
| 6,990,150 B2 | 1/2006 | Fang |
| 7,342,488 B2 | 3/2008 | Wolfe et al. |
| 7,474,617 B2 | 1/2009 | Molen et al. |
| 7,496,627 B2 | 2/2009 | Moorer et al. |
| 7,580,376 B2 | 8/2009 | West et al. |
| 7,589,689 B2 | 9/2009 | Welch et al. |
| 7,590,703 B2 | 9/2009 | Cashman et al. |
| 7,639,156 B2 | 12/2009 | Kuijlaars |
| 7,667,968 B2 | 2/2010 | Moorer et al. |
| 7,689,716 B2 | 3/2010 | Short et al. |
| 7,698,432 B2 | 4/2010 | Short et al. |
| 7,752,334 B2 | 7/2010 | Paunikar et al. |
| 7,962,130 B2 | 6/2011 | Moorer et al. |
| 8,219,658 B2 * | 7/2012 | Tokunaga ............... G06Q 10/02 705/5 |
| 8,250,601 B2 | 8/2012 | King |
| 8,255,681 B2 | 8/2012 | Molen et al. |
| 8,271,881 B2 | 9/2012 | Moorer et al. |
| 8,335,847 B2 | 12/2012 | Cassidy et al. |
| 8,434,111 B2 | 4/2013 | Levy et al. |
| 8,448,231 B2 | 5/2013 | Ong |
| 8,504,688 B2 | 8/2013 | Kullos |
| 8,522,304 B2 | 8/2013 | Molen et al. |
| 8,543,868 B2 | 9/2013 | Gyorffy |
| 8,566,883 B2 | 10/2013 | Ostlund |
| 8,566,912 B2 | 10/2013 | Olshansky et al. |
| 8,572,662 B2 | 10/2013 | Cassidy et al. |
| 8,577,484 B2 | 11/2013 | Moorer et al. |
| 8,645,509 B2 | 2/2014 | Carriere |
| 8,650,495 B2 | 2/2014 | Ong |
| 8,650,600 B2 | 2/2014 | Ogle et al. |
| 8,667,518 B2 | 3/2014 | Kuijlaars |
| 8,686,890 B2 | 4/2014 | Moorer et al. |
| 8,689,455 B2 | 4/2014 | Court |
| 8,732,749 B2 | 5/2014 | Hulse et al. |
| 8,732,753 B2 | 5/2014 | Warrick |
| 8,755,174 B2 | 6/2014 | Ogle et al. |
| 8,804,717 B2 | 8/2014 | Olshansky et al. |
| 8,811,184 B2 | 8/2014 | Ong |
| 8,813,138 B2 | 8/2014 | Warrick et al. |
| 8,813,211 B2 | 8/2014 | Baker et al. |
| 8,854,195 B2 | 10/2014 | West et al. |
| 8,855,065 B2 | 10/2014 | Welch et al. |
| 8,868,740 B2 | 10/2014 | Pitchaikani et al. |
| 8,903,978 B2 | 12/2014 | Zerr et al. |
| 9,003,455 B2 | 4/2015 | Hulse et al. |
| 9,009,259 B2 | 4/2015 | Iwaniszyn |
| 9,078,033 B2 | 7/2015 | Nicol et al. |
| 9,088,828 B2 | 7/2015 | Ogle et al. |
| 9,118,578 B2 | 8/2015 | Olshansky |
| 9,130,934 B2 | 9/2015 | Warrick et al. |
| 9,137,281 B2 | 9/2015 | Warrick et al. |
| 9,148,697 B2 | 9/2015 | Johns et al. |
| 9,161,219 B2 | 10/2015 | Bryksa et al. |
| 9,178,861 B2 | 11/2015 | Hulse et al. |
| 9,185,178 B2 | 11/2015 | Peng et al. |
| 9,229,734 B2 | 1/2016 | Hulse et al. |
| 9,301,001 B2 | 3/2016 | Warrick et al. |
| 9,326,020 B2 | 4/2016 | Ogle et al. |
| 9,332,304 B2 | 5/2016 | Ogle et al. |
| 9,363,373 B2 | 6/2016 | Abnett et al. |
| 9,380,336 B2 | 6/2016 | Ogle et al. |
| 9,507,775 B1 | 11/2016 | Niles |
| 9,552,830 B2 | 1/2017 | Niles |
| 9,584,848 B2 | 2/2017 | Warrick |
| 9,608,998 B2 | 3/2017 | Ong et al. |
| 9,690,781 B1 | 6/2017 | Niles |
| 9,716,902 B2 | 7/2017 | Ogle et al. |
| 9,756,019 B2 | 9/2017 | Warrick et al. |
| 9,769,519 B2 | 9/2017 | Ogle et al. |
| 9,798,716 B2 | 10/2017 | Niles |
| 9,800,670 B2 | 10/2017 | Warrick et al. |
| 10,009,716 B1 | 6/2018 | Niles |
| 10,021,801 B2 | 7/2018 | Deros |
| 10,026,101 B2 | 7/2018 | Cassidy et al. |
| 10,026,287 B2 | 7/2018 | Sarkar |
| 10,085,044 B2 | 9/2018 | Ogle et al. |
| 10,111,277 B2 | 10/2018 | Deros et al. |
| 10,225,615 B2 | 3/2019 | Ogle et al. |
| 10,244,375 B2 | 3/2019 | Zerr et al. |
| 2007/0055698 A1 * | 3/2007 | McCoy ................ G06Q 50/08 |
| 2011/0298596 A1 | 12/2011 | Warrick |
| 2012/0109398 A1 * | 5/2012 | Bhakta ................ H02J 3/14 700/295 |
| 2014/0106735 A1 * | 4/2014 | Jackson ............... H04W 8/245 455/419 |
| 2014/0280910 A1 | 9/2014 | Swig et al. |
| 2015/0188230 A1 | 7/2015 | Kim et al. |
| 2015/0365217 A1 * | 12/2015 | Scholten ............. H04L 5/0053 370/315 |
| 2016/0029078 A1 | 1/2016 | Ogle et al. |
| 2016/0057017 A1 | 2/2016 | Olshansky |
| 2016/0070251 A1 * | 3/2016 | Brown ............... G05B 19/4185 700/86 |
| 2016/0198214 A1 | 7/2016 | Levy et al. |
| 2016/0242232 A1 | 8/2016 | Deros |
| 2016/0269769 A1 | 9/2016 | Ogle et al. |
| 2016/0285877 A1 | 9/2016 | Anderson et al. |
| 2016/0323433 A1 | 11/2016 | Anderson et al. |
| 2017/0094345 A1 | 3/2017 | Zerr et al. |
| 2017/0126419 A1 | 5/2017 | Eom et al. |
| 2017/0272819 A1 | 9/2017 | Zen et al. |
| 2018/0020505 A1 | 1/2018 | Deros et al. |
| 2018/0048927 A1 | 2/2018 | Horton et al. |
| 2018/0077025 A1 | 3/2018 | Helvey et al. |
| 2018/0077459 A1 | 3/2018 | Ogle et al. |
| 2018/0084424 A1 * | 3/2018 | Sonasath ............... G06Q 10/02 |
| 2018/0098032 A1 | 4/2018 | Fang et al. |
| 2018/0098232 A1 | 4/2018 | Fang et al. |
| 2018/0110093 A1 | 4/2018 | Deros et al. |
| 2018/0124016 A1 | 5/2018 | Ong |
| 2018/0124390 A1 | 5/2018 | Miller et al. |
| 2018/0184149 A1 | 6/2018 | Zerr et al. |
| 2018/0213287 A1 | 7/2018 | Hulse et al. |
| 2018/0220181 A1 | 8/2018 | Ogle et al. |
| 2018/0227599 A1 | 8/2018 | Fang et al. |
| 2018/0240203 A1 * | 8/2018 | Cronin ................ G06Q 50/12 |
| 2018/0242034 A1 | 8/2018 | Ogle et al. |
| 2018/0248972 A1 | 8/2018 | Ahuja |
| 2018/0249188 A1 | 8/2018 | Fang et al. |
| 2018/0255369 A1 | 9/2018 | Zerfas et al. |
| 2018/0270510 A1 | 9/2018 | Fang et al. |
| 2018/0270607 A1 | 9/2018 | Niles |
| 2018/0276771 A1 | 9/2018 | Fang et al. |
| 2018/0288213 A1 | 10/2018 | Bjontegard |
| 2018/0324487 A1 | 11/2018 | Ogle et al. |
| 2018/0332340 A1 | 11/2018 | Ogle et al. |
| 2018/0367543 A1 | 12/2018 | Warrick et al. |
| 2019/0053329 A1 | 2/2019 | Deros et al. |
| 2019/0081811 A1 | 3/2019 | Miller et al. |
| 2019/0098355 A1 | 3/2019 | Fang et al. |
| 2019/0110098 A1 | 4/2019 | Fang et al. |
| 2019/0110101 A1 | 4/2019 | Ogle et al. |
| 2019/0158931 A1 | 5/2019 | Ogle et al. |
| 2019/0342112 A1 * | 11/2019 | Li ................ H04L 12/281 |

OTHER PUBLICATIONS

"Hilton's Connected Room," Dec. 7, 2017, (5 pages), YouTube, [online]. [Retrieved from the Internet Apr. 6, 2020] https://www.youtube.com/watch?v=n0KKG5ZdBq0.

"Hilton Worldwide President & CEO Christopher Nassetta at Skift Global Forum 2017," Oct. 12, 2017, 48 pages, YouTube, [online]. [Retrieved from the Internet Apr. 6, 2020] https://www.youtube.com/watch?v=JjnFDx4ZCAE.

Statement of fact directed to Applicant's experimental activity, 3 pages, May 8, 2020.

* cited by examiner

HOSPITALITY SYSTEM AND METHOD OF USING THE SAME

BACKGROUND

As smart technology continues to evolve, society has become increasingly accustomed to the convenience of being able to control the devices in one's environment from one's own mobile device. While various existing technologies related to in-home smart devices are increasingly a part of modern society, implementing such connected devices into a hospitality environment presents unique challenges. As just one example, existing technologies are frequently limited to an in-home or single-user internet of things (TOT) platform. Such technologies often utilize a singular control device such as a user's personal mobile device to control the various connected devices of the TOT platform.

While such technologies may be configured for repeated use by a single user and can be tailored and/or configured to the preferences and technological capabilities of that user, a single user, repetitive use case is not agreeable with the fleeting, ever-changing, and infinitely unique clientele of the hospitality industry. Existing technologies lack the flexibility to conveniently accommodate the vast array of diverse hotel guests on a large scale. Further, existing technologies often rely on existing hotel internet networks or are dependent on a "cloud" connectivity to control an TOT platform. Such configurations negatively affect the reliability and scalability of an TOT platform.

Further, existing technologies include mobile applications associated with various hospitality enterprises which allow for loyal enterprise customers to control an in-room TOT platform through the mobile application running on a personal mobile device. Often, in order to enable the in-room TOT control platform, a guest must not only have an enterprise customer account with the particular enterprise, but must also have access to a device capable of executing the enterprise mobile application, and be capable and willing to log in to their enterprise customer account prior to each room control session. Existing technologies that are tethered to an enterprise mobile application inherently preclude a large portion of a hotel enterprise's vast and diverse customer base from accessing the in-room TOT control functionality. For example, such an in-room TOT control platform will not be utilized by guests who have never taken the time to set up an enterprise customer account, have forgotten their account credential information, do not have a mobile device capable of executing the enterprise mobile application, or simply wish to avoid spending the time typing in a password to log in to the mobile application and, instead, would prefer to just control the connected devices and the television using the interface at each of the devices and the television remote control, respectively.

Accordingly, a need exists for an IOT platform configured to satisfy the specific needs of the hospitality industry by flexibly providing a customizable in-room environment to all hotel guests in an effective reliable, and scalable manner.

BRIEF SUMMARY

Various embodiments relate to a hospitality system for configuring a hospitality environment. Various embodiments are directed to a hospitality system for configuring a hospitality environment, the system comprising: an enterprise control entity; at least one connected device located in a hospitality environment, the at least one connected device being configurable in at least two connected device statuses; a local control device; and a control module located in the hospitality environment configured to receive one or more communication signals from each of the enterprise control entity, the local control device, and a personal control device; wherein the control module is further configured to receive one or more communication signals from the at least one connected device via a connected device network; wherein the control module is further configured to receive one or more communication signals from the local control device and the personal control device via respective client control networks, each client control network comprising a closed area network; wherein the control module is further configured to receive one or more communication signals such that the enterprise control entity, the local control device, and the personal control device can interchangeably and independently control the at least one connected device.

In various embodiments, the control module may be configured to communicate with the personal control device via a first client control network, and the local control device via a second client control network; wherein the first client control network may comprise a Bluetooth Low Energy (BLE) network and the second client control network may comprise an infrared (IR) network. Further the control module may be configured to transmit one or more communication signals to each of the at least one connected devices, an enterprise control entity and a personal control device. The control module may be configured to transmit a content signal to at least one of the at least one connected devices. The control module may be configured to transmit connected device status data to an enterprise control entity. The control module may be configured to transmit a notice signal in response to receiving a status signal from a connected device of the at least one connected devices. In various embodiments, each of the at least one connected devices is configured to communicate with the control module via a respective connected device network, wherein each of the connected device networks comprises a closed area network. In various embodiments, a communication may signal comprise one or more of a status signal, an instructional signal, an information signal, a content signal, and a notice signal. In various embodiments, the control module is configured to erase guest accommodation data received from the enterprise control entity based at least in part on guest reservation data. The control module may be configured to receive a communication signal from a connected door module associated with the hospitality environment, wherein the communication signal may comprise a status signal corresponding to a door module battery charge level. In such a circumstance, the control module may be configured to transmit the status signal corresponding to the door module battery status to the enterprise control entity The enterprise control entity may be configured to display a connected device status indicator corresponding to a connected device status associated with the at least one connected device. The enterprise control entity may comprise an internet-based interface configured to display connected device status data associated with the control module. The enterprise control entity may be configured to transmit one or more information signals comprising guest accommodation data and room credential data to the control module. In various embodiments, the enterprise control entity is configured to transmit one or more instructional signals to the control module, the one or more instructional signals corresponding to one or more connected device statuses associated with one or more of energy savings data, welcome environment data, and guest preference data. In various embodiments, the enterprise control entity may be configured to receive one or more information signals comprising guest accommodation data from an enterprise computing entity, the guest accommodation data comprising guest reservation data and room credential data.

In various embodiments, an enterprise computing entity may be configured to store application data and guest profile data and communicate with an enterprise mobile application installed on the personal control device via an enterprise mobile application network. The enterprise mobile application may be configured to retrieve the application data and the guest profile data from the enterprise computing entity; and the control module may be configured to receive one or more communication signals from the personal control device via the enterprise mobile application. Guest profile data may comprise control credential data; at least one of the communication signals received by the control module from the personal control device may comprise the control credential data; and the control module may be configured to accept a communication signal transmitted from the personal control device upon verifying the control credential data. Verifying the control credential data may comprise comparing the control credential data to room credential data received by the control module from the enterprise control entity.

Various embodiments of the present invention are directed to systems and methods for configuring a plurality of hospitality environments. Further, various embodiments are directed to systems and methods for configuring a plurality of hospitality environments.

BRIEF DESCRIPTION OF THE DRAWINGS

Reference will now be made to the accompanying drawings, which are not necessarily drawn to scale, and wherein.

DETAILED DESCRIPTION

Figure 1:
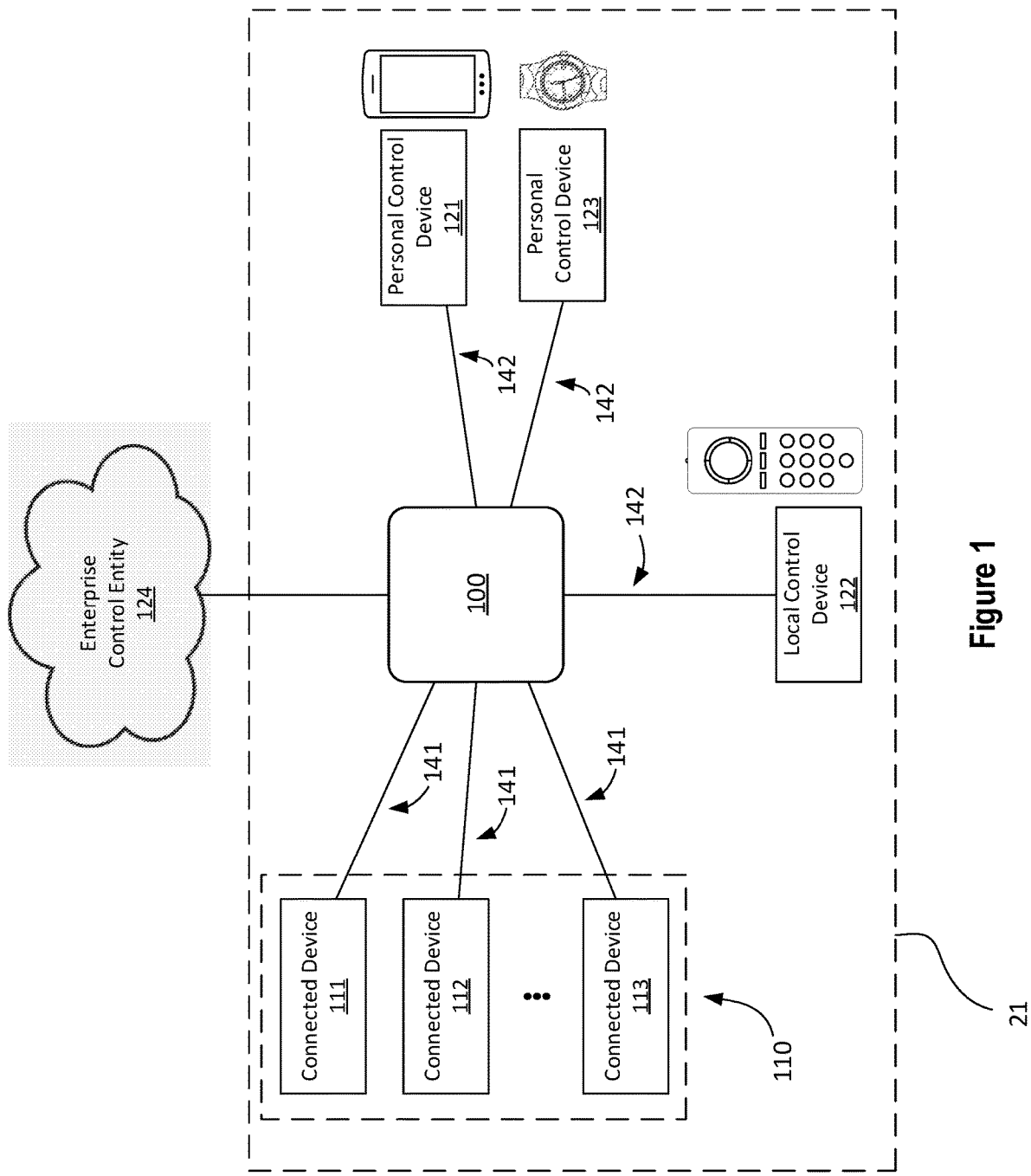
FIG. 1 schematically illustrates data flows among components in accordance with some embodiments discussed herein.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are described below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

I. Overview

Various embodiments are directed to systems and methods for configuring a hospitality environment by using one or more of a plurality of control entities to interchangeably and asymmetrically control at least one connected device located within the hospitality environment.

The present invention comprises a reliable, consistent, self-contained architecture that facilitates enterprise-wide scalability and seamless implementation in a hospitality setting. The hospitality system utilizes an event-driven, hub-and-spoke architecture, enabling a multi-channeled two-way communication between a control module and each of the plurality of connected devices located in the hospitality environment. To control one or more of the in-room connected devices (e.g., thermostats, light switches, etc.), the control module may interchangeably and seamlessly receive input signals from a personal control device (e.g., a guest mobile device executing an enterprise mobile app), an existing local control device, an enterprise control entity, and/or from a guest's direct user input at one of the connected devices. The flexible configuration of the system, wherein any of a plurality of control entities may be used to control the connected devices at any time, affords guests of all ages, backgrounds, and skill levels the ability to comprehensively utilize the in-room control functionality. The control module may communicate with each of the in-room, guest-facing control devices and connected devices using a closed area network, such as, for example, a personal area network. Such a configuration eliminates any internet and/or "cloud" connectivity dependency from a guest's interaction with the system, while still allowing for the control of a plurality of in-room smart devices through one or more user interfaces. Such a configuration ensures a robust, stable system that exhibits a high degree of uptime.

While the in-room control components of the present invention may be configured to eliminate a guest-facing cloud dependency, the present invention maintains communication with an enterprise control entity, which may be configured to control and/or monitor control module activity remotely (such as over the internet or through the cloud) via an enterprise control interface. Any instructional signals received by the control module from any one of the aforementioned control devices (i.e., a personal control device, local control device or input at the connected device) is communicated to the enterprise control entity and may be monitored by a hospitality enterprise employee or other individual so authorized. The enterprise control entity not only displays various connected device status data of each of the connected devices in each of the hospitality environments—and collectively in each of an enterprise's hospitality establishments—but it may also be configured for two-way communication with the control module such that it can control each of the connected devices in the hospitality environment. The enterprise control entity, as well as the personal control device, the local control device, and each of the connected devices may communicate with the control module via various communication networks that are each distinct from a typical guest-facing Wi-Fi network provided by the hospitality establishment, so as to avoid interfering with the quality of the publicly available network's connectivity. The ability of the present invention to control and/or monitor the in-room control module and connected devices facilitates local and enterprise-level benefits with respect to system maintenance, installation, and hardware troubleshooting.

Further, the in-room control module may comprise a singular housing containing circuitries configured to facilitate the execution of both an internet of things control functionality, as described above, and a content delivery functionality. The in-room control module may be connected to the standard in-room television such that a guest may interact with both the content applications—including the standard free-to-guest QAM or IP-delivered cable options—or the TOT connected devices from a single interface displayed on the screen. The single-box content and TOT configuration provides a guest with the functionality of both stacks, while allowing for a minimized hardware footprint, simplified installation procedure, and less-cluttered aesthetic. Similarly, the single-box, dual functionality configuration of the control module as described herein enables one or more singular user interfaces to be displayed at an existing hotel television for convenient, seamless, and user-friendly guest navigation of both the present invention's room configuration and content delivery functionalities.

II. Exemplary System Architecture

FIG. 1 schematically illustrates data flows among various components of an exemplary hospitality system in accordance with some embodiments discussed herein. As shown in FIG. 1, the hospitality system may comprise various components for configuring a hospitality environment 21. For example, as shown in FIG. 1, the hospitality system may comprise a control module 100, at least one connected device 110, an enterprise control entity 124, a local control device 122, and/or the like. In various embodiments, the hospitality system may further comprise an enterprise computing entity and a property computing entity. Various components of the system may be in electronic communication with, for example, another component of the system over various wireless or wired communication networks 140, as described herein. The control module 100 may be configured to communicate with a personal control device 121 executing an enterprise mobile application.

In various embodiments, the hospitality system may be configured to facilitate communication between the control module 100 located in a hospitality environment and each of the other hospitality system components located in the same hospitality environment via a plurality of communication networks between the control module 100 and each of the other components, respectively. The control module 100 may be configured to communicate with each of the at least one connected devices 110 via a respective connected device network 141. Further, the control module 100 may be configured to communicate with the local control device 122, and each personal control device 121, 123 via a respective client control network 142. As described herein, each connected device network 141 and each client control network 142 may comprise a closed area network, such as a personal area network (PAN) or a passive data transmission interface, so as to eliminate any internet and/or "cloud" connectivity dependency from a guest's interaction with the system, while still allowing for the control of a plurality of in-room smart devices through one or more user interfaces. The configuration of various communication networks between the control module 100 and other components located in the hospitality environment may define a hub-and-spoke system architecture. In such circumstances, the control module 100 may be understood to be a "hub" configured to receive and direct communication signal traffic amongst the various components the system and other external devices, such as, for example, a personal control device 121. In various embodiments, the control module 100 may be configured to receive one or more communication signals from the enterprise control entity 124, the local control device 122, a personal control device 121, and each of the at least one connected devices 110. In various embodiments, the one or more communication signals transmitted to and/or from the control module 100 may comprise one or more of a status signal, an instructional signal, an information signal, a content signal, and a notice signal.

It should be understood that while FIG. 1 illustrates certain system entities as separate, standalone entities, the various embodiments are not limited to this particular architecture.

a. Exemplary Control Module

The control module 100 may comprise a singular housing containing circuitries configured to facilitate the execution of both an internet of things (IoT) control functionality and a content delivery functionality. For example, the control module may be referred to as a "set-top box". It should be understood that while a set-top box may be configured to sit on a surface within a hospitality establishment such that it is visible to a guest positioned about the hospitality environment, a set-top-box need not be positioned such that it is visible from a typical guest perspective. In an alternative environment, the control module 100 may be positioned so as to be hidden from a guest's sight. For example, the control module 100 may be attached to the back of an in-room television, placed in a closet of the hospitality environment, or placed within a non-visible compartment of an in-room entertainment center. As designed, the control module 100 may be configured to simplify the retrofitting of a hospitality environment so as to minimize the amount of hardware and/or steps required to convert an ordinary hospitality environment into a hospitality environment capable of being configured according to a guest's input. For example, an ordinary hospitality environment may be retrofitted and converted into a hospitality environment capable of being configured according to a guest's input, as described herein, by replacing an existing set-top box in the hospitality environment with a control module and connecting the control module to the at least one connected devices located in the hospitality environment. The single-box, dual functionality configuration of the control module 100 as described herein enables one or more singular user interfaces to be displayed at an existing hotel television for convenient, seamless, and user-friendly guest navigation of both the present invention's room configuration and content delivery functionalities In various embodiments, the control module 100 may include or be in communication with one or more processing elements (also referred to as processors, processing circuitry, and/or similar terms used herein interchangeably) that communicate with other elements within the control module via a bus, for example. As will be understood, the processing element may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

In one embodiment, the control module 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

Memory media may also be embodied as a data storage device or devices, as a separate database server or servers, or as a combination of data storage devices and separate database servers. Further, in some embodiments, memory media may be embodied as a distributed repository such that some of the stored data is stored centrally in a location within the system and other data is stored in one or more remote locations. Alternatively, in some embodiments, the distributed repository may be distributed over a plurality of remote storage locations only. As a person of ordinary skill in the art would recognize, the data required for the operation of the management system may also be partially stored in the cloud data storage system and partially stored in a locally maintained data storage system.

In one embodiment, the control module 100 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the control module 100 with the assistance of the processing element and an operating system, such as, for example an Android® operating system.

For example, the control module 100 may be configured to temporarily store partial guest accommodation data and/or guest input data, as described herein. In various embodiments, guest input data may be received and/or generated based on one or more signals received by the control module 100 during the duration of the guest's stay which are determined to define user-designated settings or information input by a guest. Guest input data may comprise, for example, guest preference data established during a guest's interaction with the control module 100 (e.g., favorite channels selected by the guest via a connected display device interface, preferred weather report locations, and/or the like), content application credentials (e.g., Netflix password, guest email address, and/or the like), or any other settings input by a guest while interacting with the control module 100. Further, the control module 100 may be configured to execute instructions to erase guest accommodation data and guest input data received and/or generated by the control module 100 and temporarily stored thereon upon it being determined that the guest has checked out of the hospitality environment.

As a further non-limiting example, the control module 100 may be configured to generate and/or receive various performance data related to one or more performance metrics of the control module 100 and various components thereof (e.g., network communication performance, content application run-time, various system failures, operating system updates received from the enterprise control entity, various user interaction data, and/or the like), as described herein. In such circumstances, the control module 100 may be configured to at least temporarily store at least a portion of the performance data on one or memory media described herein. Further, the control module 100 may be configured to execute instructions to transmit at least a portion of the stored performance data to an enterprise control entity 124. The control module 100 may regularly transmit one or both of the various performance data and the connected device status data to the enterprise control entity 124 after a predetermined time interval. For example, the control module 100 may be configured to transmit the various performance data and the connected device status data to the enterprise control entity 124 every five minutes. The control module may be configured to transmit the connected device status data as of it most recent update. That is, the control module 100 may transmit the connected device status data that is stored at the control module 100 at that time, which reflects the status of each of the connected devices as of the last instance in which one of the connected device status was updated.

As indicated, in one embodiment, the control module 100 may also include one or more communication circuitries for communicating with various components of the hospitality system 10. In various embodiments, the communication circuitries may comprise one or more network and/or communications interfaces, such as by communicating data, content, information, and/or similar terms used herein interchangeably that can be transmitted, received, operated on, processed, displayed, stored, and/or the like. The one or more communications interfaces may comprise a hard-wired interface for receiving data (e.g., one or more USB ports, one or more coaxial cable port, an MPI cable port, an IR cable port, an Ethernet port, an HDMI port, an optical fiber port), or the communications interface may be configured for wirelessly receiving data to be stored locally on an onboard memory storage area. Such communication may be executed using a wired or wireless wired data transmission protocol, as described herein. The communication circuitries should be understood to be configured to execute communication to and/or from the control module 100 via each of the connected device networks, client control networks, and enterprise networks described herein.

For instance, the control module 100 may be configured to transmit one or more communication signals to each connected device of the at least one connected device 110, an enterprise control entity 124, and a personal control device 121. Further, the control module 100 may be configured to receive one or more communication signals from each connected device of the at least one connected device 110, an enterprise control entity 124, a local control device 122, and a personal control device 121.

As described herein, a communication signal may comprise a status signal, an instructional signal, an information signal, a content signal, and/or a notice signal according to various embodiments. A status signal may comprise data related to a connected device and a corresponding connected device status. A status signal may comprise data that reflects the connected device status of a connected device at the instant when the signal was transmitted. In various embodiments, a status signal may be transmitted to the control module 100 by a connected device when the connected device status of the connected device has been updated.

As described herein, an instructional signal may comprise data associated with a connected device and a corresponding connected device status. An instructional signal may be indicative of a guest command to change the connected device status of a connected device. For example, an instructional signal may comprise data that reflects a user input from a user at a control interface of an enterprise control entity, a personal control device, or a local control device. For example, an instructional signal may be generated at a personal control device and may be associated with a connected device and a connected device status associated therewith. As a further, non-limiting example, an instructional signal may comprise data related to a user input of "OK" at a local control device 122 that reflects a user selection of an item (e.g., a status, an icon) graphically present within a guest control interface displayed on a connected display device. In such a circumstance, the control module 100 may be configured to receive the instructional signal—for example, via a connected display device acting as a relay for the instructional signal—and, based on a known position of an interface selection indicator (e.g., a cursor) within the guest control interface when the control module received the instructional signal, the control module may generate an instructional signal which corresponds to the action requested by the user.

As described herein, an information signal may comprise data configured to be transferred between components of the hospitality system described herein to be evaluated, analyzed, and/or stored by one or more of the components. An information signal may be indicative of a communication of information between various components. As described herein, a content signal may comprise content data corresponding to content accessible to a guest. Content data may comprise, for example, cable television data and/or content application data. In various embodiments, content signals may be configured to facilitate the content delivery functionality of the control module 100. As described herein, a notice signal may comprise data corresponding to a connected device status data. A notice signal may comprise data such as, for example, a subscription notification, that may be generated by the control module 100 and transmitted to a personal control device 121 and/or the interface circuitry of the control module 100 when a connected device status data is published (i.e. when the connected device status data has changed). The interface circuitry may be configured to generate a guest control interface for display on a connected display device, monitor guest interaction with the guest control interface, and update the one or more connected device status indicators within the guest control interface to accurately reflect one or more current connected device status data. In various embodiments, the interface circuitry of the control module 100 may be configured to receive an instructional signal from a local control device 122—for example, via a connected display device acting as a relay for the instructional signal—representative of a guest command of "OK" at the user interface of the local control device 122. In such a circumstance, the interface circuitry of the control module 100 may be configured to know the position of an interface selection indicator (e.g., a cursor) within the guest control interface at any given time such that the control module 100 may be configured to identify the particular guest control interface option associated with the instructional signal received from the local control device 122. The control module 100 may be configured to generate an instructional signal which corresponds to the action requested by the user.

In various embodiments, a control module 100 may be configured to beacon various identifying data corresponding to the hospitality environment within which it is located. In such a circumstance, a personal control device 121 executing an enterprise mobile application may be configured to receive the identifying data beaconed from the control module 100 and, based at least in part on partial guest profile data retrieved by the personal control device, verify that the control module 100 is the particular control module with which the personal control device 121 is authorized to connect. For example, the personal control device 121 may verify that hospitality environment identified in the identifying data beaconed by the control module 100 is the same as the hospitality environment assigned to a guest according to the partial guest profile data. In such a circumstance, upon verifying that the identifying data recognized by the personal control device 121 was beaconed from the control module 100 with which the personal control device 121 is authorized to connect, the personal control device 121 executing the enterprise mobile application may transmit control credential data to the control module 100.

In various embodiments, the control module 100 may comprise content circuitry configured to facilitate the content delivery functionality of the control module 100. In various embodiments, the content circuitry may be embodied as one or more components configured to receive, transmit, and/or store various content data as described herein. For example, the content circuitry may be configured to receive a cable television data delivered to the control module 100 via a coax cable using a QAM protocol. The control module 100 may be configured to receive content data using an internet-based communication protocol. For instance, the control module 100 may be configured to receive content application data and/or content on-demand data from an external computing entity via a wired Ethernet connection. The control module 100 may comprise a tuner configured to receive cable television data received by the control module 100 and process the various data so as to configure it to be transferred to a connected device for display. As described herein, the content circuitry of the control module 100 may be configured to transmit various content data to one or more connected devices, such as, for example, a connected display device, via a content signal. Further, the content circuitry may be configured to communicate with the media as described herein in order to execute one or more content applications (e.g., Netflix, Hulu, Spotify). Such content apps may be designed to execute on the operating system of the control module, and the content application data associated therewith may, in various embodiments, be transferred to a connected device for display on a guest-facing interface. Although various embodiments are discussed herein as utilizing a specially configured software app executable on a customer's computing entity to receive and/or process data from various beacons, it should be understood that such functionality may be made a part of a computing entity operating system, firmware, and/or the like. Further, the content circuitry of the control module 100 may be configured to communicate with one or more other components of the control module 100. For example, the content circuitry may be required to generate, transmit, and/or execute one or more content signals in response to an instructional signal received by the control module 100 in response to user input received as a result of a guest's interaction with a guest control interface displayed on a connected display device, as described herein.

As will be appreciated, one or more of the control module's 100 components may be located remotely from the control module 100 housing. Furthermore, one or more of the components may be aggregated and additional components performing functions described herein may be included in the control module 100. Thus, the control module 100 can be adapted to accommodate a variety of needs and circumstances. For example, in various embodiments, the control module may comprise an IR receiver configured to receive signals transmitted using an infrared protocol from a local control device 122. Alternatively, in various embodiments, the control module may be connected to an infrared receiver configured to receive signals transmitted using an infrared protocol from a local control device 122 and transmit the received infrared signal directly to the control module 100. In such a circumstance, the infrared receiver acts as a relay for the instructional signal received from the local control device 122. In various embodiments, the infrared receiver may be a stand-alone component in communication with the control module 100. Alternatively, the connected display device may comprise an infrared receiver and may be configured to transmit one or more signals received from a local control device 122 using an infrared protocol directly to the control module 100.

b. Exemplary Connected Devices

The at least one connected device may comprise a configurable device located in a hospitality environment and configured to communicate with a control module 100 located in the same hospitality environment such that it may be configured based on user input at a control entity, as described herein. The at least one connected device may be configurable in at least two connected device statuses. The at least one connected device may comprise a user interface and may be configured to receive user input and update its corresponding status accordingly. In such a circumstance, as described herein, the at least one connected device may be configured within the hospitality system such that a change in connected device status as a result of user input at the connected device results is reflected as a connected device status indicator at the various control interfaces of the at least one control entity, as if the user input came at the control entity itself. The at least one connected device 110 may comprise any number of connected devices configured to function within the hospitality system disclosed herein.

In various embodiments, the at least one connected device 110 may comprise a connected temperature device. A connected temperature device may be configured to determine and/or control the ambient temperature within a hospitality environment. For example, a connected temperature device may comprise a thermostat and/or an HVAC system configured to determine, set, and/or change the ambient temperature of a hotel room. A connected temperature device may be configurable in a plurality of connected device statuses. For example, each of the plurality of connected device statuses associated with the connected temperature device may correspond to a different temperature setting, such as, for example, 72°. In various embodiments, the connected temperature device may comprise a user interface (e.g., buttons and/or a touch screen) configured to receive user input corresponding to a command to update the connected device status. Further, in various embodiments, the connected temperature device may have a screen configured to display a connected device status of the connected temperature device.

The at least one connected device 110 may comprise a lighting control device. A lighting control device may be configured to control the electrical lighting within a hospitality environment. For example, a lighting control device may comprise one or more light bulbs and a smart light switch, the smart light switch being in communication with the control module 100. In various embodiments, a lighting control device maybe configurable in a plurality of connected device statuses depending on the number of light sources in the room and connected to the lighting control device. The plurality of connected device statuses associated with the lighting control device may comprise, as non-limiting examples, "Main Light—On," "Main Light—Off,"

"Mood Light—On," "Mood Light—Off," "Desk Lamp—On," "Desk Lamp—Off," and/or the like. In various embodiments, the lighting control device may comprise a user interface (e.g., switches and/or a touch screen) at the smart light switch configured to receive user input corresponding to a command to update the connected device status. Further, each of the lighting sources may comprise, for example, a smart light bulb, and may be individually in direct communication with the control module 100 via respective connected device networks.

In various embodiments, the at least one connected device 110 may comprise a connected display device. A connected display device, as described herein, may be configured to display various content and/or a guest control interface. For example, a connected display device may comprise a television configured to display cable television programming, play music or other content via a content application executed by the control module, and/or display a connected device status indicator. A connected display device maybe configurable in a plurality of connected device statuses. For example, the plurality of connected device statuses associated with the connected display device may comprise, as non-limiting examples, "On," "Off," "Volume—24%," "Channel—44," "Application in use—Spotify," and/or the like. In various embodiments, a connected display device may be configured to receive instructional signals corresponding to a connected device status such as, for example, "Volume—24%," from a control module 100 via a connected device network, such as, for example, by an MPI or HDMI connection. Further, a connected display device may be configured to receive display data generated at the interface circuitry of a control module 100 via the same connected device network. The connected display device may comprise a user interface (e.g., buttons) configured to receive user input corresponding to a command to update the connected device status. In various embodiments, a connected display device may be a preexisting television located within a hospitality environment and, in a circumstance wherein a hospitality environment is retrofit to provide IOT control functionality, may be configured to be operable within the present invention by being connected to the control module 100 via a connected device network, such as, for example, by an MPI or HDMI connection. In various embodiments, the connected display device may comprise an infrared receiver and may be configured to receive one or more instructional signals from a local control device using an infrared protocol and transmit the one or more received signals directly to the control module 100. In such a circumstance, the control display device may act as a relay through which a local control device may communicate with the control module.

In various embodiments, the hospitality system may comprise a connected door module located a door positioned at an exit of the hospitality environment. A door control module may include battery-powered lock be configured to selectively lock or unlock a door to a hospitality environment. A door control module may be configured in a plurality of connected device statuses. For example, the plurality of connected device statuses associated with the door control module may comprise "locked" or "unlocked." As a further example, each of the plurality of connected device statuses associated with the door control module may correspond to a different door module battery charge level, such as, for example, 45%. In various embodiments, the connected door module may comprise a user interface (e.g., buttons and/or a knob) configured to receive user input corresponding to a command to update the connected device status.

The exemplary connected devices are included as non-limiting examples of connected devices configured to comprise a component of the hospitality system. As referenced above, a connected device may comprise any device suitable to exist within the hospitality system as described herein, such as, for example, blinds, a door lock, a refrigerator, an alarm clock, and/or the like.

Each of the at least one connected devices 110 (e.g., 111, 112, 113) may be configured to transmit one or more communication signals to the control module 100. Further, each of the at least one connected devices 110 (e.g., 111, 112, 113) may be configured to receive one or more communication signals from the control module 100. Each of the at least one connected devices 110 (e.g., 111, 112, 113) may be configured to communicate with the control module 100 via a respective connected device network. Each of the connected device networks may comprise a closed area network. In various embodiments, each of the connected device networks may comprise either a wired or wireless personal area network. As described herein, in various embodiments, each of the connected device networks may be configured so as to facilitate a transmission of one or more communication signals directly between the control module 100 and each of the at least one connected devices 110 without any additional remote server and/or "cloud" dependency.

c. Exemplary Control Entities and Devices

A control module 100 located in a hospitality environment may be configured to receive one or more communication signals from each of an enterprise control entity 124, a local control device 122, and a personal control device 121 such that each can interchangeably and independently control a connected device located in the hospitality environment. As described herein, the hospitality system may maintain symmetric control capability among each of the enterprise control entity 124, the local control device 122, and the personal control device 121, while allowing for asynchronous, asymmetric, and multi-sourced control of the control module 100.

As described herein, the control module 100 may be configured to communicate with one or more personal control devices 121, 123 and a local control devices 122 via respective client control networks. Each of the client control networks may comprise a closed area network. In various embodiments, each of the client control networks may comprise a wireless personal area network, as described herein. Each of the client control networks may be configured so as to facilitate a transmission of one or more communication signals directly between the control module 100 and the respective control device (e.g., 121, 122, 123) without any additional remote server and/or "cloud" dependency. In various embodiments, the enterprise control entity 124 may be configured to communicate with the control module 100 via an enterprise control network. In various embodiments, the enterprise control network may comprise an internet-based network, as described herein.

i. Personal Control Device

In various embodiments, a personal control device 121 may include, without limitation, smart phones, tablet computers, laptop computers, wearables (e.g., a smart watch), personal computers, and the like. A personal control device may execute an "app" to interact with one or more components of the hospitality system 10, such as, for example, control module 100 and the enterprise computing entity 150. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. In various embodiments, a personal control device may comprise computer hardware and/or software that is configured to access a service made available by a server, such as an enterprise computing entity 150. The server is often (but not always) on another computer system, in which case the personal control device may access the service by way of a communication network, such as, for example, an enterprise mobile application network. It should be understood with respect to various functionalities of the personal control device described herein, that in various embodiments, the described functionality (e.g., verifying identifying data beaconed from a control module, generating an instructional signal corresponding to a connected device status of a particular connected device) may be carried out be an enterprise mobile application being executed on the personal control device 121 rather than the actual device itself.

ii. Local Control Device

In various embodiments, the hospitality system may comprise a local control device located within a hospitality environment. A local control device may be, for example, a television remote control associated with a television located within a hospitality establishment. The local control device may comprise a guest control interface, which may comprise either mechanical or digital buttons corresponding to various available user inputs. In various embodiments, the local control device may comprise a screen configured to display the guest control interface. The local control device may comprise a preexisting television remote control located in a hospitality environment configured for one-way communication with a television located in the hospitality environment.

In various embodiments, a local control entity may be configured to communicate with one or more components of the hospitality system, such as, for example, the control module 100 via a client control network, as described herein. The client control network may comprise a closed area network, which may be a personal area network, such as, for example, an infrared (IR) network or a Bluetooth network.

iii. Enterprise Control Entity

The enterprise control entity 124 may comprise an internet-based interface configured to facilitate enterprise-level monitoring and/or control of the at least one connected device 110. In various embodiments, the enterprise control entity may comprise a platform as a service (PaaS) cloud service. The enterprise control entity 124 may comprise one or more application programable interfaces (API), such as, for example, a REST API, for communicating with various computing entities, such as a control module 100 and an enterprise computing entity 150. The enterprise control entity 124 may be operable as a "private cloud" interface accessible only to authorized staff of a hospitality enterprise. For example, the enterprise control entity 124 may be configured to receive one or more communication signals from the enterprise computing entity 150. As a further, non-limiting example, the enterprise control entity 124 may be configured to transmit and receive one or more communication signals to a control module 100 or a plurality of control modules by communicating data, content, information, and/or similar terms used herein interchangeably that can be transmitted, received, operated on, processed, displayed, stored, and/or the like. The enterprise control entity 124 may be configured to receive one or both of various performance data and connected device status data transmitted from a control module 100. The enterprise control entity 124 may be configured to display various connected device status data associated with a control module 100 of a hospitality environment. The various connected device status data displayed by the enterprise control entity 124 may comprise a connected device status indicator corresponding to a connected device status associated with each of the at least one connected devices 110. The enterprise control entity 124 may be configured to display various connected device status data associated with a plurality of control modules 100 each associated with a respective hospitality environment of a plurality of hospitality environments. Further, the enterprise control entity 124 may be configured to display various connected device status data associated with a plurality of control modules 100 each associated with a respective hospitality environment of a hospitality enterprise. In various embodiments, the hospitality enterprise may comprise a plurality of hospitality establishments (e.g., a chain of hotels), each hospitality establishment comprising one or more hospitality environments.

d. Exemplary Enterprise Computing Entity

Figure 2:
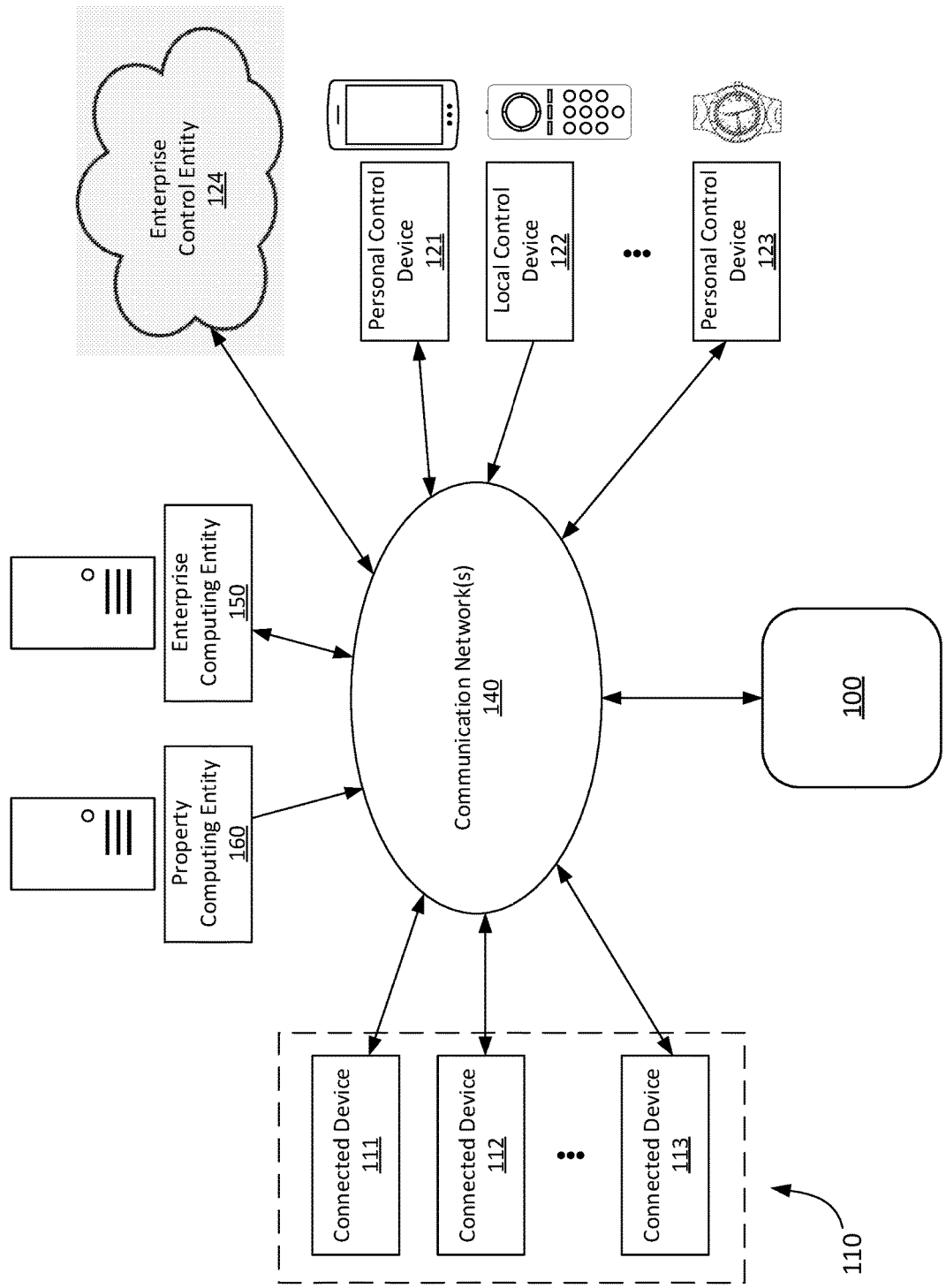
FIG. 2 schematically illustrates an exemplary network communication architecture in accordance with various embodiments.

FIG. 2 provides an illustration of a hospitality system that can be used in conjunction with various embodiments of the present invention. As shown in FIG. 2, the hospitality system may comprise an enterprise computing entity 150. The enterprise computing entity 150 may comprise an enterprise server associated with a hospitality enterprise (e.g., a chain of hotels) comprising one or more hospitality establishments (e.g., a hotel), each hospitality establishment comprising one or more hospitality environments (e.g., guest rooms). In various embodiments, the enterprise computing entity 150 may comprise the enterprise control entity 124, which may be accessed by authorized hospitality enterprise employees or other authorized individuals (e.g., hospitality establishment owners), as described herein. The enterprise computing entity may be configured to store and/or transmit application data, energy savings data, welcome environment data, guest accommodation data, and/or guest profile data.

Energy savings data may comprise one or more connected device status data associated with one or more connected device statuses determined to increase the efficiency of energy consumption by the at least one connected device located within a hospitality environment. For example, energy savings data may comprise connected device status data associated with a connected temperature device and a corresponding connected device status thereof, such as, as a non-limiting example, 63° F. In various embodiments, one or more instructional signals corresponding to the connected device status data defined by the energy savings data may be transmitted from the enterprise control entity 124 to the control module 100. For example, the one or more instructional signals corresponding to the connected device status data defined by the energy savings data may be transmitted to the control module 100 located in a hospitality environment when the hospitality environment is unoccupied.

Welcome environment data may comprise one or more connected device status data associated with one or more connected device statuses determined to establish welcoming scene within a hospitality environment prior to a guest's arrival at the environment. For example, welcome environment data may comprise connected device status data associated with a lighting control device and a corresponding connected device status thereof, such as, as a non-limiting example, "Mood Light—On". In various embodiments, one or more instructional signals corresponding to the connected device status data defined by the welcome environment data may be transmitted from the enterprise control entity 124 to the control module 100. For example, the one or more instructional signals corresponding to the connected device status data defined by the welcome environment data may be transmitted to the control module 100 located in a hospitality environment prior to a guest's entry into the environment.

Application data may comprise data utilized to execute an app on a guest personal client computing entity (e.g., mobile phone). In various embodiments, guest profile data may comprise data associated with an enterprise guest profile associated with an enterprise customer, such as, for example, guest name data, guest history data, guest preference data, room credential data, and control credential data. A personal control device executing an enterprise mobile application may be configured to retrieve various guest profile data such as, for example, guest preference data associated with a guest's favorite television channel preferences or preferred content application data from a third-party content server. In various embodiments, guest preference data may comprise one or more connected device status data associated with one or more connected device statuses pre-selected by a guest via a mobile app as being a preferred setting.

Room credential data and control credential data may each comprise, for example, a password, a public key, a private key, and/or the like. In various embodiments, the room credential data and the control credential data may each comprise, at least in part, various data associated with a guest's reservation, such as, for example, check-in time, check-in status, check-out time, check-out status, length of stay, and/or assigned environment room number. In various embodiments, room credential data and control credential data may comprise either the same data or different data. Room credential data and control credential data associated with an enterprise guest profile may exclusively correspond to one another so as to facilitate the authorization of a signal associated with guest's personal control device. For example, the control credential data may serve as a cryptographic key in combination with the room credential data to verify that a personal control device attempting to control a connected device via a control module is authorized to do so. In various embodiments, an enterprise computing entity may be configured to generate control credential data and/or room credential data to be associated with a guest profile. Alternatively, an enterprise computing entity may be configured to receive control credential data and/or room credential data from one or both of a secure third-party credential entity and a property computing entity.

The enterprise computing entity 150 may be embodied as a computer or computers. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the enterprise computing entity 150 may also include one or more network and/or communications interfaces for communicating with various components, such as by communicating data, content, information, and/or similar terms used herein interchangeably that can be transmitted, received, operated on, processed, displayed, stored, and/or the like. For instance, the enterprise computing entity 150 may provide for receiving of electronic data from various sources, including but not necessarily limited to a property computing entity 160. As a further non-limiting example, the enterprise computing entity 150 may provide for transmitting of electronic data to various sources, including but not necessarily limited to the enterprise control entity 124.

In one embodiment, the enterprise computing entity 150 may include or be in communication with one or more processing elements (also referred to as processors, processing circuitry, and/or similar terms used herein interchangeably) that communicate with other elements within the enterprise computing entity 150 via a bus, for example. As will be understood, the processing element may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

In one embodiment, the enterprise computing entity 150 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database enterprise system entity, and/or similar terms used herein interchangeably may refer to a structured collection of records or information/data that is stored in a computer-readable storage medium, such as via a relational database, hierarchical database, and/or network database.

Memory media may also be embodied as a data storage device or devices, as a separate database server or servers, or as a combination of data storage devices and separate database servers. Further, in some embodiments, memory media may be embodied as a distributed repository such that some of the stored data is stored centrally in a location within the system and other data is stored in one or more remote locations. Alternatively, in some embodiments, the distributed repository may be distributed over a plurality of remote storage locations only. As a person of ordinary skill in the art would recognize, the data required for the operation of the enterprise computing entity 150 may also be partially stored in the cloud data storage system and partially stored in a locally maintained data storage system.

In one embodiment, the enterprise computing entity 150 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the enterprise computing entity 150 with the assistance of the processing element and operating system.

As indicated, in one embodiment, the enterprise computing entity 150 may utilize one or more network and/or communications interfaces for communicating with various hospitality system components, such as by communicating data, content, information, and/or similar terms used herein interchangeably that can be transmitted, received, operated on, processed, displayed, stored, and/or the like. For instance, the enterprise computing entity 150 may be configured to communicate with computing entities, system components, and/or the like. As discussed herein, the enterprise computing entity 150 may communicate with a property computing entity 160, an enterprise control entity 124, and a personal control device 121 via an enterprise property network, an enterprise corporate network, and an enterprise mobile application network, respectively.

e. Exemplary Property Computing Entity

As illustrated in FIG. 2, the hospitality system may further comprise a property computing entity 160. The property computing entity 160 may comprise a property management system associated with a hospitality establishment (e.g., a hotel) comprising one or more hospitality environments (e.g., guest rooms). In various embodiments, a hospitality enterprise (e.g., a chain of hotels) may comprise one or more property computing entities, each of which is associated with a respective hospitality establishment of the hospitality enterprise. The hospitality enterprise may license to a hospitality establishment one or more hotel enterprise assets, such as, for example, the branding and various technologies associated with the hospitality enterprise. As described herein, partial access to an enterprise control entity 124 may be licensed to one or more owners and/or employees of a hospitality establishment such that the one or more owners and/or employees of a hospitality establishment may be authorized to control the one or more hospitality environments present within the hospitality establishment. The one or more owners and/or employees of the hospitality establishment may control the property computing entity.

A property computing entity 160 may be configured to store and/or transmit various data associated with the hospitality establishment and/or guests thereof, such as, for example, energy savings data, welcome environment data, and/or guest accommodation data. In various embodiments, guest accommodation data may comprise guest reservation data and/or guest profile data. Guest reservation data may comprise informational data related to a guest's reservation, such as, for example, check-in time, check-in status, check-out time, check-out status, length of stay, establishment name, and/or assigned environment room number. As described herein, guest profile data may comprise data associated with an account and/or profile associated with an enterprise customer, such as, for example, guest name data, guest history data, guest status data, guest preference data, room credential data, and/or control credential data. In various embodiments, guest preference data may comprise one or more connected device status data associated with one or more connected device statuses pre-selected by a guest via a mobile app as being a preferred setting. Guest preference data may be collected through an enterprise mobile application via user input by a guest. In various embodiments, a property computing entity may be configured to generate control credential data and/or room credential data to be associated with a guest profile. Alternatively, a property computing entity may be configured to receive control credential data and/or room credential data from a secure third-party credential entity.

The property computing entity 160 may be embodied as a computer or computers. As indicated, in one embodiment, the property computing entity 160 may also include one or more network and/or communications interfaces for communicating with various components, such as by communicating data, content, information, and/or similar terms used herein interchangeably that can be transmitted, received, operated on, processed, displayed, stored, and/or the like. For instance, the property computing entity 160 may provide for the communication of electronic data from various sources, including but not necessarily limited to an enterprise computing entity 150.

In one embodiment, the property computing entity 160 may include or be in communication with one or more processing elements (also referred to as processors, processing circuitry, and/or similar terms used herein interchangeably) that communicate with other elements within the property computing entity 160 via a bus, for example. As will be understood, the processing element may be embodied in a number of different ways. For example, the processing element may be embodied as one or more complex programmable logic devices (CPLDs), microprocessors, multi-core processors, coprocessing entities, application-specific instruction-set processors (ASIPs), and/or controllers. Further, the processing element may be embodied as one or more other processing devices or circuitry. The term circuitry may refer to an entirely hardware embodiment or a combination of hardware and computer program products. Thus, the processing element may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element may be configured for a particular use or configured to execute instructions stored in volatile or non-volatile media or otherwise accessible to the processing element. As such, whether configured by hardware or computer program products, or by a combination thereof, the processing element may be capable of performing steps or operations according to embodiments of the present invention when configured accordingly.

In one embodiment, the property computing entity 160 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database enterprise system entity, and/or similar terms used herein interchangeably may refer to a structured collection of records or information/data that is stored in a computer-readable storage medium, such as via a relational database, hierarchical database, and/or network database.

Memory media may also be embodied as a data storage device or devices, as a separate database server or servers, or as a combination of data storage devices and separate database servers. Further, in some embodiments, memory media may be embodied as a distributed repository such that some of the stored data is stored centrally in a location within the system and other data is stored in one or more remote locations. Alternatively, in some embodiments, the distributed repository may be distributed over a plurality of remote storage locations only. As a person of ordinary skill in the art would recognize, the data required for the operation of the property computing entity 160 may also be partially stored in the cloud data storage system and partially stored in a locally maintained data storage system.

In one embodiment, the property computing entity 160 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like may be used to control certain aspects of the operation of the property computing entity 160 with the assistance of the processing element and operating system.

As indicated, in one embodiment, the property computing entity 160 may also include one or more network and/or communications interfaces for communicating with various hospitality system components, such as by communicating data, content, information, and/or similar terms used herein interchangeably that can be transmitted, received, operated on, processed, displayed, stored, and/or the like. For instance, the property computing entity 160 may be configured to communicate with computing entities, system components, and/or the like. As discussed, the property computing entity 160 may communicate with an enterprise computing entity 150 via an enterprise property network.

f. Exemplary Communication Networks

In various embodiments, the various communications networks may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities. In various embodiments, the communications networks may utilize a variety of networking protocols now available or later developed including, but not limited to TCP/IP based networking protocols. For instance, the networking protocol may be customized to suit the needs of the hospitality system. In some embodiments, the protocol is a custom protocol of JSON objects sent via a Websocket channel. In some embodiments, the protocol is JSON over RPC, JSON over REST/HTTP, and the like.

The communication networks may comprise one or more of a connected device network, a client control network, an enterprise control network, an enterprise mobile application network, an enterprise corporate network, and an enterprise property network. As described herein, each of the connected device networks, client control networks, and enterprise control networks of the hospitality system are configured so as to avoid interference with any guest-accessible internet-based network, such as, for example, guest-accessible Wi-Fi network, and/or any other guest-facing network controlled by a hospitality establishment. A communication network, such as, for example, a connected device network and/or a client control network, may be a closed area network. A closed area network should be understood to comprise a wired or wireless communication network configured to transmit data between various components without utilizing an internet connection. For example, a closed area network may comprise a personal area network utilizing Bluetooth communication protocols. As a further non-limiting example, a closed area network may comprise a passive data transmission interface configured to transmit, for example, content data from a control module directly to a connected display device. In various embodiments, a passive data transmission interface may comprise, for example, a multi-point interface MPI, HDMI, and/or a USB connection.

In various embodiments, each of the at least one connected devices (e.g., 111, 112, 113) may be configured to communicate with the control module 100 via a respective connected device network. Each of the connected device networks may comprise a wired or wireless communication network configured to utilize a variety of protocols to transmit instructions and/or other data. Each of the connected device networks may comprise a closed area network, as described herein. In various embodiments, each of the connected device networks may comprise either a wired or wireless personal area network. For example, at least one of the at least one connected devices 111 may be configured to transmit a communication signal to the control module 100 via a connected device network comprising a Zigbee network, wherein the connected device 111 may communicate with the control module 100 using, at least in part, a Zigbee wireless protocol. Further, for example, at least one of the at least one connected devices 112 may be configured to transmit a communication signal to the control module 100 via a connected device network comprising a wired network, wherein the connected device 112 may communicate with the control module 100 using a wired multi-point interface (MPI) connection. In various embodiments, a connected device network may comprise a wired network for receiving data that utilizes USB, MPI, HDMI, and/or optical fiber connections to communicate data. Further, in various embodiments, a connected device network may be a wireless network that utilizes ultra wideband (UWB), infrared (IR) protocols, near field communication (NFC) protocols, Wibree, Bluetooth protocols, Zigbee protocols, wireless universal serial bus (USB) protocols, and/or any other wireless protocol to communicate data. Each of the connected device networks may be configured so as to facilitate a transmission of one or more communication signals directly between the control module 100 and a respective connected device (e.g., 111, 112, 113) without any additional remote server and/or "cloud" dependency.

The control module 100 may be configured to communicate with one or more personal control devices (e.g., 121, 123) and a local control device 122 via respective client control networks. Each of the client control networks may comprise a closed area network, as described herein. In various embodiments, each of the client control networks may comprise a wireless personal area network. For example, in various embodiments, a personal control device 121 is a guest's mobile device configured to execute an enterprise mobile application and transmit a communication signal to the control module 100 via a client control network comprising a Bluetooth Low Energy (BLE) network, wherein the personal control device 121 may communicate with the control module 100 using, at least in part, a Bluetooth Low Energy (BTLE) wireless protocol. Further, for example, the local control device 122 may be a television remote control configured to transmit a communication signal to the control module 100 via a client control network comprising an infrared (IR) network, wherein the local control device 122 may communicate with the control module 100 using, at least in part, an IR wireless protocol.

In various alternative embodiments, it should be understood that a local control device 122 comprising a television remote control may be configured to transmit one or more communication signals using, at least in part, Bluetooth, Bluetooth Low Energy (BTLE), Wi-Fi, or any other wireless connection. In various embodiments, a client control network may comprise a wireless communication network configured to utilize a variety of protocols, such as ultra wideband (UWB), infrared (IR) protocols, near field communication (NFC) protocols, Wibree, various Bluetooth protocols, Zigbee protocols, wireless universal serial bus (USB) protocols, and/or any other wireless protocol. Each of the client control networks may be configured so as to facilitate a transmission of one or more communication signals directly between the control module 100 and the respective control device (e.g., 121, 122, 123) without any additional remote server and/or "cloud" dependency.

The enterprise control entity 124 may be configured to communicate with the control module 100 via an enterprise control network. In various embodiments, the enterprise control network may comprise an internet-based network. The enterprise control entity 124 may be configured to transmit a communication signal to the control module 100 via an enterprise control network using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In various embodiments, the enterprise control network may comprise a wireless external communication network using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB) and/or any other wireless protocol. In various embodiments, the enterprise control entity 124 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

The enterprise computing entity 150 may be configured to communicate with a property computing entity 160, an enterprise control entity 124, and a personal control device 121 via an enterprise property network, an enterprise corporate network, and an enterprise mobile application network, respectively. In various embodiments, an enterprise property network, an enterprise corporate network, and an enterprise mobile application network may comprise any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks.

Although described herein as being configured to comprise singular communication networks, it should be understood that the communication networks may comprise one or more channels. Further, although described herein as being configured to utilize singular communication protocols, it should be understood that the communication networks as described herein may comprise one or more protocol stack layers. As a non-limiting example, a client control network may comprise a Bluetooth Low Energy (BLE) network, wherein a personal control device may communicate with a control module 100 using a Bluetooth (e.g., BLE) wireless protocol. Further, the client control network may be configured to support a GATT layer to facilitate the appropriate distribution of data and/or signals at the control module 100.

III. Exemplary Hospitality Environment

Figure 3:
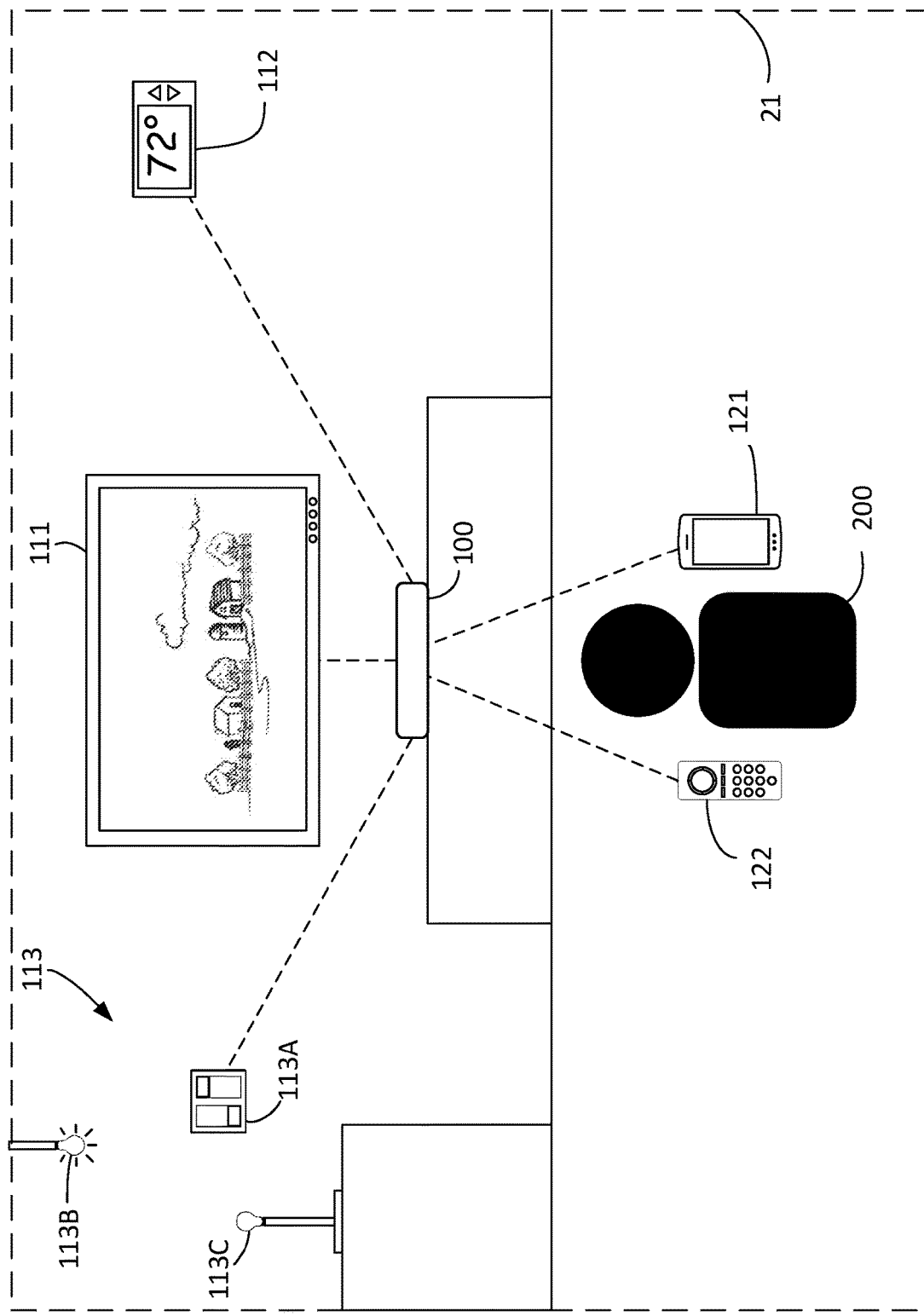
FIG. 3 illustrates a perspective view of an exemplary hospitality environment according to an embodiment.
Figure 4:
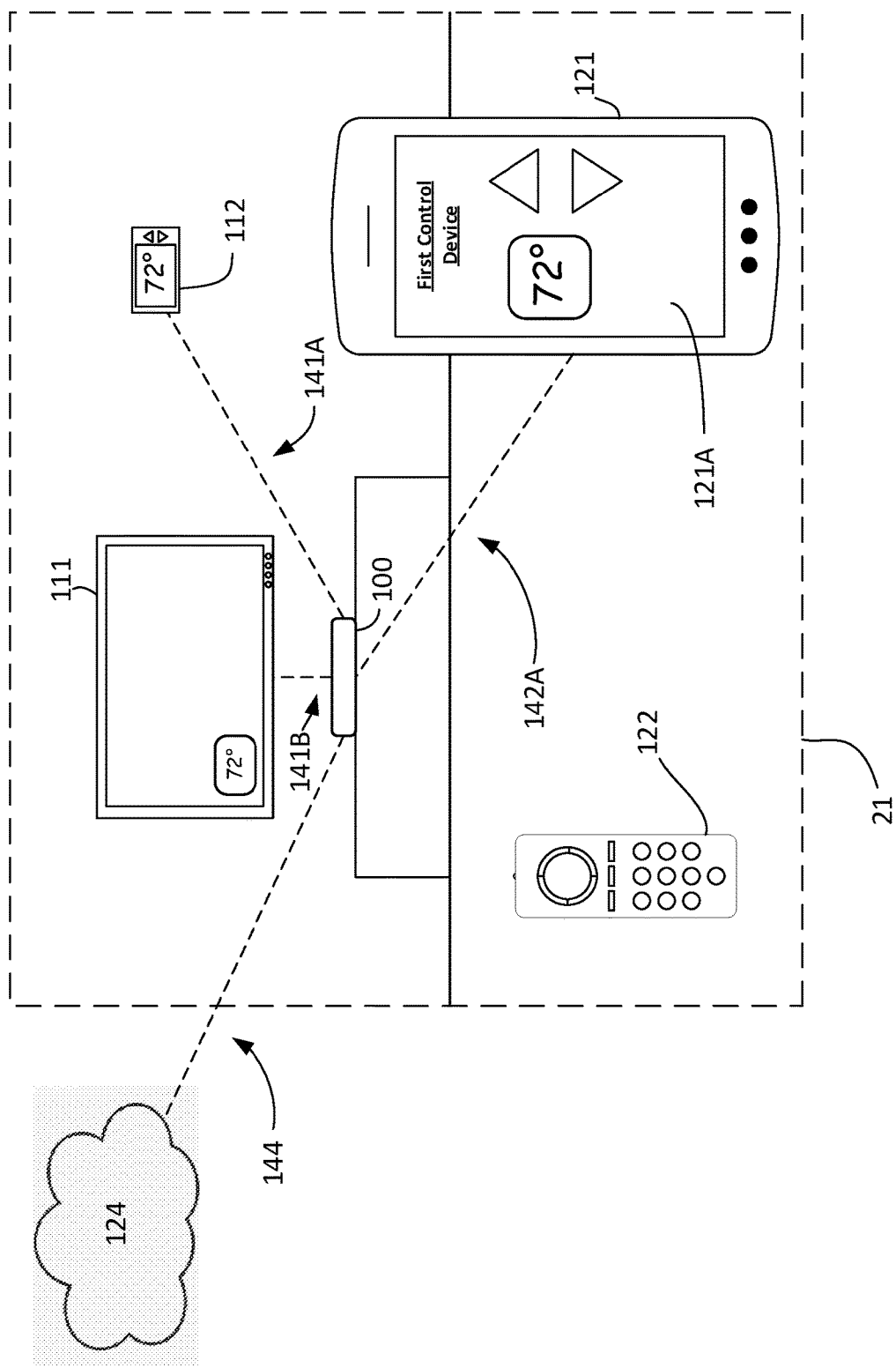
FIG. 4 illustrates a perspective view of an exemplary hospitality environment according to an embodiment.
Figure 5:
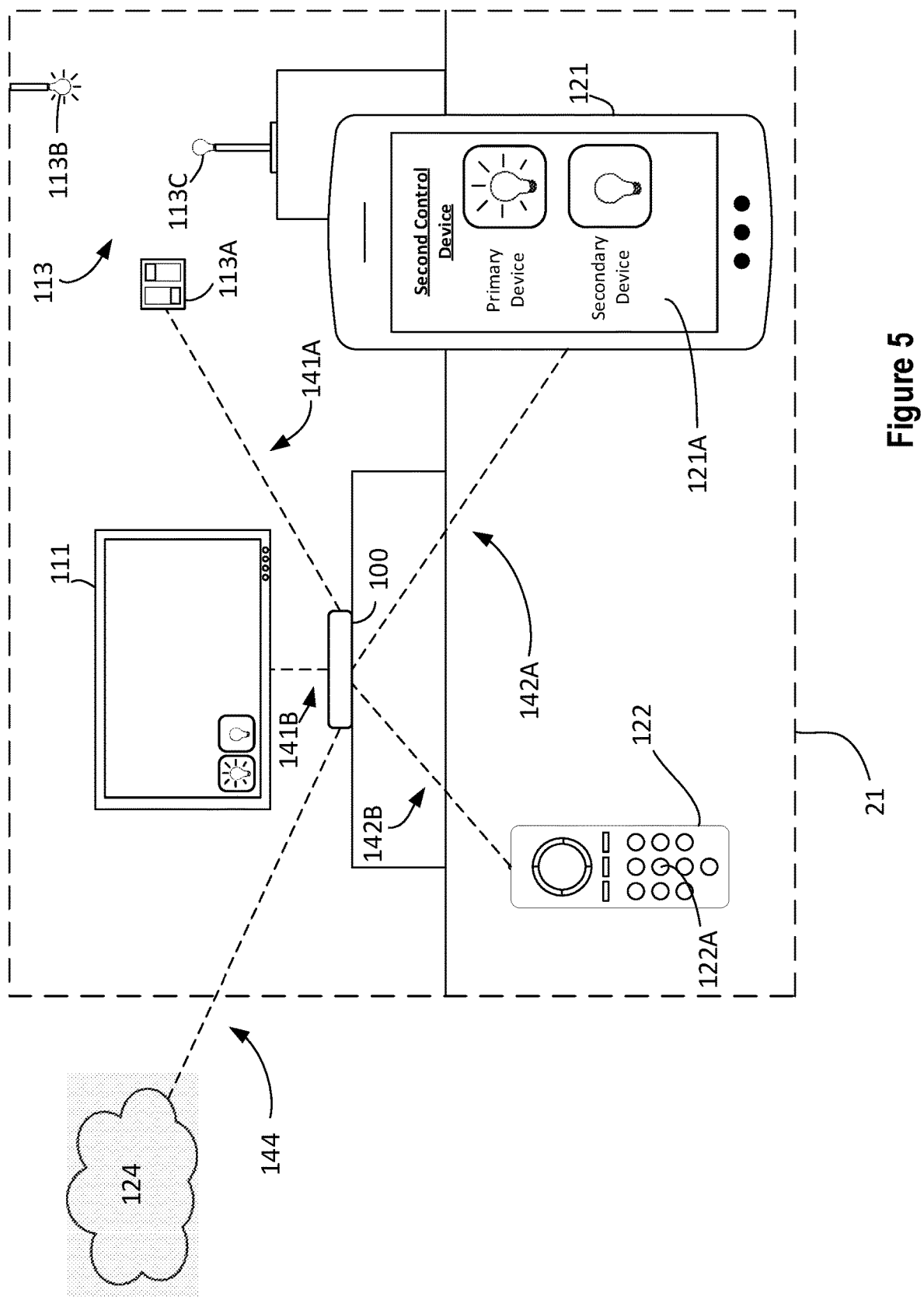
FIG. 5 illustrates a perspective view of an exemplary hospitality environment according to an embodiment.

FIGS. 3-5 illustrate perspective views of various exemplary hospitality environments according to various embodiments. As illustrated in FIGS. 2-5, a hospitality system may comprise various components for configuring a hospitality environment 21. A hospitality environment 21 may comprise an area of temporary occupancy within a hospitality establishment that is reserved by one or more guests for a predetermined length of stay. In various embodiments, a hospitality environment 21 may be a hotel room. In such circumstances, a hospitality establishment may comprise a hotel. While a hospitality environment 21 may be understood to be a hotel room, it should not be limited to environments configured as single rooms, but rather may further be understood to be an environment temporarily occupied by a single guest, family, or set of associated guests, that comprises multiple rooms, such as, for example, a multi-room hotel suite, a condominium, an apartment, and/or the like.

Various components of the hospitality system may be arranged either within the hospitality environment 21 and/or remote to the hospitality environment 21. For example, a control module 100 may be located within the hospitality environment 21. Further, in various embodiments, each of the at least one connected devices (e.g., 111, 112, 113) and a local control device 122 may be located within the hospitality environment 21. Further, one or more personal control devices (e.g., 121, 123) may be located within the hospitality environment 21. As described herein, the enterprise control entity may comprise an internet-based interface configured to communicate with the control module 100 located within a hospitality environment 21 in order to facilitate remote enterprise-level monitoring and/or control of the at least one connected device located in the hospitality environment 21.

As illustrated in FIG. 3, the control module 100, the at least one connected device, a local control device 122, and a personal control device 121 are located within the hospitality environment 21. As shown, the at least one connected devices comprises a first connected device 111, a second connected device 112, and a third connected device 113, wherein the first connected device 111 is a connected display device (e.g., a television), the second connected device 112 is a connected temperature device (e.g., a thermostat), and the third connected device 113 is a lighting control device (e.g., a smart light switch). Further, as shown, a first control device 121 is a personal control device, and a second control device 122 is a local control device.

As described herein, a guest 200 located in the hospitality environment may independently and interchangeably control each of the connected devices 111, 112, 113 using either or both of the first control device 121 and a second control device 122. That is, upon receiving user input from the guest 200, one or both of the personal control device and the local control device may be configured to transmit an instructional signal associated with one of the connected devices and a corresponding connected device status to the control module 100. In various embodiments, a guest 200 may provide user input by interacting with a guest control interface displayed on, for example, a personal control device executing an enterprise mobile application and/or a connected display device. Upon receiving an instructional signal associated with a connected device from either the first or the second control device 121,122, the control module 100 may be configured to transmit the instructional signal to the connected device with which it is associated. Based on the instructional signal received from the control module 100, the connected device (e.g., 112) may be configured to update its connected device status. For example, in the exemplary hospitality environment 21, the connected temperature device 112 may be configured to update its connected device status from 72° to 71°, or from 72° to 68° based on the instructional signal received from the control module 100. As a further non-limiting example, in the exemplary hospitality environment 21, the lighting control device 113 may be configured to update its connected device status from "Lamp—Off" to "Lamp—On", or from "Main Light—On" to "Main Light—Off" based on the instructional signal received from the control module 100.

As illustrated in FIG. 3, the personal control entity 121 and the local control device 122 may each be configured to transmit instructional signals to the control module 100 corresponding to the connected display device 111. In various embodiments, upon receiving an instructional signal associated with the connected display device 111 from either the personal control entity 121 or the local control device 122, the control module 100 may be configured to transmit the instructional signal to the connected display device 111. Further, upon receiving an instructional signal associated with the connected display device 111 from either the personal control entity 121 and the local control device 122, the control module 100 may be configured to transmit a corresponding content signal to the connected display device 111. A content signal may comprise content data, such as, for example, cable television data and/or content application data, accessible to a guest 200 via the control module 100. In various embodiments, based on the instructional signal received from the control module 100, the connected display device 111 may be configured to update its connected device status. For example, in the exemplary hospitality environment 21, the connected display device 111 may be configured to update its connected device status from "TV—Off" to "TV—On". As illustrated in FIG. 3, the connected display device may be configured to display content transmitted from the control module 100.

As described herein, a guest 200 located in the hospitality environment 21 may distinctly and interchangeably control each of the connected devices 111, 112, 113 by interacting directly with a respective control device interface located physically at and/or on at each of the connected devices. That is, a connected device may be configured to receive user input corresponding to a change in connected device status of the connected device at the connected device interface. Upon receiving user input corresponding to a change in connected device status from the guest 200, the connected device may be configured to transmit a status signal to the control module 100, as discussed below.

In various embodiments, each of the connected devices may be configured to transmit a status signal to the control module 100 when its respective connected device status is updated. For example, in the exemplary hospitality environment 21, if the status of the connected temperature device 112 is updated from 72° to 71°, the connected temperature device 112 may be configured to transmit a status signal corresponding to the updated connected device status of the device 112. The control module 100 may be configured to receive the status signal and refresh a connected device status data to reflect the updated connected device status corresponding to the received status signal. As described herein, upon refreshing the connected device status data, the control module may be configured to transmit a notice signal to a personal control device 121. For example, in the exemplary hospitality environment 21, the control module 100 may be configured to transmit a notice signal to the personal control entity 121 executing the enterprise mobile application. In such an exemplary circumstance, the first control device 121 may be configured to retrieve, at least in part, the connected device status data from the control module 100, which reflects the updated connected device status of the corresponding connected device. As described herein, in order to retrieve the connected device status data from the control module 100, the personal control device 121 may transmit control credential data to the control module 100 such that the control module 100 may verify that the personal control device 121 is authorized to access the connected device status data.

As illustrated in FIG. 4, the control module 100, the at least one connected device, the personal control device 121, and the local control device 122 are located within the hospitality environment 21. The enterprise control entity 124 may be located remotely with respect to the hospitality environment 21. As shown, the connected devices comprise a first connected device 111 and a second connected device 112, wherein the first connected device 111 is a connected display device (e.g., a television) and the second connected device 112 is a connected temperature device (e.g., a thermostat). Further, as shown, a first control device 121 and a second control device 122, wherein the first control device 121 is a personal control device, and the second control device 122 is a local control device.

The first control device 121 may be configured to execute an enterprise mobile app, as described herein. In such a configuration, the personal control device may be configured to display a guest control interface 121A, at which a guest may provide user input indicative of a guest command to change the connected device status of a connected device 112 from a first connected device status to a second connected device status. For example, upon receiving user input, the personal control device 121 may be configured to transmit a corresponding instructional signal to the control module 100 via a first client control network 142A. Each of the client control networks may comprise a closed area network. In various embodiments, as described herein, the first client control network 142A may comprise a closed area network that may utilize, for example, a Bluetooth Low Energy (BLE) protocol to communicate with the control module 100. Upon receiving an instructional signal associated with the connected device 112 from the first control device 121 the control module 100 may be configured to transmit the instructional signal to the connected device 112 via the first connected device network 141A. The first connected device network 141A may comprise a closed area network that may utilize, for example, a Zigbee protocol to communicate with the control module 100. The connected device 112 may update its connected device status according to the instructional signal received by the control module 100. As described herein, the hospitality system may be configured such that, once the second connected device 112 has updated its connected device status, the updated connected device status may be displayed via, for example, a connected device status indicator on a personal control device 121 in substantially real-time. As described herein, and as illustrated in FIG. 4, the personal control device 121 and the connected display device 112 may be configured to display the updated connected device status via respective guest control interfaces.

The enterprise control entity 124 may be configured to communicate with the control module 100 via an enterprise control network 144. As described herein, the enterprise control network 144 may comprise either a wired or wireless internet-based network that may utilize protocol such as, for example, internet protocol (IP) to communicate with the control module 100. Further, as shown, control module 100 may be configured to communicate with the connected display device 111 via the second connected device network 141B so as to enable the display of a connected device status indicator reflecting the updated connected device status of the second connected device 112 on the guest control interface of the connected display device 111 in substantially real time. For example, a notice signal may be generated by a control module 100 and transmitted to an interface circuitry within the control module 100, wherein the interface circuitry may be configured to generate a guest control interface for display on the connected display device 111 and update the one or more connected device status indicators within the guest control interface to accurately reflect one or more current connected device status data. In such a circumstance, the notice signal may be transmitted to the interface circuitry within the control module 100 upon the refresh of the connected device status data. In response, the interface circuitry may be configured to retrieve the updated connected device status data and accordingly transmit data to the connected device 111 to reflect the present status of the connected device 112 as being 72°. The connected display device may be configured to display connected device status indicators representative of 72° within the guest control interface. The second connected device network 141B may comprise a wired network, wherein the connected device 111 may communicate with the control module 100 using a wired multi-point interface (MPI) or HDMI connection.

As illustrated in FIG. 5, the control module 100, the at least one connected device, the personal control device 121, and the local control device 122 are located within the hospitality environment 21. The enterprise control entity 124 may be located remotely with respect to the hospitality environment 21. As shown, the at least one connected devices comprises a first connected device 111 and a second connected device 113, wherein the first connected device 111 is a connected display device (e.g., a television) and the second connected device 113 is a lighting control device (e.g., a smart light switch and corresponding light bulbs). Further, as shown, a first control device 121 may be a personal control device and a second client control device 122 may be a local control device. The first control device 121 may be configured to execute an enterprise mobile app, as described herein. In such a configuration, the personal control device may be configured to display a guest control interface 121A, at which may display one or more connected device status data corresponding to the at least one connected devices of the hospitality establishment 21.

The local control device 122 may comprise a user interface 122A at which a guest may provide user input indicative of a guest command to change the connected device status of a connected device 113 from a first connected device status to a second connected device status. For example, upon receiving user input, the local control device 122 may be configured to transmit a corresponding instructional signal to the control module 100 via a second client control network 142B. As described herein, the second client control network 142B may comprise a closed area network that may utilize, for example, an infrared (IR) protocol to communicate with the control module 100. In various embodiments, the control module 100 may be connected to an infrared receiver configured to receive signals transmitted using an infrared protocol from the local control device 122 and transmit the received infrared signal directly to the control module 100. In such a circumstance, the infrared receiver acts as a relay for the instructional signal received from the local control device 122. In various embodiments, the infrared receiver may be a stand-alone component in communication with the control module 100. Alternatively, the connected display device 111 may comprise an infrared receiver and may be configured to transmit one or more signals received from a local control device 122 directly to the control module 100. The control module may be configured to receive an instructional signal from a local control device 122—for example, via a connected display device acting as a relay for the instructional signal—representative of a guest command of "OK" at the user interface of the local control device 122. In such a circumstance, the interface circuitry of the control module 100 may be configured to know the position of an interface selection indicator (e.g., a cursor) within a guest control interface displayed on a connected display device 111 at any given time such that the control module 100 may be configured to identify the particular guest control interface option associated with the instructional signal received from the local control device 122. The control module 100 may be configured to generate an instructional signal which corresponds to the action requested by the user. For example, the control module 100 may be configured to accordingly associate an instructional signal with a connected device and a connected device status associated therewith. Upon associating an instructional signal with the connected device 113 the control module 100 may be configured to transmit the instructional signal to the connected device 113 via the second connected device network 141b. As described herein, the first connected device network 141A may comprise a closed area network that may utilize, for example, a Zigbee protocol to communicate with the control module 100.

The connected device 113 may update its connected device status according to the instructional signal received by the control module 100. As described herein, the hospitality system may be configured such that, once the second connected device 113 has updated its connected device status, the updated connected device status may be displayed via, for example, a connected device status indicator on a personal control device 121 and/or the connected display device 111 in substantially real-time. As described herein, and as illustrated in FIG. 5, the personal control device 121 and the connected display device 111 may be configured to display the updated connected device status via respective guest control interfaces. The control module 100 may be configured to communicate with the connected display device 111 via the second connected device network 141B so as to enable the display of a connected device status indicator reflecting the updated connected device status of the second connected device 113 on the guest control interface of the connected display device 111 in substantially real time. For example, a notice signal may be generated by a control module 100 and transmitted to an interface circuitry within the control module 100, wherein the interface circuitry may be configured to generate a guest control interface for display on the connected display device 111, monitor guest interaction with the guest control interface, and update the one or more connected device status indicators within the guest control interface to accurately reflect one or more current connected device status data. In such a circumstance, the notice signal may be transmitted to the interface circuitry within the control module 100 upon the refresh of a connected device status data. In response, the interface circuitry may be configured to retrieve the updated connected device status data and accordingly transmit data to the connected display device 111 to reflect the present status of the connected device 113 as being "Primary Device—ON" and "Secondary Device—OFF". The connected display device may be configured to display one or more connected device status indicators representative of "Primary Device—ON" and "Secondary Device—OFF" within the guest control interface. The second connected device network 141B may comprise a wired network, wherein the connected device 111 may communicate with the control module 100 using a wired multi-point interface (MPI) connection Further, the enterprise control entity 124 may be configured to communicate with the control module 100 via an enterprise control network 144. The control module 100 may be configured to periodically transmit various performance data and connected device status data to the enterprise control entity 124, which may be configured to display the connected device status data. As described herein, the enterprise control network 144 may comprise either a wired or wireless internet-based network that may utilize protocol such as, for example, internet protocol (IP) to communicate with the control module 100. In various embodiments, the personal control device 121 may be configured to communicate with the control module 100 via a first client control network 141A. As described herein, the enterprise control network 144 may comprise either a wired or wireless internet-based network that may utilize protocol such as, for example, internet protocol (IP) to communicate with the control module 100.

IV. Exemplary Operation

Described herein are various methodologies for operation of a hospitality system. Notably, discussed are methodologies for configuring a hospitality environment; as well as various methodologies associated with the operation of certain embodiments.

a. First Example Hospitality Environment Configuration Operation

Figure 6:
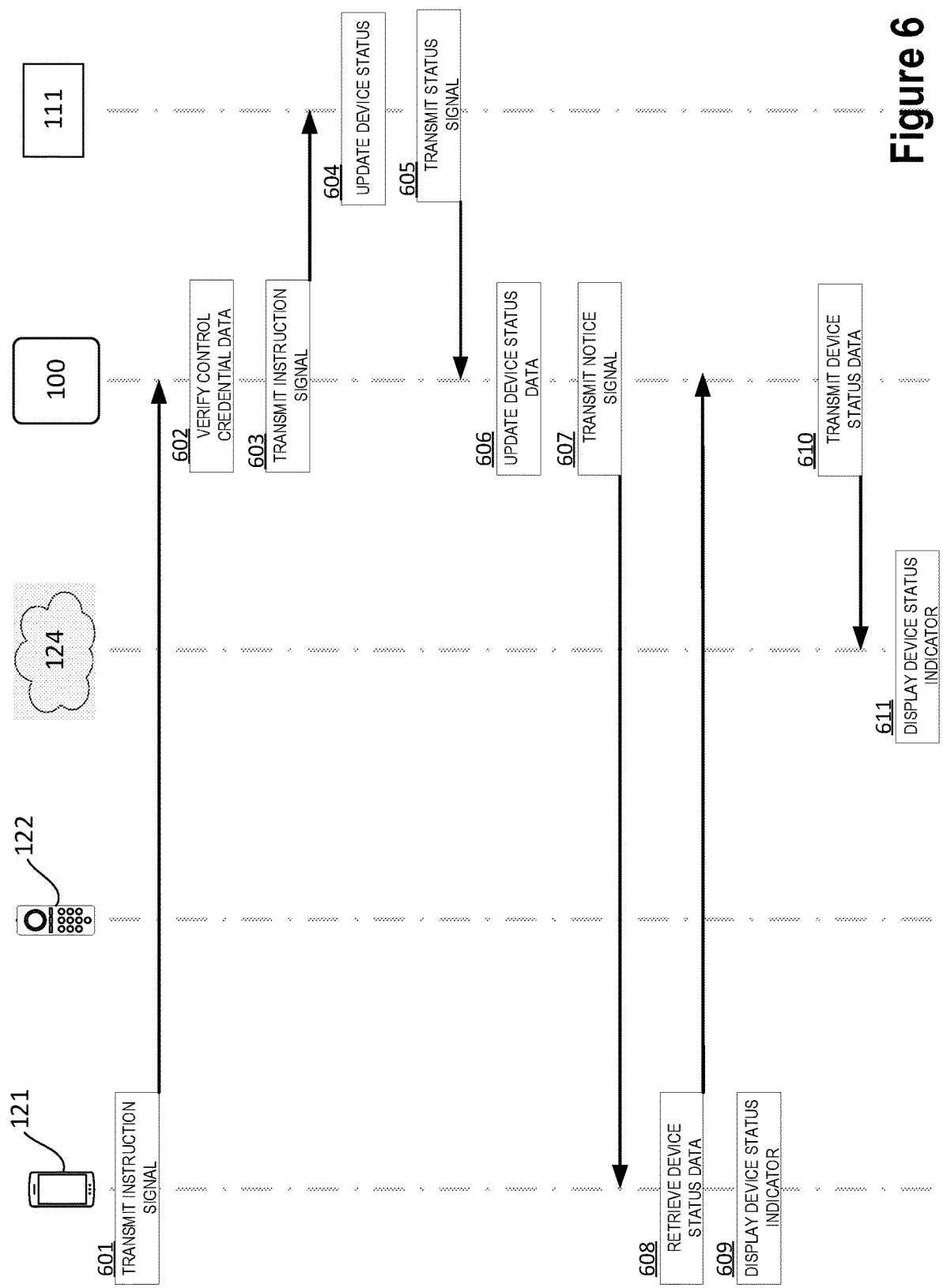
FIG. 6 illustrates a flowchart showing an example functionality of an exemplary configuration according to an embodiment.

FIG. 6 illustrates the operation of an example embodiment in which a connected device 111 located within a hospitality environment is controlled using a personal control device 121. As shown, the personal control device 121 may comprise a mobile device configured to execute an enterprise mobile application. Specifically, FIG. 6 illustrates an exemplary operation wherein the connected device 111 is controlled using the personal control device 121.

As shown at Block 601, an instructional signal may be transmitted from a personal control device 121 to a control module 100. As described herein, a personal control device may be a computer, such as, for example, a guest's personal mobile or tablet, configured to execute an enterprise mobile app associated with a hospitality enterprise. Executing the enterprise mobile app may comprise logging in to a guest account associated with an enterprise guest profile. In various embodiments, the instructional signal transmitted from the personal control device 121 may correspond to a user input from a guest at a guest control interface displayed on the personal control device 121 executing the enterprise mobile application. As described herein, the instructional signal may be associated with a connected device and a corresponding connected device status thereof. For example, the user input may be indicative of a guest command to change the connected device status of a connected device 111 from a first connected device status to a second connected device status. In such a circumstance, the instructional signal may be associated with the connected device 111 and the corresponding second connected device status thereof. In various embodiments, the instructional signal transmitted from the personal control device 121 executing the enterprise mobile application to the control module 100 may comprise control credential data, as described herein, which may be associated with the enterprise guest profile of a guest logged in to the enterprise mobile app on the personal control device 121. The instructional signal transmitted from the personal control device 121 executing the enterprise mobile application to the control module 100 may be transmitted over a client control network, as described herein. In various embodiments, the client control network may comprise a closed area network. For example, the client control network may comprise a Bluetooth Low Energy (BLE) network, wherein the personal control device 121 may communicate with the control module 100 using, at least in part, a Bluetooth (e.g., BLE) wireless protocol, so as to avoid an internet-dependent transmission of signals requiring, for example, a remote server and/or a "cloud." While the personal control device 121 may transmit control credential data each time it sends an instructional signal to the control module 100, it should also be understood that the control module 100 may require credential data to be verified prior to establishing a connection with the control module 100 and/or prior to each instance of the personal control device 121 attempting to retrieve connected device data from the control module. For example, each time the personal control device 121 logs in to the enterprise mobile application using an enterprise customer account (i.e. when the personal control device begins to execute the enterprise mobile application), the personal control device 121 may transmit control credential data 121 to control module 100 to be verified.

As shown at Block 602, the control credential data transmitted from the personal control device 121 to the control module 100 may verified by the control module 100. In various embodiments, as described herein, the control module 100 may verify the control credential data received from the personal control device 121 by comparing it to room credential data being temporarily stored on the volatile memory of the control module. Where it is determined that the control credential data corresponds to the room credential data, the control credential data may be verified by the control module 100. As described herein, the control credential data and may serve as a cryptographic key that is verified by the control module 100 to ensure that the personal control device 121 attempting to control a connected device 111 is authorized to do so.

As indicated at Block 603, the control module 100 may transmit an instructional signal to the connected device 111. The instructional signal transmitted from the control module 100 to the connected device 111 may correspond to the verified instructional signal received by the control module 100 from the personal client control device 121. For example, the instructional signal transmitted from the control module 100 to the connected device 111 may be associated with the connected device 111 and a corresponding second connected device status thereof, as was exemplarily described above with respect to Block 601. The instructional signal transmitted from the control module 100 to the connected device 111 may be transmitted over a connected device network, as described herein. In various embodiments, the connected device network may comprise a closed area network. In various embodiments, for example, the connected device network may comprise a personal area network. For example, the control module 100 may communicate with the connected device 111 using, at least in part, a Zigbee protocol, so as to avoid an internet-dependent transmission of signals requiring, for example, a remote server and/or a "cloud."

The connected device 111 may receive the instructional signal from the control module 100, and, as shown at Block 604, the connected device may update its connected device status to reflect the connected device status associated with the instructional signal. For example, continuing the example used in describing Blocks 601 and 603, the connected device 111 may be configured to update its connected device status to a second device status (from a first connected device status), as described herein.

As shown at Block 605, upon the updating of the connected device status of the connected device 111, a status signal may be transmitted from the connected device 111 to the control module 100. The status signal transmitted from the connected device 111 may correspond to the updated connected device status of the connected device 111. For example, continuing the non-limiting example used above in describing various Blocks, the status signal transmitted from the control device 111 to the control module 100 may be associated with the connected device 111 and a corresponding second connected device status. The status signal transmitted from the connected device 111 to the control module 100 may be transmitted over a connected device network, as described herein. In various embodiments, the connected device network may comprise a closed area network. In various embodiments, for example, the connected device network may comprise a personal area network. In various embodiments, a status signal transmitted from the connected device 111 to the control module 100 may be transmitted over the same connected device network described above with respect to Block 603 (i.e. the same connected device network used to transmit the instructional signal from the control module 100 to the connected device 111). In various embodiments, a status signal may be transmitted to the control module 100 via either the same or a different network channel.

At Block 606, the control module 100 may receive the status signal from the connected device 111, and as indicated, the control module 100 may update the connected device status data accordingly. In various embodiments, the connected device status data may comprise a compilation of data (e.g., a list and/or an array) corresponding to a connected device status of each connected device of at least one connected device located in the hospitality environment. The connected device status data may comprise a specification that details the present configuration of a hospitality environment by compiling data associated with a present status of each of the connected devices configured to be in communication with the control module located within the hospitality environment. In various embodiments, the connected device status data at a particular instance may be published and rendered for display and/or analysis. The connected device status data may be refreshed, in part or in whole, to reflect a connected device status corresponding to the status signal received from the connected device 111. In various embodiments, refreshing the connected device status data may comprise publishing an updated compilation of data, rather than amending an existing profile. For example, continuing the non-limiting example used above in describing various Blocks, wherein the status signal transmitted from the control device 111 to the control module 100 may be associated with the connected device 111 and a corresponding second connected device status, the connected device status data may be refreshed, such that the connected device status data reflects that the present status of the connected device 111 is a second connected device status.

As indicated at Block 607, a notice signal may be transmitted from the control module 100 to a personal control device 121 executing an enterprise mobile application. In various embodiments, a notice signal may comprise a subscription notification that may be transmitted from a control module 100 to, for example, a personal control device, when a connected device status data has changed, as described herein. For example, continuing the non-limiting example used above in describing various Blocks, a notice signal may be transmitted from the control module 100 to the personal control device 121 upon the refresh of the connected device status data to reflect the present status of the connected device 111 as the second connected device status. In various embodiments, a notice signal transmitted from the control module 100 to the personal control device 121 may be transmitted over the same client control network described above with respect to Block 601 (i.e. the same client control network used to transmit the instructional signal from the personal control device 121 to the control module 100). In various embodiments, a notice signal may be transmitted to the control module 100 via either the same or a different network channel.

Further, a notice signal may be generated by a control module 100 and transmitted to an interface circuitry within the control module 100, wherein the interface circuitry may be configured to generate a guest control interface for display on a connected display device, monitor guest interaction with the guest control interface, and update the one or more connected device status indicators within the guest control interface to accurately reflect one or more current connected device status data. In such a circumstance, continuing the non-limiting example used above in describing various Blocks, the notice signal may be transmitted from the control module 100 to the interface circuitry within the control module 100 upon the refresh of the connected device status data to reflect the second connected device status. In response, the interface circuitry of the control module 100 may be configured to retrieve the updated connected device status data and accordingly transmit data to a connected display device to reflect the present status of the connected device 111. The connected display device may be configured to display one or more connected device status indicators representative of the updated connected device status data within the guest control interface to reflect the present status of the connected device 111 as being the second connected device status. The control module 100 may further transmit the updated guest control interface to the connected display device over a connected device network, which may comprise a closed area network. For example, the connected display device may communicate with the control module 100 using a wired multi-point interface (MPI) connection, so as to avoid an internet-dependent transmission of signals requiring, for example, a remote server and/or a "cloud.

As indicated at Block 608, connected device status data may be retrieved from the control module 100 by the personal control device 121. In various embodiments, a personal control device 121 executing the enterprise mobile application may receive a notice signal from the control module 100 and may retrieve connected device status data from the control module 100 in response. In various embodiments, in order to retrieve the connected device status data from the control module 100, the personal control device 121 may transmit control credential data to the control module 100 such that the control module 100 may verify that the personal control device 121 is authorized to access the connected device status data. As described herein, the control module 100 may verify control credential data received from the personal control device 121. The control module 100 may verify the control credential data by comparing it to room credential data being temporarily stored on the volatile memory of the control module. Where it is determined that the control credential data corresponds to the room credential data, the control credential data may be verified by the control module 100 and the personal control device 121 may establish a connection with the control module 100. As described herein, the control credential data and may serve as a cryptographic key that is verified by the control module 100 to ensure that the personal control device 121 attempting to retrieve the connected device status data is authorized to do so. In various embodiments, a personal control device 121 executing the enterprise mobile application may retrieve connected device status data from a control module 100 upon establishing a connection with the control module 100. In various embodiments, the personal control device 121 executing the enterprise mobile application may retrieve connected device status data from the control module 100 over the same client control network described above with respect to Blocks 601 and 608 (i.e. the same client control network used to transmit the instructional signal from the personal control device 121 to the control module 100). In various embodiments, a connected device status data may be retrieved via either the same or a different network channel.

As indicated at Block 609, one or more connected device status indicators associated with the connected device status data may be displayed at a personal control device 121. A connected device status indicator may comprise one or more items of data associated with a connected device and a corresponding connected device status that indicate the present connected device status of the connected device. In various embodiments, a connected device status indicator may comprise data such as, for example, an image, numeral, text, and/or the like. In various embodiments, one or more connected device status indicators, each respectively associated with a connected device and a corresponding connected device status, may be displayed at a personal control device 121 executing the enterprise mobile app. The one or more connected device status indicators may be rendered for display within the guest control interface. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the personal control device 121 executing the enterprise mobile app.

As indicated at Block 610, connected device status data may be transmitted from the control module 100 to the enterprise control entity 124. In various embodiments, the control module 100 may regularly transmit one or both of the various performance data and the connected device status data to the enterprise control entity 124 after a predetermined time interval. For example, the control module 100 may be configured to transmit the various performance data and the connected device status data to the enterprise control entity 124 every five minutes. The control module may be configured to transmit the connected device status data as of it most recent update. That is, the control module 100 may transmit the connected device status data that is stored at the control module 100 at that time, which reflects the status of each of the connected devices as of the last instance in which one of the connected device status was updated. The control module 100 may transmit connected device status data to the enterprise control entity 124 over an enterprise control network, as described herein. For example, the enterprise control network may comprise either a wired or wireless internet-based network, wherein the control module 100 may use a protocol such as, for example, internet protocol (IP) to communicate with the enterprise control entity 124.

As indicated at Block 611, one or more connected device status indicators associated with the connected device status data may be displayed at an enterprise control entity 124. Each of the one or more connected device status indicators may be respectively associated with a connected device and a corresponding connected device status. The one or more connected device status indicators may be rendered for display within an enterprise control interface at the enterprise control entity 124. In various embodiments, a connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the enterprise control entity 124.

b. Second Example Hospitality Environment Configuration Operation

Figure 7:
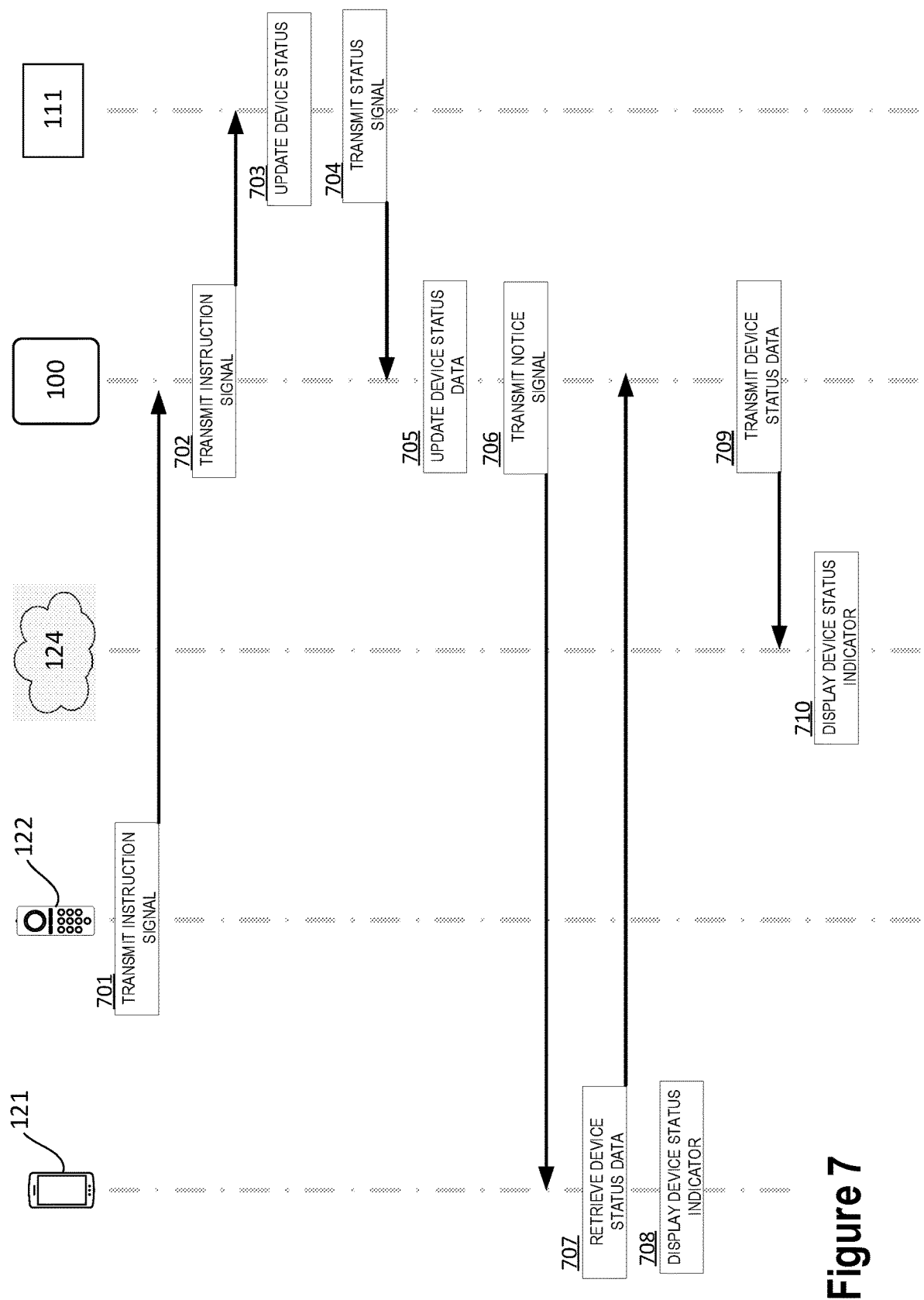
FIG. 7 illustrates a flowchart showing an example functionality of an exemplary configuration according to an embodiment.

FIG. 7 illustrates the operation of an example embodiment in which a connected device 111 located within a hospitality environment is controlled using a local control device 122. As shown, the local control device 122 comprises a television remote control. Specifically, FIG. 7 illustrates an exemplary operation wherein the connected device 111 is controlled using the local control device 122.

As shown at Block 701, an instructional signal may be transmitted from a local control device 122 to a control module 100. As described herein, a local control device may comprise a user interface. As described herein, the instructional signal from the local control device 122 may be representative of a guest command of "OK" at the user interface of the local control device 122. In various embodiments, user input at the user interface of the local control device 122 may define a user's navigation of a cursor throughout the guest control interface. Further, user input at the user interface of the local control device 122 may be indicative of a guest command to change the connected device status of a connected device 111 from a first connected device status to a second connected device status. The instructional signal transmitted from the local control device 122 to the control module 100 may be transmitted over a client control network, as described herein. In various embodiments, the client control network may comprise a closed area network. For example, the client control network may comprise an infrared (IR) network, wherein the local control device 122 may communicate with the control module 100 using, at least in part, an IR communication protocol, so as to avoid an internet-dependent transmission of signals requiring, for example, a remote server and/or a "cloud." In various embodiments, the control module may comprise an IR receiver configured to receive signals transmitted using an infrared protocol from a local control device 122. Alternatively, in various embodiments, the control module may be connected to an infrared receiver configured to receive signals transmitted using an infrared protocol from a local control device 122 and transmit the received infrared signal directly to the control module 100. In such a circumstance, the infrared receiver acts as a relay for the instructional signal received from the local control device 122. In various embodiments, the infrared receiver may be a stand-alone component in communication with the control module 100. Alternatively, the connected display device may comprise an infrared receiver and may be configured to transmit one or more signals received from a local control device 122 using an infrared protocol directly to the control module 100.

In various embodiments, the client control network may comprise a closed area network, such as, for example, a Bluetooth Low Energy network, wherein the local control device 122 may communicate with the control module 100 using, at least in part, a Bluetooth communication protocol. In such a circumstance, the instructional signal may be associated with the connected device 111 and the corresponding second connected device status thereof. In various embodiments, the instructional signal transmitted from the television remote control 122 to the control module 100 may comprise data associated with a connected display device, such as, for example, a television, located in the hospitality environment.

As indicated at Block 702, the control module 100 may transmit an instructional signal corresponding to the connected device 111. The control module 100 may be configured to receive an instructional signal from a local control device 122—for example, via a connected display device acting as a relay for the instructional signal—representative of a guest command of "OK" at the user interface of the local control device 122. The interface circuitry of the control module 100 may be configured to know the position of an interface selection indicator (e.g., a cursor) within a guest control interface displayed on a connected display device at any given time such that the control module 100 may be configured to identify the particular guest control interface option associated with the instructional signal received from the local control device 122 at Block 701. The control module 100 may be configured to generate an instructional signal which corresponds to the action requested by the user. For example, the control module 100 may be configured to accordingly associate an instructional signal with a connected device 111 and a connected device status associated therewith. The control module 100 may transmit the instructional signal the connected device 111 over a connected device network, as described herein. The connected device network may comprise a closed area network. In various embodiments, the connected device network may comprise a personal area network. For example, the control module 100 may communicate with the connected device 111 using, at least in part, a Zigbee protocol, so as to avoid an internet-dependent transmission of signals requiring, for example, a remote server and/or a "cloud."

The connected device 111 may receive the instructional signal from the control module 100, and, as shown at Block 703, the connected device may update its connected device status to reflect the connected device status associated with the instructional signal. For example, continuing the example used in describing Blocks 701 and 702, the connected device 111 may be configured to update its connected device status to a second device status (from a first connected device status), as described herein.

As shown at Block 704, upon the updating of the connected device status of the connected device 111, a status signal may be transmitted from the connected device 111 to the control module 100. The status signal transmitted from the connected device 111 may correspond to the updated connected device status of the connected device 111. For example, continuing the non-limiting example used above in describing various Blocks, the status signal transmitted from the control device 111 to the control module 100 may be associated with the connected device 111 and a corresponding second connected device status. The status signal transmitted from the connected device 111 to the control module 100 may be transmitted over a connected device network, as described herein. In various embodiments, the connected device network may comprise a closed area network. For example, the connected device network may comprise a personal area network. In various embodiments, a status signal transmitted from the connected device 111 to the control module 100 may be transmitted over the same connected device network described above with respect to Block 702 (i.e. the same connected device network used to transmit the instructional signal from the control module 100 to the connected device 111). In various embodiments, a status signal may be transmitted to the control module 100 via either the same or a different network channel.

At Block 705, the control module 100 may receive the status signal from the connected device 111, and as indicated, the connected device status data the control module 100 may be accordingly updated by the control module 100. As described herein, the connected device status data may comprise a compilation of data (e.g., a list and/or an array) corresponding to a connected device status of each connected device of at least one connected device located in the hospitality environment. In various embodiments, the connected device status data may be refreshed, in part or in whole, to reflect a connected device status corresponding to the status signal received from the connected device 111. For example, continuing the non-limiting example used above in describing various Blocks, wherein the status signal transmitted from the control device 111 to the control module 100 may be associated with the connected device 111 and a corresponding second connected device status, the connected device status data may be refreshed, such that the connected device status data reflects that the present status of the connected device 111 is a second connected device status.

As indicated at Block 706, a notice signal may be transmitted from the control module 100 to a personal control device 121 executing an enterprise mobile application. Further, a notice signal may be transmitted from a control module 100 to an interface circuitry within the control module 100. In various embodiments, a notice signal may comprise a subscription notification that may be transmitted from a control module 100 to a personal control device 121, when a connected device status data has changed, as described herein. For example, continuing the non-limiting example used above in describing various Blocks, a notice signal may be transmitted from the control module 100 to the personal control device 121 upon the refresh of connected device status data to reflect the present status of the connected device 111 as being the second connected device status. A notice signal transmitted from the control module 100 to the personal control device 121 executing the enterprise mobile application may be transmitted over a client control network, as described herein. In various embodiments, the client control network may comprise a closed area network. For example, the client control network may comprise a Bluetooth Low Energy (BLE) network, wherein the personal control device 121 may communicate with the control module 100 using, at least in part, a Bluetooth (e.g., BLE) wireless protocol, so as to avoid an internet-dependent transmission of signals requiring, for example, a remote server and/or a "cloud." In various embodiments, the client control network used to transmit the notice signal from the control module to the personal control device 121 may be the same network connection established when the control module 100 verified the credential from the personal control device 121 upon the personal control device 121 beginning to execute the enterprise mobile app, as described herein. In various embodiments, a notice signal may be transmitted to the control module 100 via either the same or a different network channel.

Further, a notice signal may be generated by a control module 100 and transmitted to an interface circuitry within the control module 100, wherein the interface circuitry may be configured to generate a guest control interface for display on a connected display device, monitor guest interaction with the guest control interface, and update the one or more connected device status indicators within the guest control interface to accurately reflect one or more current connected device status data. In such a circumstance, continuing the non-limiting example used above in describing various Blocks, the notice signal may be transmitted from the control module 100 to the interface circuitry within the control module 100 upon the refresh of the connected device status data to reflect the second connected device status. In response, the interface circuitry of the control module 100 may be configured to retrieve the updated connected device status data and accordingly transmit data to a connected display device to reflect the present status of the connected device 111. The control module 100 may transmit data to the connected display device over a connected device network, which may comprise a closed area network. For example, the connected device network may be a passive data transmission interface. For example, the connected display device may communicate with the control module 100 using a wired multi-point interface (MPI) connection, so as to avoid an internet-dependent transmission of signals requiring, for example, a remote server and/or a "cloud. The connected display device may be configured to display one or more connected device status indicators representative of the updated connected device status data within the guest control interface to reflect the present status of the connected device 111 as being the second connected device status.

As indicated at Block 707, connected device status data may be retrieved from the control module 100 by the personal control device 121. A personal control device 121 executing the enterprise mobile application may receive a notice signal from the control module 100 and may retrieve connected device status data from the control module 100 in response. In various embodiments, in order to retrieve the connected device status data from the control module 100, the personal control device 121 may transmit control credential data to the control module 100 such that the control module 100 may verify that the personal control device 121 is authorized to access the connected device status data. As described herein, the control module 100 may verify control credential data received from the personal control device 121. The control module 100 may verify the control credential data by comparing it to room credential data being temporarily stored on the volatile memory of the control module. Where it is determined that the control credential data corresponds to the room credential data, the control credential data may be verified by the control module 100 and the personal control device 121 may establish a connection with the control module 100. As described herein, the control credential data and may serve as a cryptographic key that is verified by the control module 100 to ensure that the personal control device 121 attempting to retrieve the connected device status data is authorized to do so. In various embodiments, a personal control device 121 executing the enterprise mobile application may retrieve connected device status data from a control module 100 upon establishing a connection with the control module 100. In various embodiments, the personal control device 121 executing the enterprise mobile application may retrieve connected device status data from the control module 100 over the same client control network described above with respect to Block 706 (i.e. the same client control network used to transmit the notice signal from the control module 100 to the personal control device 121). In various embodiments, a connected device status data may be retrieved via either the same or a different network channel.

As indicated at Block 708, one or more connected device status indicators associated with the connected device status data may be displayed at a personal control device 121. A connected device status indicator may comprise one or more items of data associated with a connected device and a corresponding connected device status that indicate the present connected device status of the connected device. In various embodiments, a connected device status indicator may comprise data such as, for example, an image, numeral, text, and/or the like. One or more connected device status indicators, each respectively associated with a connected device and a corresponding connected device status, may be displayed at a personal control device 121 executing the enterprise mobile app. The one or more connected device status indicators may be rendered for display within a guest control interface. In various embodiments, a connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the personal control device 121 executing the enterprise mobile app.

As indicated at Block 709, connected device status data may be transmitted from the control module 100 to the enterprise control entity 124. In various embodiments, the control module 100 may regularly transmit one or both of the various performance data and the connected device status data to the enterprise control entity 124 after a predetermined time interval. For example, the control module 100 may be configured to transmit the various performance data and the connected device status data to the enterprise control entity 124 every five minutes. The control module may be configured to transmit the connected device status data as of it most recent update. That is, the control module 100 may transmit the connected device status data that is stored at the control module 100 at that time, which reflects the status of each of the connected devices as of the last instance in which one of the connected device status was updated. The control module 100 may transmit connected device status data to the enterprise control entity 124 over an enterprise control network, as described herein. For example, the enterprise control network may comprise either a wired or wireless internet-based network, wherein the control module 100 may use a protocol such as, for example, internet protocol (IP) to communicate with the enterprise control entity 124.

As indicated at Block 710, one or more connected device status indicators associated with the connected device status data may be displayed at an enterprise control entity 124. In various embodiments, each of the one or more connected device status indicators may be respectively associated with a connected device and a corresponding connected device status. The one or more connected device status indicators may be rendered for display within an enterprise control interface at the enterprise control entity 124. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the enterprise control entity 124.

c. Third Example Hospitality Environment Configuration Operation

Figure 8:
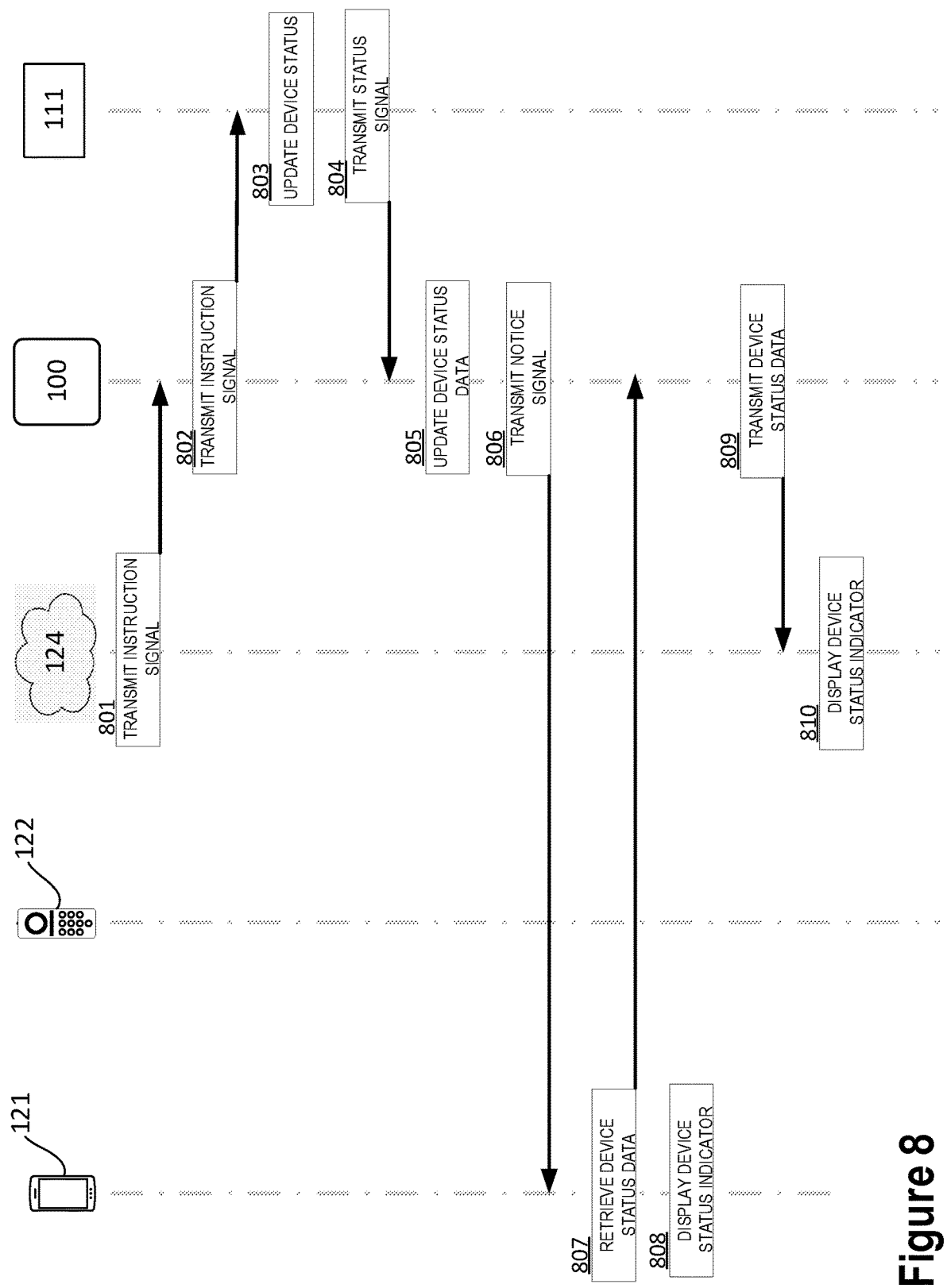
FIG. 8 illustrates a flowchart showing an example functionality of an exemplary configuration according to an embodiment.

FIG. 8 illustrates the operation of an example embodiment in which a connected device 111 located within a hospitality environment is controlled using an enterprise control entity 124

As shown at Block 801, an instructional signal may be transmitted from an enterprise control entity 124 to a control module 100. As described herein, an enterprise control entity may comprise one or more application programable interfaces (API), such as, for example, a REST API, for communicating with various computing entities, such as a control module 100. In various embodiments, the enterprise control entity 124 may comprise an enterprise control interface and may be configured to receive user input from one or more hospitality enterprise employees or any other individual authorized to access the interface. In various embodiments, for example, the owner, employee, or individual affiliated with a particular hospitality establishment of the hospitality enterprise may be provisioned authorization to a designated portion of the enterprise control entity 124. In various embodiments, the instructional signal transmitted from the enterprise control entity 124 may correspond to a user input from a hospitality enterprise employee or any other authorized individual at an enterprise control interface defined by the enterprise control entity 124. As described herein, the instructional signal may be associated with a connected device and a corresponding connected device status thereof. For example, in various embodiments, the user input may be indicative of a hospitality enterprise employee command to change the connected device status of a connected device 111 from a first connected device status to a second connected device status. In such a circumstance, the instructional signal may be associated with the connected device 111 and the corresponding second connected device status thereof. The instructional signal transmitted from the enterprise control entity 124 to the control module 100 may be transmitted over an enterprise control network, as described herein. For example, the enterprise control network may comprise either a wired or wireless internet-based network, wherein the enterprise control entity 124 may use a protocol such as, for example, internet protocol (IP) to communicate with the control module 100.

As indicated at Block 802, the control module 100 may transmit an instructional signal corresponding to the connected device 111. The instructional signal transmitted from the control module 100 to the connected device 111 may correspond to the instructional signal received by the control module 100 from the enterprise control entity 124. For example, the instructional signal transmitted from the control module 100 to the connected device 111 may be associated with the connected device 111 and a corresponding second connected device status thereof, as was exemplarily described above with respect to Block 801. The instructional signal transmitted from the control module 100 to the connected device 111 may be transmitted over a connected device network, as described herein. In various embodiments, the connected device network may comprise a closed area network. For example, the connected device network may comprise a personal area network. For example, the control module 100 may communicate with the connected device 111 using, at least in part, a Bluetooth communication protocol, so as to avoid an internet-dependent transmission of signals requiring, for example, a remote server and/or a "cloud."

The connected device 111 may receive the instructional signal from the control module 100, and, as shown at Block 803, the connected device may update its connected device status to reflect the connected device status associated with the instructional signal. For example, continuing the example used in describing Blocks 801 and 802, the connected device 111 may be configured to update its connected device status to a second device status (from a first connected device status), as described herein.

As shown at Block 804, upon the updating of the connected device status of the connected device 111, a status signal may be transmitted from the connected device 111 to the control module 100. The status signal transmitted from the connected device 111 may correspond to the updated connected device status of the connected device 111. For example, continuing the non-limiting example used above in describing various Blocks, the status signal transmitted from the control device 111 to the control module 100 may be associated with the connected device 111 and a corresponding second connected device status. The status signal transmitted from the connected device 111 to the control module 100 may be transmitted over a connected device network, as described herein. In various embodiments, the connected device network may comprise a closed area network. For example, the connected device network may comprise a personal area network. In various embodiments, a status signal transmitted from the connected device 111 to the control module 100 may be transmitted over the same connected device network described above with respect to Block 802 (i.e. the same connected device network used to transmit the instructional signal from the control module 100 to the connected device 111). In various embodiments, a status signal may be transmitted to the control module 100 via either the same or a different network channel.

At Block 805, the control module 100 may receive the status signal from the connected device 111, and as indicated, the connected device status data the control module 100 may be updates by the control module 100 accordingly.

As described herein, the connected device status data may comprise a compilation of data (e.g., a list and/or an array) corresponding to a connected device status of each connected device of at least one connected device located in the hospitality environment. The connected device status data may be refreshed, in part or in whole, to reflect a connected device status corresponding to the status signal received from the connected device 111. For example, continuing the non-limiting example used above in describing various Blocks, wherein the status signal transmitted from the control device 111 to the control module 100 may be associated with the connected device 111 and a corresponding second connected device status, the connected device status data may be refreshed, such that the connected device status data reflects that the present status of the connected device 111 is a second connected device status.

As indicated at Block 806, a notice signal may be transmitted from the control module 100 to a personal control device 121 executing an enterprise mobile app. Further, in various embodiments, a notice signal may be transmitted from a control module 100 to an interface circuitry within the control module 100. In various embodiments, a notice signal may comprise a subscription notification that may be transmitted from a control module 100 to one or more personal control devices and/or the interface circuitry of the control module 100, when a connected device status data has changed, as described herein. For example, a notice signal may be transmitted from the control module 100 to the personal control device 121 executing the enterprise mobile application over a client control network, as described herein. In various embodiments, the client control network may comprise a closed area network. For example, the client control network may comprise a Bluetooth Low Energy (BLE) network, wherein the personal control device 121 may communicate with the control module 100 using, at least in part, a Bluetooth (e.g., BLE) wireless protocol, so as to avoid an internet-dependent transmission of signals requiring, for example, a remote server and/or a "cloud." In various embodiments, the client control network used to transmit the notice signal from the control module to the personal control device 121 may be the same network connection established when the control module 100 verified the credential from the personal control device 121 upon the personal control device 121 beginning to execute the enterprise mobile application, as described herein. In such a circumstance, the notice signal may be transmitted to the control module 100 via either the same or a different network channel, wherein different channels of the same network may utilize different frequencies.

Further, a notice signal may be generated by a control module 100 and transmitted to an interface circuitry within the control module 100, wherein the interface circuitry may be configured to generate a guest control interface for display on a connected display device, monitor guest interaction with the guest control interface, and update the one or more connected device status indicators within the guest control interface to accurately reflect one or more current connected device status data. In such a circumstance, continuing the non-limiting example used above in describing various Blocks, the notice signal may be transmitted from the control module 100 to the interface circuitry within the control module 100 upon the refresh of the connected device status data to reflect the second connected device status. In response, the interface circuitry of the control module 100 may be configured to retrieve the updated connected device status data and accordingly transmit data to a connected display device to reflect the present status of the connected device 111. The connected display device may be configured to display one or more connected device status indicators representative of the updated connected device status data within the guest control interface to reflect the present status of the connected device 111 as being the second connected device status. In various embodiments, the control module 100 may further transmit the updated guest control interface to the connected display device over a connected device network, which may comprise a closed area network. For example, the connected device network may comprise a passive data transmission interface. For example, the connected display device may communicate with the control module 100 using a wired multi-point interface (MPI) connection, so as to avoid an internet-dependent transmission of signals requiring, for example, a remote server and/or a "cloud".

As indicated at Block 807, connected device status data may be retrieved from the control module 100 by the personal control device 121. A personal control device 121 executing the enterprise mobile application may receive a notice signal from the control module 100 and may retrieve connected device status data from the control module 100 in response. In various embodiments, in order to retrieve the connected device status data from the control module 100, the personal control device 121 may transmit control credential data to the control module 100 such that the control module 100 may verify that the personal control device 121 is authorized to access the connected device status data. As described herein, the control module 100 may verify the control credential data received from the personal control device 121 by comparing it to room credential data being temporarily stored on the volatile memory of the control module. Where it is determined that the control credential data corresponds to the room credential data, the control credential data may be verified by the control module 100 and the personal control device 121 may establish a connection with the control module 100. As described herein, the control credential data and may serve as a cryptographic key that is verified by the control module 100 to ensure that the personal control device 121 attempting to retrieve the connected device status data is authorized to do so. In various embodiments, a personal control device 121 executing the enterprise mobile application may retrieve connected device status data from a control module 100 upon establishing a connection with the control module 100. In various embodiments, the personal control device 121 executing the enterprise mobile application may retrieve connected device status data from the control module 100 over the same client control network described above with respect to Block 806 (i.e. the same client control network used to transmit the notice signal from the control module 100 to the personal control device 121). In various embodiments, a connected device status data may be retrieved via either the same or a different network channel.

As indicated at Block 808, one or more connected device status indicators associated with the connected device status data may be displayed at a personal control device 121. A connected device status indicator may comprise one or more items of data associated with a connected device and a corresponding connected device status that indicate the present connected device status of the connected device. In various embodiments, a connected device status indicator may comprise data such as, for example, an image, numeral, text, and/or the like. In various embodiments, one or more connected device status indicators, each respectively associated with a connected device and a corresponding connected device status, may be displayed at a personal control device 121 executing the enterprise mobile app. The one or more connected device status indicators may be rendered for display within a guest control interface. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the personal control device 121 executing the enterprise mobile app.

As indicated at Block 809, connected device status data may be transmitted from the control module 100 to the enterprise control entity 124. In various embodiments, the control module 100 may regularly transmit one or both of the various performance data and the connected device status data to the enterprise control entity 124 after a predetermined time interval. For example, the control module 100 may be configured to transmit the various performance data and the connected device status data to the enterprise control entity 124 every five minutes. The control module may be configured to transmit the connected device status data as of it most recent update. That is, the control module 100 may transmit the connected device status data that is stored at the control module 100 at that time, which reflects the status of each of the connected devices as of the last instance in which one of the connected device status was updated. The control module 100 may transmit connected device status data to the enterprise control entity 124 over the same enterprise control network described above with respect to Block 801 (i.e. the same enterprise control network used to transmit the instructional signal from the enterprise control entity 124 to the control module 100).

As indicated at Block 810, one or more connected device status indicators associated with the connected device status data may be displayed at an enterprise control entity 124. Each of the one or more connected device status indicators may be respectively associated with a connected device and a corresponding connected device status. In various embodiments, the one or more connected device status indicators may be rendered for display within an enterprise control interface at the enterprise control entity 124. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the enterprise control entity 124.

d. Fourth Example Hospitality Environment Configuration Operation

Figure 9:
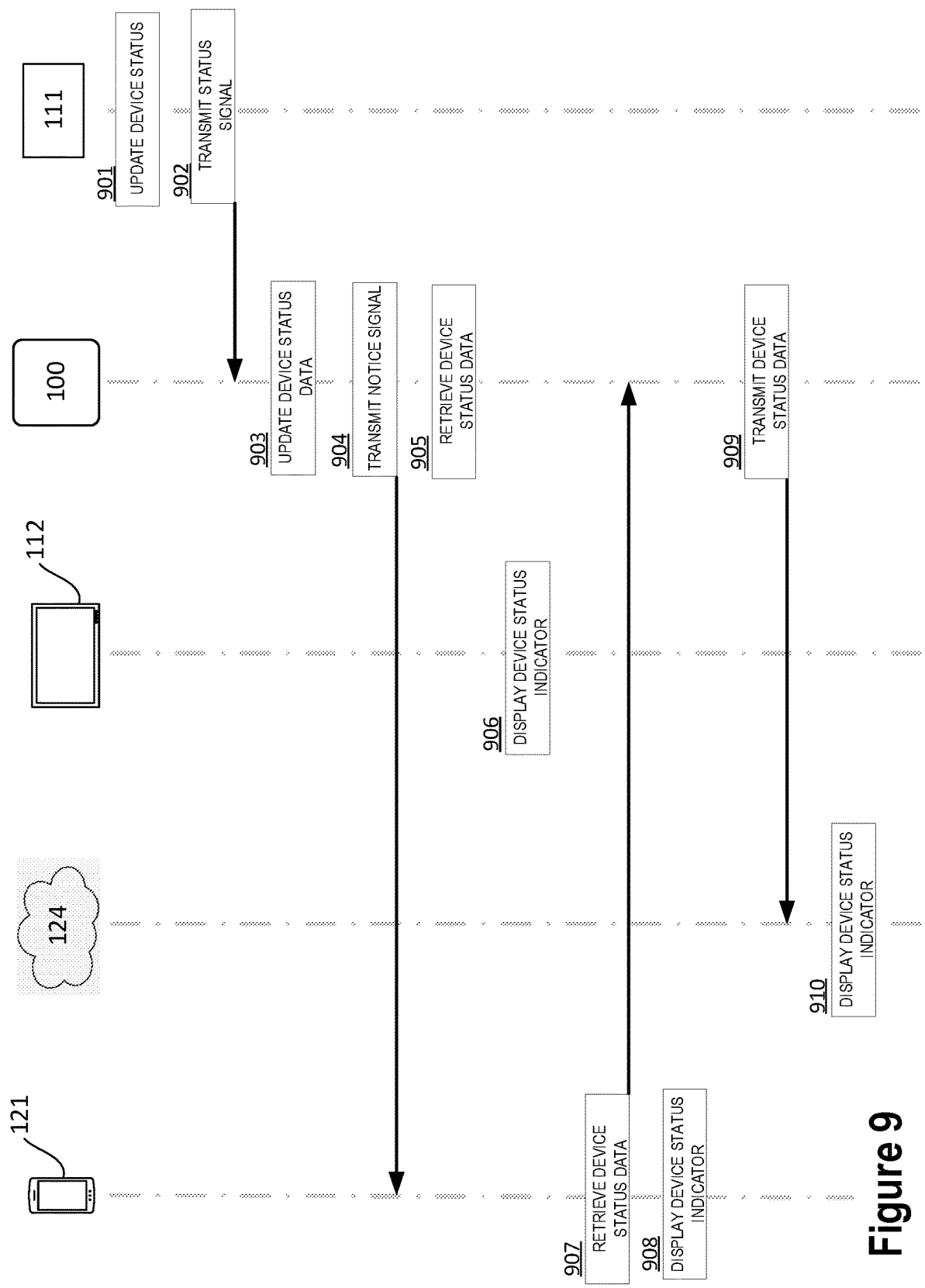
FIG. 9 illustrates a flowchart showing an example functionality of an exemplary configuration according to an embodiment.

FIG. 9 illustrates the operation of an example embodiment in which a connected device 111 located within a hospitality environment, such as a thermostat, is controlled by a user input at the connected device 111. As shown, a connected display device may be located in the hospitality environment. As shown, a control module 100 may be configured to receive one or more communication signals from one or more of enterprise control entity 124, a personal control device, and a local control device 122.

In various embodiments, a connected device 111 may comprise a user interface. The connected device 111 may receive a user input from a guest at the user interface of the connected device 111, and, as shown at Block 901, the connected device may update its connected device status to reflect the connected device status associated with the instructional signal. For example, the user input may be indicative of a guest command to change the connected device status of a connected device 111 from a first connected device status to a second connected device status. In such a circumstance, the connected device 111 may be configured to update its connected device status to a second device status (from a first connected device status), as described herein.

As shown at Block 902, upon the updating of the connected device status of the connected device 111, a status signal may be transmitted from the connected device 111 to the control module 100. The status signal transmitted from the connected device 111 may correspond to the updated connected device status of the connected device 111. For example, continuing the non-limiting example used above in describing Block 901, the status signal transmitted from the control device 111 to the control module 100 may be associated with the connected device 111 and a corresponding second connected device status. The status signal transmitted from the connected device 111 to the control module 100 may be transmitted over a connected device network, as described herein. In various embodiments, the connected device network may comprise a closed area network. For example, the connected device network may comprise a personal area network. For example, the connected device 111 may communicate with the control module 100 using, at least in part, a Zigbee protocol, so as to avoid an internet-dependent transmission of signals requiring, for example, a remote server and/or a "cloud."

At Block 903, the control module 100 may receive the status signal from the connected device 111, and as indicated, the connected device status data the control module 100 may be updates by the control module 100 accordingly. As described herein, the connected device status data may comprise a compilation of data (e.g., a list and/or an array) corresponding to a connected device status of each connected device of at least one connected device located in the hospitality environment. The connected device status data may be refreshed, in part or in whole, to reflect a connected device status corresponding to the status signal received from the connected device 111. For example, continuing the non-limiting example used above in describing Blocks 901 and 902, wherein the status signal transmitted from the control device 111 to the control module 100 may be associated with the connected device 111 and a corresponding second connected device status, the connected device status data may be refreshed, such that the connected device status data reflects that the present status of the connected device 111 is a second connected device status.

As indicated at Block 904, a notice signal may be transmitted from the control module 100 to a personal control device 121 executing an enterprise mobile app, as described herein. Further, in various embodiments, a notice signal may be transmitted to an interface circuitry within the control module 100. In various embodiments, a notice signal may comprise a subscription notification that may be transmitted from a control module 100 to the personal control device 121 and/or various components of the control module related to a guest control interface, such as, for example, interface circuitry, when a connected device status data has changed, as described herein. For example, a notice signal may be transmitted from the control module 100 to the personal control device 121 executing the enterprise mobile application over a client control network, as described herein. In various embodiments, the client control network may comprise a closed area network. For example, the client control network may comprise a Bluetooth Low Energy (BLE) network, wherein the personal control device 121 may communicate with the control module 100 using, at least in part, a Bluetooth (e.g., BLE) wireless protocol, so as to avoid an internet-dependent transmission of signals between guest-facing components requiring, for example, a remote server and/or a "cloud." In various embodiments, the client control network used to transmit the notice signal from the control module to the personal control device 121 may be the same network connection established when the personal control device 121 began executing the enterprise mobile app, as discussed herein. In various embodiments, a notice signal may be transmitted to the control module 100 via either the same or a different network channel.

Further, a notice signal may be generated by a control module 100 and transmitted to an interface circuitry within the control module 100. As described herein, the interface circuitry may be configured to generate a guest control interface for display on a connected display device 112, monitor guest interaction with the guest control interface, and update the one or more connected device status indicators within the guest control interface to accurately reflect one or more current connected device status data. In such a circumstance, continuing the non-limiting example used above in describing various Blocks, the notice signal may be transmitted from the control module 100 to the interface circuitry within the control module 100 upon the refresh of the connected device status data to reflect the present status of the connected device 111 as the second connected device status.

As indicated in Block 905, connected device status data may be retrieved from the control module 100 by an interface circuitry of the control module 100. The interface circuitry of the control module 100 may receive a notice signal from another circuitry of the control module 100 and may retrieve connected device status data from the control module 100 in response. In response to receiving a notice signal, the interface circuitry of the control module 100 may retrieve at least a portion of the connected device status data on the control module 100. The interface circuitry may generate an updated guest control interface for display on the connected display device 112, the updated guest control interface comprising one or more connected device status indicators that accurately reflect the updated current connected device status data. In various embodiments, the control module 100 may further transmit the updated guest control interface to the connected display device 112. The connected display device 112 may receive the updated guest control interface from the control module 100 over a connected device network, which may comprise a closed area network. For example, the connected device network may comprise a passive data transmission interface. For example, the connected display device 112 may communicate with the control module 100 using a wired multi-point interface (MPI) connection, so as to avoid an internet-dependent transmission of signals requiring, for example, a remote server and/or a "cloud.

As indicated at Block 906, one or more connected device status indicators associated with the connected device status data may be displayed at a connected display device 112. In various embodiments, the connected device 112 may comprise a connected display device, such as, for example, a television. The one or more connected device status indicators may be rendered for display within a guest control interface on a screen at the connected display device 112. Each of the one or more connected device status indicators may be respectively associated with a connected device and a corresponding connected device status. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the connected display device 112.

As indicated at Block 907, connected device status data may be retrieved from the control module 100 by the personal control device 121. In various embodiments, a personal control device 121 executing the enterprise mobile application may receive a notice signal from the control module 100 and may retrieve connected device status data from the control module 100 in response. In various embodiments, in order to retrieve the connected device status data from the control module 100, the personal control device 121 may transmit control credential data to the control module 100 such that the control module 100 may verify that the personal control device 121 is authorized to access the connected device status data. As described herein, the control module 100 may verify the control credential data received from the personal control device 121 by comparing it to room credential data being temporarily stored on the volatile memory of the control module. Where it is determined that the control credential data corresponds to the room credential data, the control credential data may be verified by the control module 100 and the personal control device 121 may establish a connection with the control module 100. As described herein, the control credential data and may serve as a cryptographic key that is verified by the control module 100 to ensure that the personal control device 121 attempting to retrieve the connected device status data is authorized to do so. In various embodiments, a personal control device 121 executing the enterprise mobile application may retrieve connected device status data from a control module 100 upon establishing a connection with the control module 100, as described herein. In various embodiments, the personal control device 121 executing the enterprise mobile application may retrieve connected device status data from the control module 100 over the same client control network described above with respect to Block 904 (i.e. the same client control network used to transmit the notice signal from the control module 100 to the personal control device 121). In various embodiments, a connected device status data may be retrieved via either the same or a different network channel.

As indicated at Block 908, one or more connected device status indicators associated with the connected device status data may be displayed at a personal control device 121. A connected device status indicator may comprise one or more items of data associated with a connected device and a corresponding connected device status that indicate the present connected device status of the connected device, as described herein. In various embodiments, one or more connected device status indicators, each respectively associated with a connected device and a corresponding connected device status, may be displayed at a personal control device 121 executing the enterprise mobile app. The one or more connected device status indicators may be rendered for display within a guest control interface. In various embodiments, a connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the personal control device 121 executing the enterprise mobile app.

As indicated at Block 909, connected device status data may be transmitted from the control module 100 to the enterprise control entity 124. In various embodiments, the control module 100 may regularly transmit one or both of the various performance data and the connected device status data to the enterprise control entity 124 after a predetermined time interval. For example, the control module 100 may be configured to transmit the various performance data and the connected device status data to the enterprise control entity 124 every five minutes. The control module may be configured to transmit the connected device status data as of it most recent update. That is, the control module 100 may transmit the connected device status data that is stored at the control module 100 at that time, which reflects the status of each of the connected devices as of the last instance in which one of the connected device status was updated. The control module 100 may transmit connected device status data to the enterprise control entity 124 over an enterprise control network, as described herein. For example, the enterprise control network may comprise either a wired or wireless internet-based network, wherein the control module 100 may use a protocol such as, for example, internet protocol (IP) to communicate with the enterprise control entity 124.

As indicated at Block 910, one or more connected device status indicators associated with the connected device status data may be displayed at an enterprise control entity 124. Each of the one or more connected device status indicators may be respectively associated with a connected device and a corresponding connected device status. The one or more connected device status indicators may be rendered for display within an enterprise control interface at the enterprise control entity 124. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the enterprise control entity 124.

e. Fifth Example Hospitality Environment Configuration Operation

Figure 10:
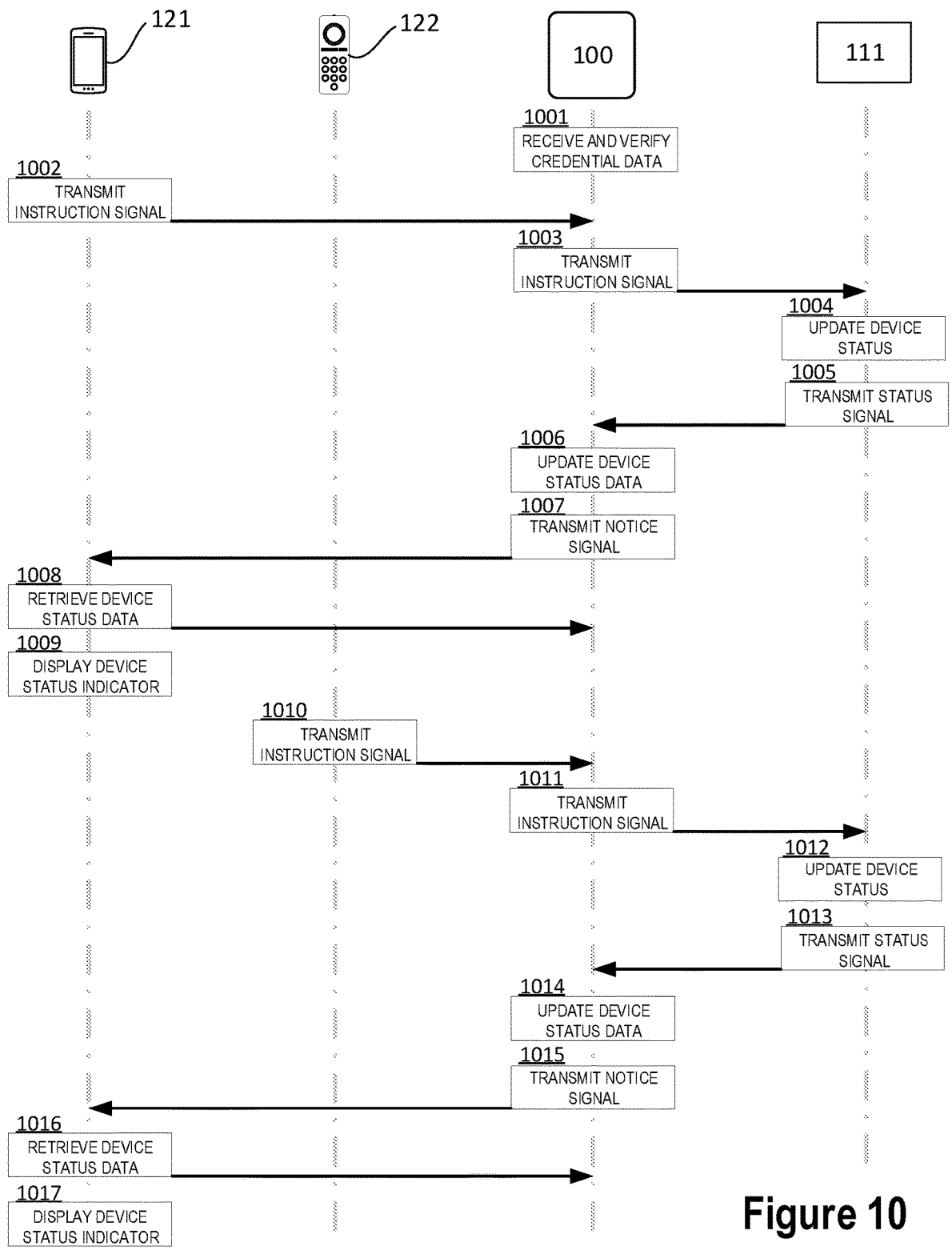
FIG. 10 illustrates a flowchart showing an example functionality of an exemplary configuration according to an embodiment.

FIG. 10 illustrates the operation of an example embodiment in which a connected device 111 located within a hospitality environment is controlled using both. As shown in FIG. 10 illustrates an exemplary operation wherein the connected device 111 is controlled using both a personal control device 121 and a local control device 122.

As shown at Block 1001, in order for the personal control device 121 to connect to the control module 100, the control module may receive control credential data transmitted from the personal control device 121 to the control module 100. In various embodiments, the control credential data may be transmitted to the control module 100 when the personal control device 121 begins executing the enterprise mobile application. The control credential data may be part of the partial guest profile data retrieved with the application data, as described herein. In various embodiments, the control credential data transmitted to the control module 100 may comprise anonymous data that, although it corresponds to various aspects of a guest's enterprise guest profile (e.g., guest reservation data or a password), does not comprise any identifying information or data specifically from a guest's enterprise guest profile. In various embodiments, the control module 100 may repetitively beacon various identifying data corresponding to the hospitality environment within which the control module 100 is located. Upon executing an enterprise mobile application, a personal control device 121 located in the hospitality environment of the control module 100 may receive the beaconed identifying data beaconed and, based at least in part on the partial guest profile data (e.g., guest reservation data), verify that the control module 100 is the particular control module with which the personal control device 121 is authorized to connect. For example, the personal control device 121 may verify that hospitality environment identified in the identifying data beaconed by the control module 100 is the same as the hospitality environment assigned to a guest according to the guest reservation data. In such a circumstance, upon verifying that the identifying data recognized by the personal control device 121 was beaconed from the control module 100 with which the personal control device 121 is authorized to connect, the personal control device 121 executing the enterprise mobile application may transmit the control credential data to the control module 100. For example, each time the personal control device 121 logs in to the enterprise mobile application using an enterprise customer account (i.e. when the personal control device begins to execute the enterprise mobile application), the personal control device 121 may transmit control credential data 121 to control module 100 to be verified.

Upon receiving the control credential data transmitted from the personal control device 121, the control module 100 may verify the control credential data. In various embodiments, the control module 100 may verify the control credential data received from the personal control device 121 by comparing it to the room credential data being temporarily stored on the volatile memory of the control module, as described herein. In various embodiments, the control credential data may be associated with the personal control device 121, and thus, with the enterprise guest profile of the guest positioned within the hospitality environment attempting to communicate with the control module 100. In various embodiments, the room credential data may be associated with the enterprise guest profile of the guest determined by a property computing entity to have reserved the hospitality environment in which the control module 100 is located, as described herein. The control credential may be verified by the control module 100 where it is determined that the control credential data corresponds to the room credential data being stored at the control module 100. As described herein, in various embodiments, the control credential data and may serve as a cryptographic key that is verified by the control module 100 to ensure that the personal control device 121 attempting to connect to the control module 100 is authorized to do so. In various embodiments, a connection between the personal control device 121 and the control module 100 may be established upon verification of the control credential data.

As shown at Block 1002, an instructional signal may be transmitted from a personal control device 121 to a control module 100. As described herein, a personal control device may be a computer, such as, for example, a guest's personal mobile or tablet, configured to execute an enterprise mobile app associated with a hospitality enterprise. In various embodiments, executing the enterprise mobile app may comprise logging in to a guest account associated with an enterprise guest profile and establishing a connection with the control module 100. In various embodiments, the instructional signal transmitted from the personal control device 121 may correspond to a user input from a guest at a guest control interface displayed on the personal control device 121 executing the enterprise mobile application. As described herein, the instructional signal may be associated with a connected device and a corresponding connected device status thereof. For example, the user input may be indicative of a guest command to change the connected device status of a connected device 111 from a first connected device status to a second connected device status. In such a circumstance, the instructional signal may be associated with the connected device 111 and the corresponding second connected device status thereof. The instructional signal transmitted from the personal control device 121 executing the enterprise mobile application to the control module 100 may be transmitted over a client control network, as described herein. In various embodiments, the client control network may comprise a closed area network. For example, the client control network may comprise a Bluetooth Low Energy (BLE) network, wherein the personal control device 121 may communicate with the control module 100 using, at least in part, a Bluetooth (e.g., BLE) wireless protocol, so as to avoid an internet-dependent transmission of signals requiring, for example, a remote server and/or a "cloud."

As indicated at Block 1003, the control module 100 may transmit an instructional signal corresponding to the connected device 111. The instructional signal transmitted from the control module 100 to the connected device 111 may correspond to the instructional signal received by the control module 100 from the personal client control device 121. For example, the instructional signal transmitted from the control module 100 to the connected device 111 may be associated with the connected device 111 and a corresponding second connected device status thereof, as was exemplarily described above with respect to Block 1002. The instructional signal transmitted from the control module 100 to the connected device 111 may be transmitted over a connected device network, as described herein. In various embodiments, the connected device network may comprise a closed area network. For example, the connected device network may comprise a personal area network. For example, the control module 100 may communicate with the connected device 111 using, at least in part, a Zigbee protocol, so as to avoid an internet-dependent transmission of signals requiring, for example, a remote server and/or a "cloud."

The connected device 111 may receive the instructional signal from the control module 100, and, as shown at Block 1004, the connected device 111 may update its connected device status to reflect the connected device status associated with the instructional signal. For example, continuing the example used in describing Blocks 1002 and 1003, the connected device 111 may be configured to update its connected device status to a second device status (from a second connected device status), as described herein.

As shown at Block 1005, upon the updating of the connected device status of the connected device 111, a status signal may be transmitted from the connected device 111 to the control module 100. The status signal transmitted from the connected device 111 may correspond to the updated connected device status of the connected device 111. For example, continuing the non-limiting example used above in describing various Blocks, the status signal transmitted from the control device 111 to the control module 100 may be associated with the connected device 111 and a corresponding second connected device status. The status signal transmitted from the connected device 111 to the control module 100 may be transmitted over a connected device network, as described herein. In various embodiments, the connected device network may comprise a closed area network, such as, for example, a personal area network. In various embodiments, a status signal transmitted from the connected device 111 to the control module 100 may be transmitted over the same connected device network described above with respect to Block 1003 (i.e. the same connected device network used to transmit the instructional signal from the control module 100 to the connected device 111). In various embodiments, a status signal may be transmitted to the control module 100 via either the same or a different network channel.

At Block 1006, the control module 100 may receive the status signal from the connected device 111, and as indicated, the control module 100 may update the connected device status data accordingly. In various embodiments, the connected device status data may comprise a compilation of data (e.g., a list and/or an array) corresponding to a connected device status of each connected device of at least one connected device located in the hospitality environment. The connected device status data may comprise a specification that details the present configuration of a hospitality environment by compiling data associated with a present status of each of the connected devices configured to be in communication with the control module located within the hospitality environment. The connected device status data at a particular instance may be published and rendered for display and/or analysis. As described herein, the connected device status data may be refreshed, in part or in whole, to reflect a connected device status corresponding to the status signal received from the connected device 111. In various embodiments, refreshing the connected device status data may comprise publishing an updated compilation of data, rather than amending an existing profile. For example, continuing the non-limiting example used above in describing various Blocks, wherein the status signal transmitted from the control device 111 to the control module 100 may be associated with the connected device 111 and a corresponding second connected device status, the connected device status data may be refreshed, such that the connected device status data reflects that the present status of the connected device 111 is a second connected device status. In various embodiments each connected device status represented in the compilation of connected device status data may be updated. Alternatively, using the example described above with respect to various blocks, the connected device status(es) of the connected device 111 may be refreshed while the other connected device status data remains the same.

As indicated at Block 1007, a notice signal may be transmitted from the control module 100 to a personal control device 121 executing an enterprise mobile app. In various embodiments, a notice signal may comprise a subscription notification that may be transmitted from a control module 100 to the personal control device 121 and/or an interface circuitry of the control module 100 when a connected device status data has changed, as described herein. For example, continuing the non-limiting example used above in describing various Blocks, a notice signal may be transmitted from the control module 100 to the personal control device 121 upon the refresh of the connected device status data to reflect the present status of the connected device 111 as the second connected device status. In various embodiments, a notice signal transmitted from the control module 100 to the personal control device 121 may be transmitted over the same client control network described above with respect to Block 1002 (i.e. the same client control network used to transmit the instructional signal from the personal control device 121 to the control module 100). In various embodiments, a notice signal may be transmitted to the control module 100 via either the same or a different network channel.

Further, a notice signal may be generated by a control module 100 and transmitted to an interface circuitry within the control module 100, wherein the interface circuitry may be configured to generate a guest control interface for display on a connected display device, monitor guest interaction with the guest control interface, and update the one or more connected device status indicators within the guest control interface to accurately reflect one or more current connected device status data. In such a circumstance, continuing the non-limiting example used above in describing various Blocks, the notice signal may be transmitted from the control module 100 to the interface circuitry within the control module 100 upon the refresh of the connected device status data to reflect the second connected device status. In response, the interface circuitry of the control module 100 may be configured to retrieve the updated connected device status data and accordingly transmit data to a connected display device to reflect the present status of the connected device 111. The connected display device may be configured to display one or more connected device status indicators representative of the updated connected device status data within the guest control interface to reflect the present status of the connected device 111 as being the second connected device status. In various embodiments, the control module 100 may further transmit the updated guest control interface to the connected display device. The connected display device may receive the updated guest control interface from the control module over a connected device network, which may comprise a closed area network. For example, the connected device network may comprise a passive data transmission interface. For example, the connected display device may communicate with the control module 100 using a wired multi-point interface (MPI) connection, so as to avoid an internet-dependent transmission of signals requiring, for example, a remote server and/or a "cloud".

As indicated at Block 1008, connected device status data may be retrieved from the control module 100 by the personal control device 121. In various embodiments, a personal control device 121 executing the enterprise mobile application may receive a notice signal from the control module 100 and may retrieve connected device status data from the control module 100 in response. In various embodiments, in order to retrieve the connected device status data from the control module 100, the personal control device 121 may transmit control credential data to the control module 100 such that the control module 100 may verify that the personal control device 121 is authorized to access the connected device status data. As described herein, the control module 100 may verify the control credential data received from the personal control device 121 by comparing it to room credential data being temporarily stored on the volatile memory of the control module. Where it is determined that the control credential data corresponds to the room credential data, the control credential data may be verified by the control module 100 and the personal control device 121 may establish a connection with the control module 100. As described herein, the control credential data and may serve as a cryptographic key that is verified by the control module 100 to ensure that the personal control device 121 attempting to retrieve the connected device status data is authorized to do so. In various embodiments, a personal control device 121 executing the enterprise mobile application may retrieve connected device status data from a control module 100 upon establishing a connection with the control module 100. In various embodiments, the personal control device 121 executing the enterprise mobile application may retrieve connected device status data from the control module 100 over the same client control network described above with respect to Blocks 1002 and 1008 (i.e. the same client control network used to transmit the instructional signal from the personal control device 121 to the control module 100). In various embodiments, a connected device status data may be retrieved via either the same or a different network channel.

As indicated at Block 1009, one or more connected device status indicators associated with the connected device status data may be displayed at a personal control device 121. In various embodiments, a connected device status indicator may comprise one or more items of data associated with a connected device and a corresponding connected device status that indicate the present connected device status of the connected device. One or more connected device status indicators, each respectively associated with a connected device and a corresponding connected device status, may be displayed at a personal control device 121 executing the enterprise mobile app. The one or more connected device status indicators may be rendered for display within the guest control interface. A connected device status indicator may be configured to indicate the connected device status of the connected device with which the indicator is associated. For example, continuing the non-limiting example used above in describing various Blocks, a connected device status indicator corresponding to the second connected device status of the connected device 111 may be displayed by the personal control device 121 executing the enterprise mobile app.

As shown at Block 1010, an instructional signal may be transmitted from a local control device 122 to the control module 100. As described herein, the instructional signal from the local control device 122 may be representative of a guest command of "OK" at the user interface of the local control device 122. In various embodiments, user input at the user interface of the local control device 122 may define a user's navigation of a cursor throughout the guest control interface. Further, user input at the user interface of the local control device 122 may be indicative of a guest command to change the connected device status of a connected device 111 from a first connected device status to a second connected device status. The instructional signal transmitted from the local control device 122 to the control module 100 may be transmitted over a client control network, as described herein. In various embodiments, the client control network may comprise a closed area network. For example, the client control network may comprise an infrared (IR) network, wherein the local control device 122 may communicate with the control module 100 using, at least in part, an IR communication protocol, so as to avoid an internet-dependent transmission of signals requiring, for example, a remote server and/or a "cloud." In various embodiments, the control module 100 may comprise an IR receiver configured to receive signals transmitted using an infrared protocol from a local control device 122. Alternatively, in various embodiments, the control module 100 may be connected to an infrared receiver configured to receive signals transmitted using an infrared protocol from a local control device 122 and transmit the received infrared signal directly to the control module 100. In various embodiments, the infrared receiver may be a stand-alone component in communication with the control module 100. Alternatively, the connected display device may comprise an infrared receiver and may be configured to transmit one or more signals received from a local control device 122 directly to the control module 100. In such circumstances, the infrared receiver and/or the connected display device act as a relay for the instructional signal received from the local control device 122.

In various embodiments, the client control network may comprise a Bluetooth Low Energy network, wherein the local control device 122 may communicate with the control module 100 using, at least in part, a Bluetooth communication protocol. In such a circumstance, the instructional signal may be associated with the connected device 111 and the corresponding second connected device status thereof. In various embodiments, the instructional signal transmitted from the television remote control 122 to the control module 100 may comprise data associated with a connected display device, such as, for example, a television, located in the hospitality environment.

As indicated at Block 1011, the control module 100 may transmit an instructional signal corresponding to the connected device 111. The control module 100 may be configured to receive an instructional signal from a local control device 122—for example, via a connected display device acting as a relay for the instructional signal—representative of a guest command of "OK" at the user interface of the local control device 122. The interface circuitry of the control module 100 may be configured to know the position of an interface selection indicator (e.g., a cursor) within a guest control interface displayed on a connected display device at any given time such that the control module 100 may be configured to identify the particular guest control interface option associated with the instructional signal received from the local control device 122 at Block 1010. The control module 100 may be configured to generate an instructional signal which corresponds to the action requested by the user. For example, the control module 100 may be configured to accordingly associate an instructional signal with a connected device 111 and a connected device status associated therewith. The control module 100 may transmit the instructional signal to the connected device 111 over a connected device network, as described herein. In various embodiments, the connected device network may comprise a closed area network. For example, the connected device network may comprise a personal area network. For example, the control module 100 may communicate with the connected device 111 using, at least in part, a Zigbee protocol, so as to avoid an internet-dependent transmission of signals requiring, for example, a remote server and/or a "cloud."

The connected device 111 may receive the instructional signal from the control module 100, and, as shown at Block 1012, the connected device may update its connected device status to reflect the connected device status associated with the instructional signal. For example, continuing the example used in describing Blocks 1010 and 1011, the connected device 111 may be configured to update its connected device status to a third device status (from a second connected device status), as described herein.

As shown at Block 1013, upon the updating of the connected device status of the connected device 111, a status signal may be transmitted from the connected device 111 to the control module 100. The status signal transmitted from the connected device 111 may correspond to the updated connected device status of the connected device 111. For example, continuing the non-limiting example used above in describing various Blocks, the status signal transmitted from the control device 111 to the control module 100 may be associated with the connected device 111 and a corresponding third connected device status. The status signal transmitted from the connected device 111 to the control module 100 may be transmitted over a connected device network, as described herein. In various embodiments, the connected device network may comprise a closed area network. For example, the connected device network may comprise a personal area network. In various embodiments, a status signal transmitted from the connected device 111 to the control module 100 may be transmitted over the same connected device network described above with respect to Block 1011 (i.e. the same connected device network used to transmit the instructional signal from the control module 100 to the connected device 111). In various embodiments, a status signal may be transmitted to the control module 100 via either the same or a different network channel.

At Block 1014, the control module 100 may receive the status signal from the connected device 111, and as indicated, the connected device status data the control module 100 may be accordingly updated by the control module 100. As described herein, the connected device status data may comprise a compilation of data (e.g., a list and/or an array) corresponding to a connected device status of each connected device of at least one connected device located in the hospitality environment. In various embodiments, the connected device status data may be refreshed, in part or in whole, to reflect a connected device status corresponding to the status signal received from the connected device 111. For example, continuing the non-limiting example used above in describing various Blocks, wherein the status signal transmitted from the control device 111 to the control module 100 may be associated with the connected device 111 and a corresponding third connected device status, the connected device status data may be refreshed, such that the connected device status data reflects that the present status of the connected device 111 is a third connected device status.

As indicated at Block 1015, a notice signal may be transmitted from the control module 100 to the personal control device 121 executing an enterprise mobile app. In various embodiments, a notice signal may comprise a subscription notification that may be transmitted from a control module 100 to a personal control device 121 or interface circuitry of the control module 100 when a connected device status data has changed, as described herein. For example, continuing the non-limiting example used above in describing various Blocks, a notice signal may be transmitted from the control module 100 to the personal control device 121 upon the refresh of connected device status data to reflect the present status of the connected device 111 as being the third connected device status. A notice signal transmitted from the control module 100 to the personal control device 121 executing the enterprise mobile application may be transmitted over a client control network, as described herein. In various embodiments, a notice signal transmitted from the control module 100 to the personal control device 121 may be transmitted over the same client control network described above with respect to Blocks 1001 and 1007 (i.e. the same client control network used to transmit the first instructional signal from the personal control device 121 to the control module 100). In various embodiments, the client control network used to transmit the notice signal from the control module to the personal control device 121 may be the same network connection established when the personal control device 121 began executing the enterprise mobile app. In various embodiments, a notice signal may be transmitted to the control module 100 via either the same or a different network channel.

Further, a notice signal may be generated by a control module 100 and transmitted to an interface circuitry within the control module 100, wherein the interface circuitry may be configured to generate a guest control interface for display on a connected display device, monitor guest interaction with the guest control interface, and update the one or more connected device status indicators within the guest control interface to accurately reflect one or more current connected device status data. In such a circumstance, continuing the non-limiting example used above in describing various Blocks, the notice signal may be transmitted from the control module 100 to the interface circuitry within the control module 100 upon the refresh of the connected device status data to reflect the third connected device status. In response, the interface circuitry of the control module 100 may be configured to retrieve the updated connected device status data and accordingly transmit data to a connected display device to reflect the present status of the connected device 111. The connected display device may be configured to display one or more connected device status indicators representative of the updated connected device status data within the guest control interface to reflect the present status of the connected device 111 as being the third connected device status. The connected display device may receive the updated guest control interface from the control module over a connected device network, which may comprise a closed area network, such as, for example, a passive data transmission interface. For example, a guest control interface transmitted from the control module 100 to the connected display device may be transmitted over the same connected device network described above with respect to Block 1007.

As indicated at Block 1016, connected device status data may be retrieved from the control module 100 by the personal control device 121. In various embodiments, a personal control device 121 executing the enterprise mobile application may receive a notice signal from the control module 100 and may retrieve connected device status data from the control module 100 in response. In various embodiments, in order to retrieve the connected device status data from the control module 100, the personal control device 121 may transmit control credential data to the control module 100 such that the control module 100 may verify that the personal control device 121 is authorized to access the connected device status data. As described herein, the control module 100 may verify the control credential data received from the personal control device 121 by comparing it to room credential data being temporarily stored on the volatile memory of the control module. Where it is determined that the control credential data corresponds to the room credential data, the control credential data may be verified by the control module 100 and the personal control device 121 may establish a connection with the control module 100. As described herein, the control credential data and may serve as a cryptographic key that is verified by the control module 100 to ensure that the personal control device 121 attempting to retrieve the connected device status data is authorized to do so. In various embodiments, a personal control device 121 executing the enterprise mobile application may retrieve connected device status data from a control module 100 upon establishing a connection with the control module 100. In various embodiments, the personal control device 121 executing the enterprise mobile application may retrieve connected device status data from the control module 100 over the same client control network described above with respect to one or more of Blocks 1001, 1007, and 1015 (i.e. the same client control network used to transmit the notice signal from the control module 100 to the personal control device 121). In various embodiments, a connected device status data may be retrieved via either the same or a different network channel.

As indicated at Block 1017, one or more connected device status indicators associated with the connected device status data may be displayed at a personal control device 121. A connected device status indicator may comprise one or more items of data associated with a connected device and a corresponding connected device status that indicate the present connected device status of the connected device. In various embodiments, one or more connected device status indicators, each respectively associated with a connected device and a corresponding connected device status, may be displayed at a personal control device 121 executing the enterprise mobile app. The one or more connected device status indicators may be rendered for display within a guest control interface. A connected device status indicator may be configured to indicate the connected device status of the connected device with which the indicator is associated. For example, continuing the non-limiting example used above in describing various Blocks, a connected device status indicator corresponding to the third connected device status of the connected device 111 may be displayed by the personal control device 121 executing the enterprise mobile app.

f. Sixth Example Hospitality Environment Configuration Operation

Figure 11:
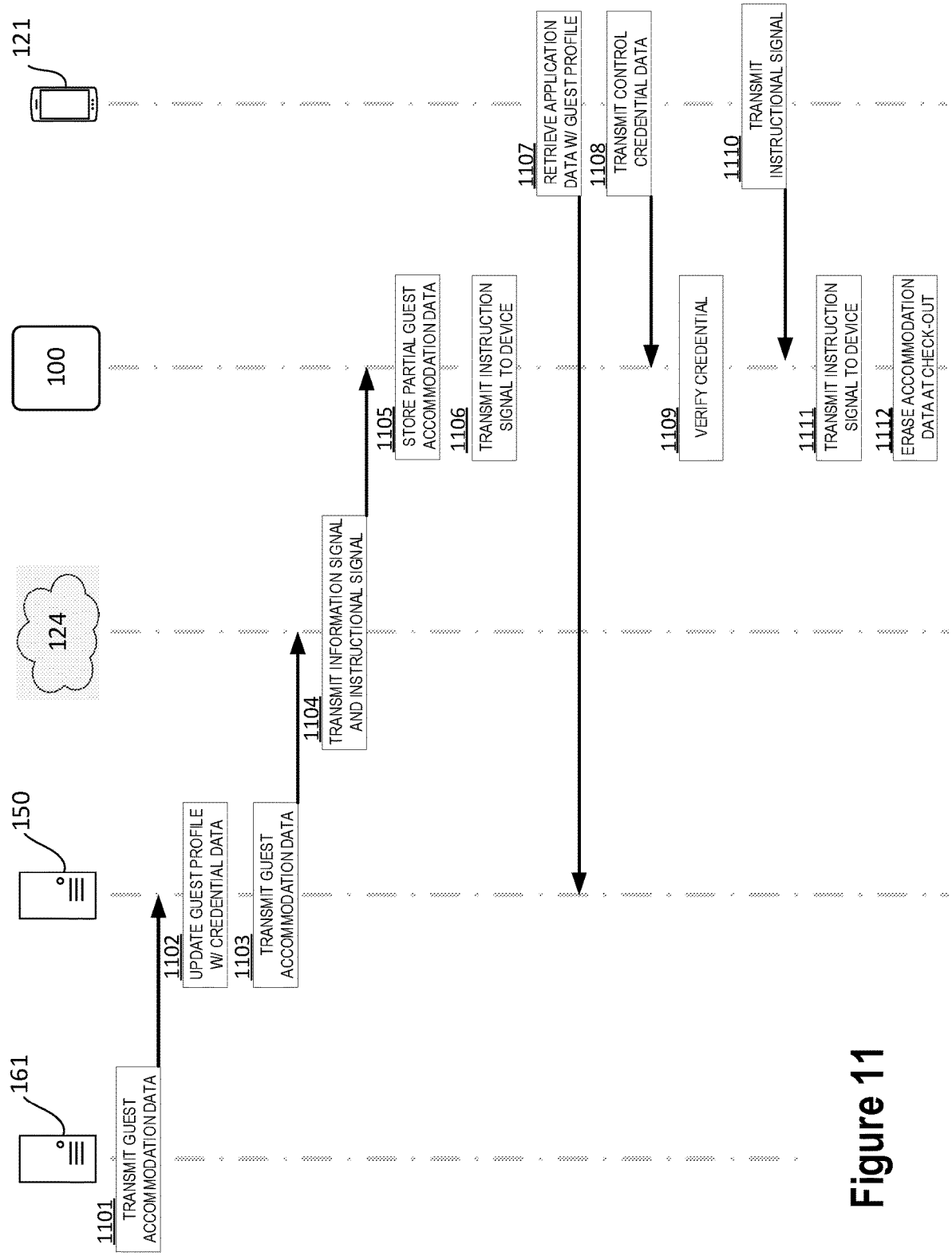
FIG. 11 illustrates a flowchart showing an example functionality of an exemplary configuration according to an embodiment.

FIG. 11 illustrates the operation of an example embodiment in which a hospitality environment is configured based in part on guest preference data, and a connected device located within the hospitality environment is subsequently controlled using a personal control device 121.

As shown at Block 1101, guest accommodation data may be transmitted from a property computing entity 161 to an enterprise computing entity 150. A property computing entity may comprise the property management system of a particular hospitality establishment. The property computing entity 161 may be configured to store and/or transmit various data associated with the hospitality establishment and/or guests thereof, such as, for example, energy savings data, welcome environment data, and/or guest accommodation data. In various embodiments, guest accommodation data may comprise guest reservation data and/or guest profile data. Guest reservation data may comprise informational data related to a guest's reservation, such as, for example, check-in time, check-in status, check-out time, check-out status, length of stay, establishment name, and/or assigned environment room number. As described herein, guest profile data may comprise data associated with an account and/or profile associated with an enterprise customer, such as, for example, guest name data, guest history data, guest status data, guest preference data, room credential data, and/or control credential data. In various embodiments, a room credential data may be associated with a guest reservation data. The property computing entity 161 may be configured to communicate with the enterprise computing entity 150 via an enterprise property network, as described herein. In various embodiments, the property computing entity 161 may transmit the guest accommodation data as an information signal to the enterprise computing entity 150 via an enterprise property network. In various embodiments, an information signal comprising guest accommodation data may be transmitted to the enterprise computing entity 150 upon a guest's check-in to a hospitality establishment. For example, the information signal comprising the guest accommodation data and transmitted to the enterprise computing entity 150 may comprise guest reservation data (e.g., check-in time, check-in status, check-out time, check-out status, length of stay, establishment name, and/or assigned environment room number), and at least partial guest profile data, such as, for example, room credential data, control credential data, guest name data, and guest preference data.

As shown at Block 1102, a guest profile associated with a hospitality establishment guest may be updated to reflect the unique credential data generated for use throughout a guest's reservation. The enterprise computing entity 150 may comprise an enterprise server associated with a hospitality enterprise comprising the hospitality establishment, which may comprise the hospitality environment reserved by a guest. The enterprise computing entity 150 may receive guest accommodation data from the property computing entity 161 and may associate a room credential data and a control credential data with a guest's enterprise guest profile. In various embodiments, the control credential data may be further associated with the application data. Alternatively, in various embodiments, the operation of 1102 may be executed at a property computing entity 160.

As shown at Block 1103, guest accommodation data may be transmitted from an enterprise computing entity 150 to an enterprise control entity 124. The enterprise control entity 124 may comprise an enterprise-controlled, internet-based interface for communicating with various computing entities, such as, for example, the enterprise computing entity 150 and one or more control modules 100. The enterprise computing entity 150 may transmit the guest accommodation data as an information signal to the enterprise control entity 124 via an enterprise corporate network, as described herein. In various embodiments, an information signal comprising the guest accommodation data transmitted to the enterprise control entity 124 may correspond to the guest accommodation data transmitted from the property computing entity 161 to the enterprise computing entity 150, as described above at Block 1101. For example, the information signal comprising the guest accommodation data and transmitted to the enterprise control entity 124 may comprise guest reservation data (e.g., check-in time, check-in status, check-out time, check-out status, length of stay, establishment name, and/or assigned environment room number), and at least partial guest profile data, such as, for example, room credential data, control credential data, guest name data, and guest preference data.

As shown at Block 1104, an instructional signal and an information signal may be transmitted from the enterprise control entity 124 to a control module 100 located in a hospitality environment. In various embodiments, the enterprise control entity 124 may receive and process the guest accommodation data transmitted through the information signal. The enterprise control entity 124 may identify one or more guest preference data present within the guest accommodation data, which may be associated with one or more connected devices and a corresponding preferred connected device status thereof. In such a circumstance, an instructional signal corresponding to a connected device and the guest's preferred connected device status thereof may be generated by the enterprise control entity 124. The instructional signal may be transmitted by the enterprise control entity 124 to the control module 100. In such circumstances, the instructional signal transmitted from the enterprise control entity 124 may functionally mimic a user input from a hospitality enterprise employee or any other authorized individual at an enterprise control interface defined by the enterprise control entity 124. Further, an informational signal comprising a partial guest accommodation data may be transmitted by the enterprise control entity 124 to the control module 100. In various embodiments, the information signal transmitted to the control module 100 may correspond to at least a portion of the guest accommodation data transmitted from the enterprise computing entity 150 to the enterprise control entity, as described above at Block 1103. For example, the information signal comprising the partial guest accommodation data and transmitted to the control module 100 may comprise guest reservation data (e.g., check-in time, check-in status, check-out time, check-out status, length of stay, establishment name, and/or assigned environment room number), and at least partial guest profile data, such as, for example, room credential data and guest name data. In various embodiments, the one or more instructional signals and the one or more informational signals transmitted to the control module 100 may comprise anonymous data that, although it corresponds to various aspects of a guest's enterprise guest profile, does not comprise any identifying information or data specifically from a guest's enterprise guest profile. In various embodiments, both the instructional signal and the informational signal comprising the partial guest accommodation data may be transmitted from the enterprise control entity 124 to the control module 100 via an enterprise control network, as described herein. For example, the enterprise control network may comprise either a wired or wireless internet-based network, wherein the enterprise control entity 124 may use a protocol such as, for example, internet protocol (IP) to communicate with the control module 100. The control module 100 may be one of a plurality of control modules located respectively in various hospitality environments throughout the hospitality establishment. In such a circumstance, it may be determined that the one or more communication signals from the enterprise control entity 124 should be transmitted to the particular control module 100 based at least in part on guest reservation data and/or one or more control module characteristics, such as, for example, a MAC address.

At Block 1105, partial guest accommodation data transmitted from the enterprise control entity 124 may be stored by the control module 100. In various embodiments, the partial guest accommodation data received by the control module 100 may be stored on the volatile memory of the control module 100, or any other appropriate storage mechanism configured to retain the partial guest accommodation data for the duration of a guest's reservation. The control module 100 may store the partial guest accommodation data, such as, for example, guest reservation data, guest name data, and room credential data, for temporary access and/or use during one or more other operations of the control module 100.

At Block 1106, an instructional signal may be transmitted from the control module 100 to a connected device of the at least one connected devices located in the same hospitality environment as the control module. The instructional signal transmitted from the control module 100 to the connected device may correspond to the instructional signal generated in response to one or more identified guest preference data. For example, the instructional signal transmitted from the control module 100 to the connected device may be associated with the connected device and a guest's preferred connected device status thereof, as was exemplarily described above with respect to Block 1104. The instructional signal transmitted from the control module 100 to the connected device may be transmitted over a connected device network, as described herein. In various embodiments, the connected device network may comprise a closed area network. For example, the connected device network may comprise a personal area network. For example, the control module 100 may communicate with the connected device 111 using, at least in part, a Zigbee protocol, so as to avoid an internet-dependent transmission of signals requiring, for example, a remote server and/or a "cloud." In various embodiments, the instructional signal transmitted from the control module 100 to the connected device—and the subsequent updating of the corresponding connected device status—may operate to pre-configure a hospitality environment upon a guest's check-in. It should be understood that while FIG. 11 describes pre-configuring a hospitality environment in light of guest preference data, a hospitality may alternatively, or in combination, be pre-configured in light of energy savings data and/or welcome environment data, as described herein.

As shown in Block 1107, application data comprising at least a partial guest profile data may be retrieved from the enterprise computing entity 150 by a personal control device 121. As described herein, a personal control device may be a computer, such as, for example, a guest's personal mobile or tablet, configured to execute an enterprise mobile app associated with a hospitality enterprise. Application data may comprise data utilized to execute the enterprise app on the personal client computing entity 121. In various embodiments, partial guest profile data may comprise at least a portion of the data associated with an enterprise profile associated with an enterprise customer, such as, for example, guest name data, guest history data, guest preference data, and control credential data. The partial guest profile data may be associated with the application data. The personal control device 121 may retrieve the application data by executing the enterprise mobile app. In various embodiments, executing the enterprise mobile app may comprise logging in to a guest account associated with an enterprise guest profile. The application data and the partial guest profile data may be retrieved from the computing entity 150 by the personal control device 121 executing the enterprise mobile app via an enterprise mobile application network, as described herein. In various embodiments, various guest profile data such as, for example, guest preference data associated with a guest's favorite television channel preferences or preferred content application data, may be retrieved from a third-party content server by a personal control device 121 executing an enterprise mobile application. The personal control device 121 may retrieve application data from an enterprise computing entity 150 via an enterprise mobile application network, wherein the enterprise mobile application network comprises a different communication network than any of the connected device networks, client control networks, or enterprise control networks described herein.

At Block 1108, in order for the personal control device 121 to connect to the control module 100, control credential data may be transmitted from the personal control device 121 to the control module 100 when the personal control device 121 begins executing the enterprise mobile application. The control credential data may be part of the partial guest profile data retrieved with the application data, as described above with respect to Block 1107. In various embodiments, the control credential data transmitted to the control module 100 may comprise anonymous data that, although it corresponds to various aspects of a guest's enterprise guest profile (e.g., guest reservation data or a password), does not comprise any identifying information or data specifically from a guest's enterprise guest profile. In various embodiments, the control module 100 may beacon various identifying data corresponding to the hospitality environment within which the control module 100 is located. In various embodiments, an enterprise mobile application being executed on a personal control device may recognize identifying data beaconed from the control module. Accordingly, upon executing an enterprise mobile application, a personal control device 121 may receive the identifying data beaconed from the control module 100 and, based at least in part on the partial guest profile data, verify that the control module 100 is the particular control module with which the personal control device 121 is authorized to connect. For example, the personal control device 121 may verify that hospitality environment identified in the identifying data beaconed by the control module 100 is the same as the hospitality environment assigned to a guest according to the partial guest profile data. In such a circumstance, upon verifying that the identifying data recognized by the personal control device 121 was beaconed from the control module 100 with which the personal control device 121 is authorized to connect, the personal control device 121 executing the enterprise mobile application may transmit the control credential data to the control module 100. For example, each time the personal control device 121 logs in to the enterprise mobile application using an enterprise customer account (i.e. when the personal control device begins to execute the enterprise mobile application), the personal control device 121 may transmit control credential data 121 to control module 100 to be verified.

While the personal control device 121 may transmit control credential data prior to each instance of the personal control device 121 attempting to retrieve connected device status data from the control module 100, it should also be understood that the control module 100 may require credential data to be verified each time it sends an instructional signal to the control module 100. For example, along with each instruction signal transmitted to the control module 100 by the personal control device 121, the personal control device 121 may transmit control credential data to control module 100 to be verified.

At Block 1109, the control credential data transmitted from the personal control device 121 to the control module 100 may verified by the control module 100. In various embodiments, as described herein, the control module 100 may verify the control credential data received from the personal control device 121 by comparing it to the room credential data being temporarily stored on the volatile memory of the control module. In various embodiments, the control credential data may be associated with the personal control device 121, and thus, with the enterprise guest profile of the guest positioned within the hospitality environment attempting to communicate with the control module 100. In various embodiments, the room credential data may be associated with the enterprise guest profile of the guest determined by the property computing entity 161 to have reserved the hospitality environment in which the control module 100 is located, as described above, with respect to, for example, Block 1102. The control credential may be verified by the control module 100 where it is determined that the control credential data corresponds to the room credential data being stored at the control module 100. As described herein, in various embodiments, the control credential data and may serve as a cryptographic key that is verified by the control module 100 to ensure that the personal control device 121 attempting to connect to the control module 100 is authorized to do so. In various embodiments, a connection between the personal control device 121 and the control module 100 may be established upon verification of the control credential data.

As shown at Block 1110, an instructional signal may be transmitted from the personal control device 121 to a control module 100. In various embodiments, the instructional signal transmitted from the personal control device 121 may correspond to a user input from a guest at a guest control interface displayed on the personal control device 121 executing the enterprise mobile app. As described herein, the instructional signal may be associated with a connected device and a corresponding connected device status thereof. For example, the user input may be indicative of a guest command to change the connected device status of a connected device from a first connected device status to a second connected device status. In such a circumstance, the instructional signal may be associated with the connected device and the corresponding second connected device status thereof. The first connected device status may correspond to a guest's preferred connected device status. For example, the client control network may comprise a Bluetooth Low Energy (BLE) network, wherein the personal control device 121 may communicate with the control module 100 using, at least in part, a Bluetooth (e.g., BLE) wireless protocol, so as to avoid an internet-dependent transmission of signals requiring, for example, a remote server and/or a "cloud."

As indicated at Block 1111, instructional signal may be transmitted from the control module 100 to a connected device. The instructional signal transmitted from the control module 100 to the connected device may correspond to the verified instructional signal received by the control module 100 from the personal client control device 121. For example, the instructional signal transmitted from the control module 100 to the connected device may be associated with the connected device and a corresponding second connected device status thereof, as was exemplarily described above with respect to Block 1108. The instructional signal transmitted from the control module 100 to the connected device may be transmitted over a connected device network, as described herein. For example, the connected device network may be transmitted over the same connected device network described above with respect to Block 1106 (i.e. the same connected device network used to transmit the instructional signal used to pre-configure the hospitality environment from the control module 100 to the connected device).

As indicated at Block 1112, the guest accommodation data being stored on the control module 100 may be erased upon a determination that a guest has checked out and/or duration of the stay of the guest's reservation has expired. As described above with respect to Block 1105, at least a portion of the guest accommodation data transmitted from the enterprise control entity 124 may be stored on the control module 100. For example, the partial guest accommodation data received by the control module 100 may store on the volatile memory of the control module 100, or any other appropriate storage mechanism configured to retain the partial guest accommodation data for the duration of a guest's reservation. Further, in various embodiments, a control module 100 may collect and temporarily store guest input data received and/or generated based on user-designated settings or information input by a guest throughout the duration of the guest's stay. Guest input data may comprise, for example, guest preference data established during a guest's interaction with the control module 100 (e.g., favorite channels selected by the guest via the television interface, preferred weather report locations), content application credentials (e.g., Netflix password, Spotify password), or any other settings input by a guest while interacting with the control module 100. In various embodiments, based at least in part on guest reservation data (e.g., check-out time, check-out status, length of reservation), the guest accommodation data received from the enterprise control entity 124 and any guest input data received by the control module 100 during a guest's interaction with the hospitality environment may be erased upon the earlier of the guest's checkout or expiration of the reservation. It should be understood that, although FIG. 11 illustrates that the control module 100 may execute the operation of erasing the guest accommodation—and other guest input data—at guest check-out, in various embodiments the data may be erased from the control module 100 based at least in part on a communication signal transmitted from the property computing entity 161 to the control module 100.

V. Exemplary Hospitality Enterprise

Figure 12:
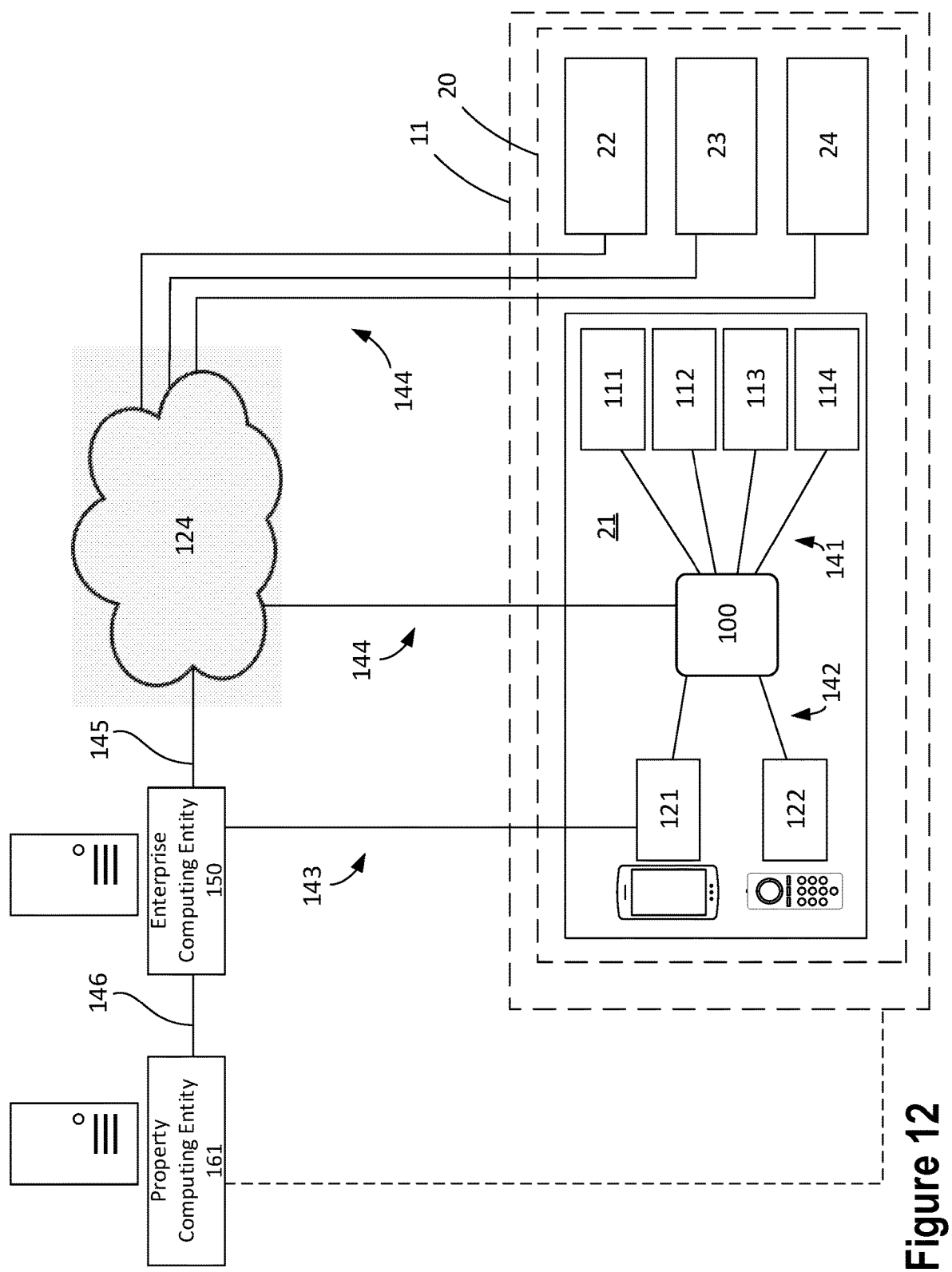
FIG. 12 schematically illustrates data flows among components in accordance with some embodiments discussed herein.
Figure 13:
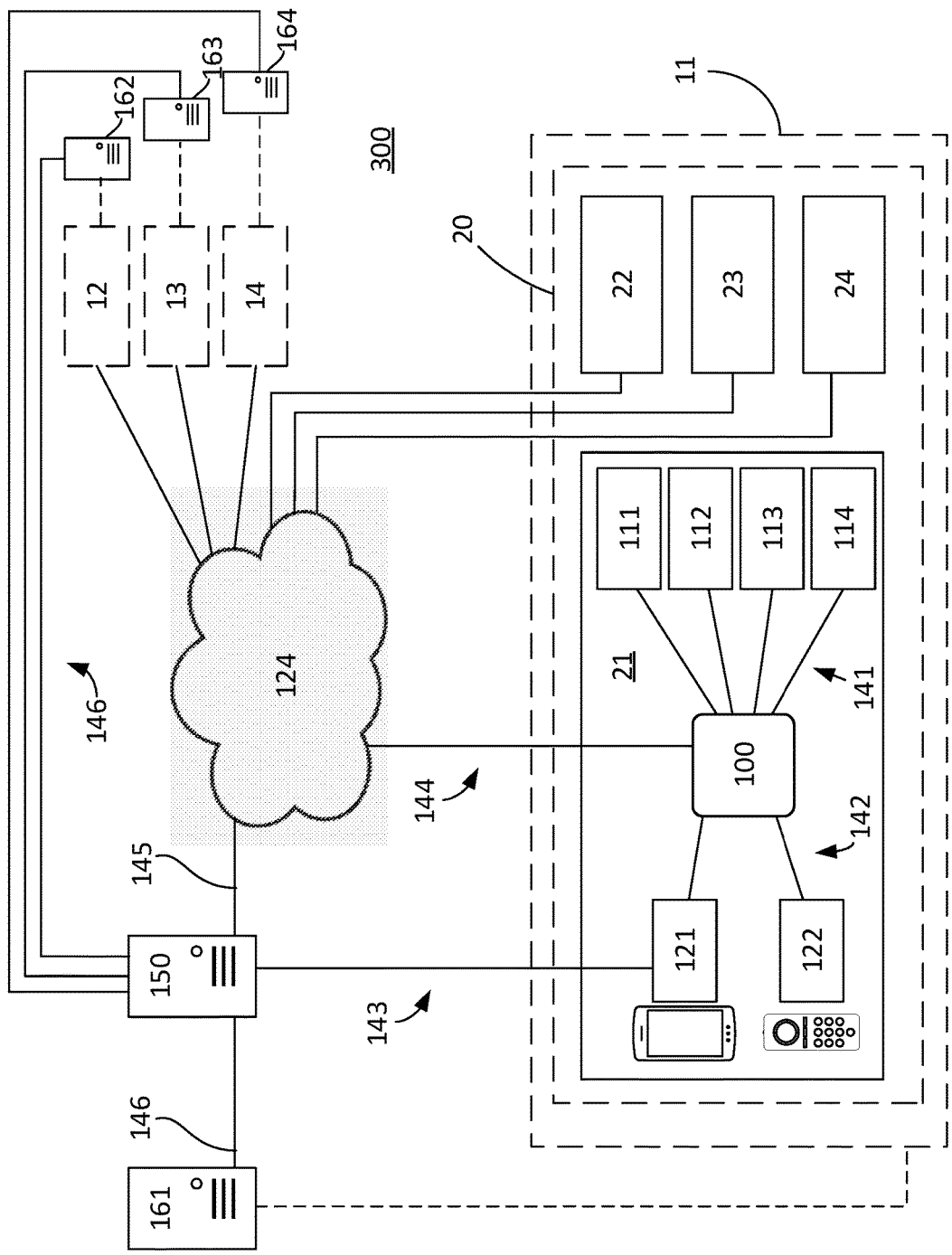
FIG. 13 schematically illustrates data flows among components in accordance with some embodiments discussed herein.

FIGS. 12 and 13 schematically illustrate data flows among various components of an exemplary hospitality system. In various embodiments, a hospitality system as described herein may be configured to configure a plurality of hospitality environments located in a plurality of hospitality establishments, the plurality of hospitality establishments defining, at least in part, a hospitality establishment.

As shown in FIG. 12, a hospitality establishment 11 may comprise one or more hospitality environments (e.g., 21, 22, 23, 24) of a plurality of hospitality environments 20. For example, a hospitality establishment, as discussed herein, may comprise a singular hotel property. The hospitality establishment may have a property computing entity 161 associated therewith and comprising a property management system. The property computing entity 161 may be configured to store and/or transmit various data associated with the hospitality establishment and/or guests thereof, such as, for example, energy savings data, welcome environment data, guest accommodation data, and/or guest profile data. The property computing entity 161 may be configured to communicate with the enterprise computing entity 150 via an enterprise property network 146, as described herein. In various embodiments, the enterprise computing entity 150 may comprise an enterprise server associated with a hospitality enterprise comprising at least one hospitality establishments (e.g., 11), each of the at least one hospitality establishments comprising one or more hospitality environments 21. The enterprise computing entity 150 may be configured to store and/or transmit various data associated with the hospitality establishment and/or guests thereof, such as, for example, application data, energy savings data, welcome environment data, guest accommodation data and/or guest profile data. The enterprise computing entity 150 may be configured to communicate with the enterprise control entity 124 via an enterprise corporate network 145, as described herein. Further, the enterprise computing entity 150 may be configured to communicate with a personal control device 121, such as, for example, a personal control device, via an enterprise mobile application network 143, as described herein.

The enterprise control entity 124 may comprise an enterprise-controlled, internet-based interface for communicating with various computing entities, such as, for example, the enterprise computing entity 150. For example, the enterprise control entity 124 may be configured to receive one or more communication signals from the enterprise computing entity 150 via the enterprise corporate network 145. Further, the enterprise control entity 124 may be configured to communicate with each control module 100 located within the respective hospitality environments (e.g., 21, 22, 23, 24) of the plurality of hospitality environments 20 located within the hospitality establishment 11. For example, as a further, non-limiting example, the enterprise control entity 124 may be configured to transmit and receive one or more communication signals to each of the control modules 100 located within the plurality of hospitality environments 20 via respective enterprise control networks 144, as described herein. In various embodiments, the enterprise control entity 124 may be configured to display the connected device status data associated each of the control modules 100 located within the respective hospitality environments of the plurality of hospitality environments 20. The enterprise control entity 124 may be further configured to display various informational data, such as, for example, hospitality establishment name and hospitality environment room number associated with the various connected device status data.

As illustrated in FIG. 12, the control module 100 located in the hospitality environment 21 may be configured to communicate with a personal control device 121 and a local control device 122 via respective client control networks 142, as described herein. Further, as illustrated, the at least one connected device comprises four connected devices 111, 112, 113, 114, each of which may be configured to communicate with the control module 100 located in the same hospitality environment 21 via respective connected device networks 141, as described herein. As discussed above, the personal control device 121 may be further configured to communicate with enterprise computing entity 150 using an enterprise mobile application network 143.

As shown in FIG. 13, a hospitality enterprise 300 may comprise one or more hospitality establishments (e.g., 11, 12, 13, 14), each hospitality establishment comprising one or more hospitality environments (e.g., 21, 22, 23, 24) of a plurality of hospitality environments 20. For example, a hospitality establishment, as discussed herein, may comprise a singular hotel property, while a hospitality enterprise may comprise a chain of hotels. The hospitality enterprise may comprise one or more property computing entities 160, as described herein, each of which (e.g., 161, 162, 163, 164) is associated with a respective hospitality establishment (e.g., 11, 12, 13, 14) of the at least one hospitality establishments defined by the hospitality enterprise 300. Each of the one or more property computing entities 161, 162, 163, 164 may be configured to store and/or transmit various data associated with the hospitality establishment with which it is respectively associated and/or the guests thereof, such as, for example, energy savings data, welcome environment data, guest accommodation data, and/or guest profile data. Each of the one or more property computing entities 160 may be configured to communicate with the enterprise computing entity 150 via a respective enterprise property network 146, as described herein. In various embodiments, the enterprise computing entity 150 may comprise an enterprise server associated with a hospitality enterprise 300. The enterprise computing entity 150 may be configured to store and/or transmit various data associated with the one or more hospitality establishments and/or guests thereof, such as, for example, application data, energy savings data, welcome environment data, guest accommodation data and/or guest profile data. The enterprise computing entity 150 may be configured to communicate with the enterprise control entity 124 via an enterprise corporate network 145, as described herein. Further, the enterprise computing entity 150 may be configured to communicate with one or more control devices, such as, for example, a personal control device, via one or more enterprise mobile application networks 143, as described herein.

The enterprise control entity 124 may comprise an enterprise-controlled, internet-based interface for communicating with various computing entities, such as, for example, the enterprise computing entity 150 and/or at least one of a plurality of control modules 100 located respectively in each of the plurality of hospitality environments 20. For example, the enterprise control entity 124 may be configured to receive one or more communication signals from the enterprise computing entity 150 via the enterprise corporate network 145. Further, the enterprise control entity 124 may be configured to communicate with each control module 100 located within the respective hospitality environments (e.g., 21, 22, 23, 24) of the plurality of hospitality environments 20 of the hospitality enterprise 300. For example, as a further, non-limiting example, the enterprise control entity 124 may be configured to transmit and receive one or more communication signals to and from at least one of a plurality of control modules 100 located respectively in each of the plurality of hospitality environments 20 via respective enterprise control networks 144, as described herein. In various embodiments, the enterprise control entity 124 may be configured to display the connected device status data associated each control modules 100 of the plurality of control modules. The enterprise control entity 124 may be further configured to display various informational data, such as, for example, hospitality establishment name and hospitality environment room number associated with the various connected device status data. As illustrated in FIG. 13, the personal control device 121 and the local control device 122, may each be configured to communicate with the control module 100 of in the same hospitality environment 21 via respective client control networks 142, as described herein. Further, as illustrated, the at least one connected device of the plurality of at least one connected devices comprises four connected devices 111, 112, 113, 114, each of which may be configured to communicate with a control module 100 of the plurality of control modules located in the same hospitality environment 21 via respective connected device networks 141, as described herein. As discussed above, the personal control device 121 may be further configured to communicate with enterprise computing entity 150 using an enterprise mobile application network 143.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A hospitality system for configuring a hospitality environment, the system comprising:
   an enterprise control entity;
   at least one connected device located in a hospitality environment, the at least one connected device being configured to define at least two connected device statuses;
   a local control device; and
   a control module located in the hospitality environment configured to receive one or more communication signals from each of the enterprise control entity, the local control device, and a personal control device;
   wherein the control module is further configured to receive one or more communication signals from the at least one connected device via a connected device network;
   wherein the control module is further configured to receive one or more communication signals directly from the local control device and the personal control device via respective client control networks, each client control network comprising a closed area network;
   wherein the control module is further configured to receive one or more communication signals such that the enterprise control entity, the local control device, and the personal control device can interchangeably and independently control the at least one connected device.

2. The hospitality system of claim 1, wherein the control module is configured to communicate with the personal control device via a first client control network, and with the local control device via a second client control network; wherein the first client control network comprises a Bluetooth Low Energy (BLE) network and the second client control network comprises an infrared (IR) network.

3. The hospitality system of claim 1, wherein the control module is configured to transmit one or more communication signals to each of the at least one connected device, the enterprise control entity and the personal control device.

4. The hospitality system of claim 3, wherein the control module is configured to transmit a content signal to at least one of the at least one connected device.

5. The hospitality system of claim 1, wherein the control module is configured to transmit connected device status data to the enterprise control entity.

6. The hospitality system of claim 1, wherein the control module is configured to transmit a notice signal in response to receiving a status signal from a connected device of the at least one connected device.

7. The hospitality system of claim 1, wherein each of the at least one connected device is configured to communicate with the control module via a respective connected device network, wherein each of the connected device networks comprises a closed area network.

8. The hospitality system of claim 1, wherein a communication signal comprises one or more of a status signal, an instructional signal, an information signal, a content signal, and a notice signal.

9. The hospitality system of claim 1, wherein the enterprise control entity comprises an internet-based interface configured to display a connected device status indicator corresponding to a connected device status associated with the at least one connected device.

10. The hospitality system of claim 1, wherein an enterprise computing entity is configured to store application data and guest profile data, and communicate with an enterprise mobile application installed on the personal control device via an enterprise mobile application network; wherein the enterprise mobile application is configured to retrieve the application data and the guest profile data from the enterprise computing entity; and wherein the control module is configured to receive one or more communication signals from the personal control device via the enterprise mobile application.

11. The hospitality system of claim 10, wherein the guest profile data comprises control credential data, wherein at least one of the communication signal received by the control module from the personal control device comprises the control credential data, and wherein the control module is configured to accept a communication signal transmitted from the personal control device upon verifying the control credential data.

12. The hospitality system of claim 11, wherein verifying the control credential data comprises comparing the control credential data to room credential data received by the control module from the enterprise control entity.

13. The hospitality system of claim 1, wherein the enterprise control entity is configured to transmit one or more information signals comprising guest accommodation data and room credential data to the control module.

14. The hospitality system of claim 1, wherein the enterprise control entity is configured to transmit one or more instructional signals to the control module, the one or more instructional signals corresponding to one or more connected device statuses associated with one or more of energy savings data, welcome environment data, and guest preference data.

15. The hospitality system of claim 1, wherein the enterprise control entity is configured to receive one or more information signals comprising guest accommodation data from an enterprise computing entity.

16. The hospitality system of claim 15, wherein the guest accommodation data comprises guest reservation data and room credential data.

17. The hospitality system of claim 1, wherein the control module is configured to erase guest accommodation data received from the enterprise control entity based at least in part on guest reservation data.

18. The hospitality system of claim 1, wherein the control module is configured to receive a communication signal from a connected door module associated with the hospitality environment, wherein the communication signal comprises a status signal corresponding to a door module battery charge level; and wherein the control module is configured to transmit the status signal corresponding to the door module battery charge level to the enterprise control entity.

19. A method for configuring a hospitality environment, the method comprising:
receiving at a control module located in a hospitality environment a status signal corresponding to a connected device status associated with a connected device of at least one connected device located in the hospitality environment;
updating a connected device status data at the control module to reflect at least the connected device status corresponding to the status signal received by the control module, wherein the connected device status data comprises data corresponding to a connected device status associated with each of the at least one connected device;
transmitting one or more communication signals from the control module to one or more of the at least one connected device and a personal control device;
transmitting the connected device status data to an enterprise control entity;
displaying at the enterprise control entity a connected device status indicator corresponding to the connected device status associated with the at least one connected device.

20. The method of claim 19, further comprising updating a connected device status associated with a connected device of at least one connected device located in the hospitality environment in response to user input at a user interface located at the connected device.

21. The method of claim 19, further comprising:
receiving at the control module a first instructional signal from one of the enterprise control entity, a local control device, and a personal control device, wherein the first instructional signal is associated with the connected device and the connected device status associated therewith;
transmitting a second instructional signal from a control module to the connected device to the connected device with which the first instructional signal was associated via a connected device network, the connected device network comprising a closed area network; and
updating at the connected device a connected device status of the connected device to the connected device status with which the first instructional signal was associated;
wherein the control module is configured to communicate with the local control device and the personal control device via a client control network comprising a closed area network.

22. The method of claim 21, wherein an enterprise computing entity is configured to store application data and guest profile data, and communicate with an enterprise mobile application installed on the personal control device via an enterprise mobile application network; wherein the enterprise mobile application is configured to retrieve the application data and the guest profile data from the enterprise computing entity; and wherein the control module is configured to receive one or more communication signals from the personal control device via the enterprise mobile application.

23. The method of claim 22, further comprising verifying at the control module the control credential data, wherein the guest profile data comprises control credential data, wherein each of the communication signals transmitted to the control module from the personal control device comprises the control credential data, and wherein the control module is configured to accept a communication signal transmitted from the personal control device upon verifying the control credential data.

24. The method of claim 19, wherein the control module is configured to communicate with a local control device and a personal control device via respective client control networks, wherein each of the client control networks comprises a wireless closed area network.

25. The method of claim 19, wherein the control module is configured to transmit one or more communication signals to each of the at least one connected device, the enterprise control entity, and the personal control device, wherein the control module is configured to transmit a content signal to at least one of the at least one connected device.

26. The method of claim 19, wherein each of the at least one connected device is configured to communicate with the control module via a respective connected device network, wherein each of the connected device networks comprises a closed area network.

27. The method of claim 19, further comprising receiving at the control module one or more information signals comprising guest accommodation data and room credential data from the enterprise control entity.

28. The method of claim 19, further comprising receiving at the control module one or more instructional signals from the enterprise control entity, the one or more instructional signals corresponding to one or more connected device statuses associated with one or more of energy savings data, welcome environment data, and guest preference data.

29. The method of claim 19, further comprising erasing guest accommodation data received from the enterprise control entity and stored at the control module based at least in part on guest reservation data.

30. A hospitality system for configuring a plurality of hospitality environments, the system comprising:
- an enterprise control entity;
- a plurality of hospitality environments, at least one of the hospitality environments comprising:
    - at least one connected device being configured to define at least two connected device statuses;
    - at least one local control device; and
    - a control module located in the at least one hospitality environment configured to receive one or more communication signals from each of the enterprise control entity, the at least one local control device, and a personal control device;
    - wherein the control module is further configured to receive one or more communication signals from each of the at least one connected device via a connected device network; and
    - wherein the control module is further configured to receive one or more communication signals directly from the at least one local control device and the personal control device via respective client control networks, each client control network comprising a closed area network;
- wherein the enterprise control entity is configured to transmit one or more communication signals to control modules such that the enterprise control entity can control each of the at least one connected device; and
- wherein control module is configured such that the at least one local control device of the same hospitality environment, the personal control device associated with the same hospitality environment, and the enterprise control entity can interchangeably and independently control each of the at least one connected device of the same hospitality environment.

* * * * *